(12) United States Patent
Haseba et al.

(10) Patent No.: US 8,501,285 B2
(45) Date of Patent: *Aug. 6, 2013

(54) OPTICALLY ISOTROPIC LIQUID CRYSTAL MEDIUM AND OPTICAL DEVICE

(75) Inventors: Yasuhiro Haseba, Chiba (JP); Takafumi Kuninobu, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/129,578

(22) PCT Filed: Oct. 27, 2009

(86) PCT No.: PCT/JP2009/068393
§ 371 (c)(1),
(2), (4) Date: May 17, 2011

(87) PCT Pub. No.: WO2010/058681
PCT Pub. Date: May 27, 2010

(65) Prior Publication Data
US 2011/0242473 A1    Oct. 6, 2011

(30) Foreign Application Priority Data
Nov. 19, 2008  (JP) .................................. 2008-295842

(51) Int. Cl.
| | | |
|---|---|---|
| *C09K 19/12* | (2006.01) | |
| *C09K 19/20* | (2006.01) | |
| *C09K 19/34* | (2006.01) | |
| *C09K 19/32* | (2006.01) | |
| *C09K 19/30* | (2006.01) | |
| *C09K 19/54* | (2006.01) | |
| *C09K 19/38* | (2006.01) | |
| *G02F 1/133* | (2006.01) | |

(52) U.S. Cl.
USPC .................... 428/1.1; 252/299.01; 252/299.5; 252/299.61; 252/299.62; 252/299.63; 252/299.66; 252/299.67

(58) Field of Classification Search
USPC ........... 428/1.1; 252/299.01, 299.61, 299.62, 252/299.63, 299.66, 299.67, 299.5
See application file for complete search history.

(56) References Cited

U.S. PATENT DOCUMENTS

| | | | | |
|---|---|---|---|---|
| 7,722,783 B2 * | 5/2010 | Haseba et al. | ........... | 252/299.01 |
| 7,842,358 B2 * | 11/2010 | Czanta et al. | ................... | 428/1.1 |
| 7,846,514 B2 * | 12/2010 | Shimada | ........................ | 428/1.1 |
| 2009/0230355 A1 * | 9/2009 | Czanta et al. | ............ | 252/299.61 |
| 2011/0193022 A1 * | 8/2011 | Tanaka et al. | ............. | 252/299.61 |
| 2011/0291048 A1 * | 12/2011 | Hamano et al. | .......... | 252/299.61 |

FOREIGN PATENT DOCUMENTS

| | | |
|---|---|---|
| EP | 1743931 | 1/2007 |
| JP | 2003-327966 | 11/2003 |
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| JP | 2007-277531 | 10/2007 |
| WO | 2005-080529 | 9/2005 |
| WO | 2006-063662 | 6/2006 |

OTHER PUBLICATIONS

Kikuchi et al., "Polymer-Stabilized Liquid Crystal Blue Phases", Nature Materials, 2002, p. 64-68, vol. 1.
Hisakado et al., "Large Electro-Optic Kerr Effect in Polymer-Stabilized Liquid-Crystalline Blue Phases", Advanced Materials, Jan. 6, 2005, p. 96-98, vol. 17.
Haseba et al., "Electro-Optic Effects of the Optically Isotropic State Induced by the Incorporative Effects of a Polymer Network and the Chirality of Liquid Crystal", Journal of the SID, 2006, p. 551-556, vol. 14/6.

* cited by examiner

*Primary Examiner* — Shean C Wu
(74) *Attorney, Agent, or Firm* — Jianq Chyun IP Office

(57) ABSTRACT

A liquid crystal medium, which has a liquid crystal phase over a wide temperature range, a large refractive index anisotropy, and a large dielectric anisotropy, and exhibits an optically isotropic liquid crystal phase, is provided. The liquid crystal medium is characterized by containing a liquid crystal compound having four benzene rings and a difluoromethyleneoxy group, and a chiral reagent, and exhibiting an optically isotropic liquid crystal phase.

47 Claims, 1 Drawing Sheet

OPTICALLY ISOTROPIC LIQUID CRYSTAL MEDIUM AND OPTICAL DEVICE

BACKGROUND OF THE INVENTION

1. Field of the Invention

The present invention generally relates to a liquid crystal medium useful as a material for an optical device, and in particular, to a liquid crystal medium having a liquid crystal phase over a wide temperature range, and having a large dielectric anisotropy and a large refractive index anisotropy. The present invention further relates to an optical device using the liquid crystal medium, and in particular, to an optical device that can be used in a wide temperature range and driven at a low voltage, and is capable of achieving a high-speed electro-optical response. The so-called optical device refers to various devices using electro-optic effect to achieve the function of optical modulation or optical switching, for example, display devices (LCD devices) and optical modulation devices used in optical communication systems, optical information processing or various sensor systems.

2. Description of Related Art

Liquid crystal display (LCD) devices utilizing liquid crystal compositions are widely used as the display for clocks, calculators, word processors, and so on. These LCD devices utilize the refractive index anisotropy and dielectric anisotropy and the like of liquid crystal compounds. The operation modes of the LCD devices are known and mainly include phase change (PC), twisted nematic (TN), super twisted nematic (STN), bistable twisted nematic (BTN), electrically controlled birefringence (ECB), optically compensated bend (OCB), in-plane switching (IPS), and vertical alignment (VA) and so on, which utilize one or more polarizers for display. Moreover, in recent years, more attention has been paid to the mode where an electric field is applied to an optically isotropic liquid crystal phase to induce electric birefringence (Patent References 1-9, and Non-patent References 1-3).

Moreover, wavelength variable filters, wavefront control devices, liquid-crystal lenses, aberration correction devices, aperture control devices, and optical head devices and the like that utilize the electric birefringence in a blue phase as one of the optically isotropic liquid crystal phases have been proposed (Patent References 10-12).

According to the driving mode, the devices can be classified into passive matrix (PM) and active matrix (AM) types. The PM type is further classified into static type and multiplex type, and the AM type is further classified into thin film transistor (TFT) type and metal-insulator-metal (MIM) type.

Such LCD devices contain a liquid crystal composition having suitable physical properties. In order to improve the characteristics of an LCD device, the liquid crystal composition preferably has suitable physical properties. A liquid crystal compound as a component of the liquid crystal composition requires to have the following general properties:

(1) stable chemical properties and stable physical properties;
(2) a high clearing point (i.e., phase transition temperature from the liquid crystal phase to the isotropic phase);
(3) a low lower-limit temperature of a liquid crystal phase (i.e., optically isotropic liquid crystal phase, such as nematic phase, cholesteric phase, smectic phase, and blue phase);
(4) excellent compatibility with other liquid crystal compounds;
(5) a suitable dielectric anisotropy; and
(6) a suitable refractive index anisotropy.

Particularly, for an optically isotropic liquid crystal phase, a liquid crystal compound having a large dielectric anisotropy and a large refractive index anisotropy is preferred, in view of lowering the driving voltage.

When a liquid crystal composition containing a liquid crystal compound having stable chemical and physical properties as described in (1) is used in an LCD device, the voltage holding ratio is improved.

Further, a liquid crystal composition containing a liquid crystal compound having a high clearing point or a low lower-limit temperature of a liquid crystal phase as described in (2) and (3), may have an expanded temperature range of a nematic phase or optically isotropic liquid crystal phase, and thus can be used in a display device in a wider temperature range. A liquid crystal composition is generally prepared by mixing a liquid crystal compound with a number of other liquid crystal compounds, so as to exhibit better properties that are difficult to develop by a single liquid crystal compound. Therefore, a liquid crystal compound having good compatibility with other liquid crystal compounds as described in (4) is preferably used in an LCD device. In recent years, LCD devices with superior properties, especially display performance such as contrast, display capacity, and response time, are required. In addition, as for the liquid crystal material that is being used, a liquid crystal composition having a low driving voltage is required. Furthermore, in order to drive an optical device that is driven in an optically isotropic liquid crystal phase with a low voltage, a liquid crystal compound with a large dielectric anisotropy and a large refractive index anisotropy is preferred.

As for the optically isotropic polymer/liquid crystal composite materials disclosed in Patent References 1-3 and Non-patent References 1-3, high voltages for device operation are required. Although optically isotropic liquid crystal compositions and polymer/liquid crystal composite materials, which are expected to have an operation voltage lower than the voltages as described above, are disclosed in Patent References 4-9, an optically isotropic liquid crystal composition and a polymer/liquid crystal composite material of the present invention were not disclosed.

REFERENCES IN PRIOR ART

[Patent References]
[Patent Reference 1] Japanese Patent Publication No. 2003-327966
[Patent Reference 2] International Publication No. 2005/90520 pamphlet
[Patent Reference 3] Japanese Patent Publication No. 2005-336477
[Patent Reference 4] Japanese Patent Publication No. 2006-89622
[Patent Reference 5] Japanese Patent Publication No. 2006-299084
[Patent Reference 6] Japanese Patent Publication No. 2006-506477
[Patent Reference 7] Japanese Patent Publication No. 2006-506515
[Patent Reference 8] International Publication No. 2006/063662 pamphlet
[Patent Reference 9] Japanese Patent Publication No. 2006-225655
[Patent Reference 10] Japanese Patent Publication No. 2005-157109
[Patent Reference 11] International Publication No. 2005/80529 pamphlet

[Patent Reference 12] Japanese Patent Publication No. 2006-127707

[Non-patent References]

[Non-patent Reference 1] Nature Materials, 1, 64, (2002)

[Non-patent Reference 2] Adv. Mater., 17, 96, (2005)

[Non-patent Reference 3] Journal of the SID, 14, 551, (2006)

SUMMARY OF THE INVENTION

The present invention is directed to a liquid crystal medium, which is stable to heat and light, has a liquid crystal phase over a wide temperature range, a large refractive index anisotropy and a large dielectric anisotropy, and exhibits an optically isotropic liquid crystal phase. The present invention is further directed to various optical devices containing the liquid crystal medium, which can be used over a wide temperature range, and have a short response time, a high contrast, and a low driving voltage.

The inventors identifies that, in order to have a liquid crystal phase over a practical temperature range in one aspect and exhibit a large refractive index anisotropy and dielectric anisotropy in another aspect, a liquid crystal composition having a compound of Formula (1) with four benzene rings and at least one linking group —$CF_2O$— as a main component and exhibiting an optically isotropic liquid crystal phase is suitable. The present invention provides a liquid crystal medium (liquid crystal composition or polymer/liquid crystal composite) and an optical device containing the liquid crystal medium.

[1] A liquid crystal composition, containing an achiral component T including a compound of Formula (1), and a chiral reagent, and exhibiting an optically isotropic liquid crystal phase.

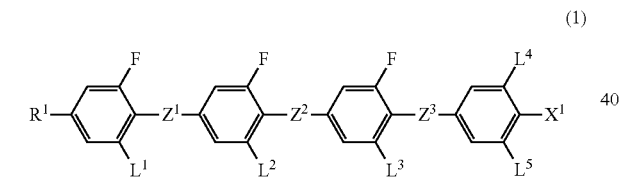

(1)

(in Formula (1), $R^1$ is hydrogen or a $C_{1-20}$ alkyl, wherein arbitrary —$CH_2$— in the alkyl may be substituted with —O—, —S—, —COO—, —OCO—, —CH=CH—, —CF=CF— or —C≡C—, and arbitrary hydrogen in the alkyl and the alkyl with arbitrary —$CH_2$— substituted with —O—, —S—, —COO—, —OCO—, —CH=CH—, —CF=CF—, or —C≡C— may be substituted with halogen or a $C_{1-3}$ alkyl; $Z^1$, $Z^2$, and $Z^3$ are each independently a single bond, —COO—, or —$CF_2O$—, provided that at least one of $Z^1$, $Z^2$, and $Z^3$ is —$CF_2O$—; and $L^1$, $L^2$, $L^3$, $L^4$, and $L^5$ are each independently hydrogen or fluorine; $X^1$ is hydrogen, halogen, —$SF_5$, or a $C_{1-10}$ alkyl, wherein arbitrary —$CH_2$— in the alkyl may be substituted with —O—, —S—, —CH=CH—, or —C≡C—, and arbitrary hydrogen in the alkyl and the alkyl with arbitrary —$CH_2$— substituted with —O—, —S—, —CH=CH—, or —C≡C— may be substituted with fluorine.)

[2] The liquid crystal composition according to item 1, in which in Formula (1), $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{1-19}$ alkenylthio, or —$(CH_2)_v$-CH=$CF_2$, in which v is an integer of 0 or 1-19; and $X^1$ is hydrogen, halogen, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —O—$(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2CH$=$CHCF_3$, or —CH=$CHCF_2CF_3$.

[3] The liquid crystal composition according to item 1 or 2, in which in Formulas (1), $Z^1$, $Z^2$, and $Z^3$ are each independently a single bond or —$CF_2O$—.

[4] The liquid crystal composition according to any one of items 1 to 3, in which $R^1$ is a group of any one of Formulas (CHN-1)-(CHN-19), and $R^{1a}$ is hydrogen or a $C_{1-20}$ alkyl.

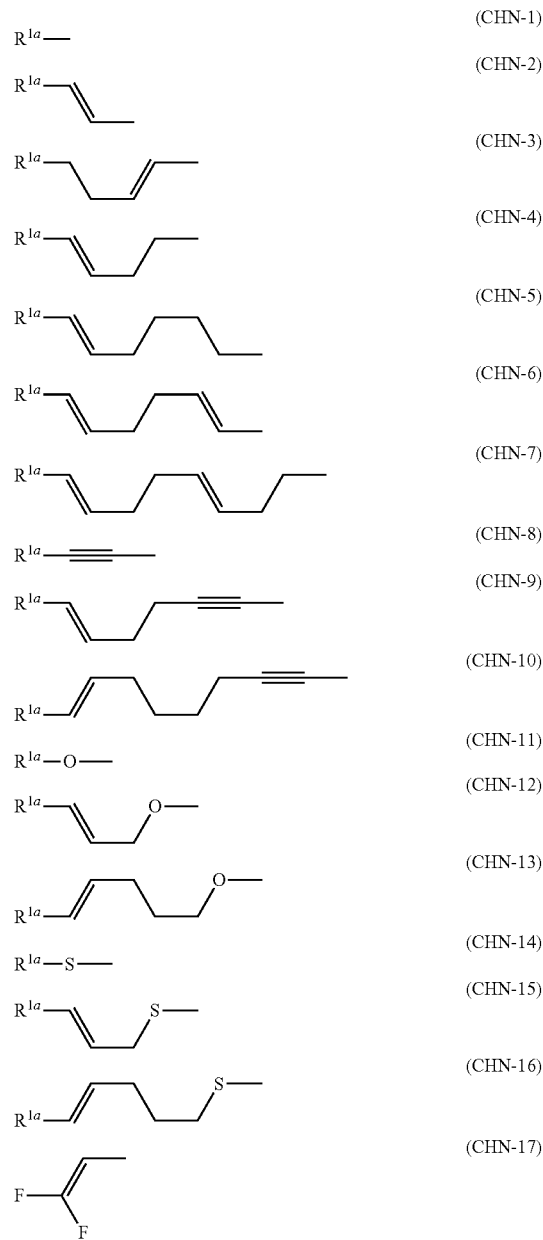

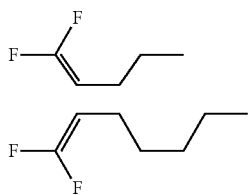

[5] The liquid crystal composition according to item 1, containing at least one compound selected from the group consisting of the compounds of Formulas (1-1)-(1-3).

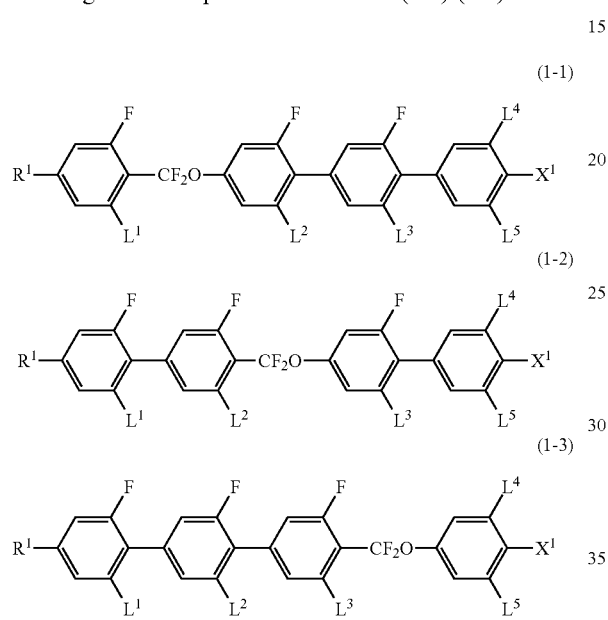

(in the formulas, $R^1$ is a group of any one of Formulas (CHN-1)-(CHN-19), and $R^{1a}$ is hydrogen or a $C_{1-20}$ alkyl; $L^1$, $L^2$, $L^3$, $L^4$, and $L^5$ are each independently hydrogen or fluorine; and $X^1$ is fluorine, chlorine, —$CF_3$, —$CHF_2$, —$CH_2F$, —$OCF_3$, —$OCHF_2$, —$OCH_2F$, —$OCF_2CFHCF_3$, or —CH=$CHCF_3$.)

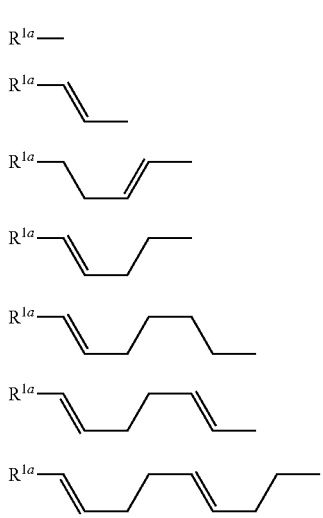

[6] The liquid crystal composition according to item 5, in which in Formulas (1-1)-(1-3), $R^1$ is a group of any one of Formulas (CHN-1)-(CHN-4) and Formulas (CHN-6)-(CHN-8), and $R^{1a}$ is hydrogen or a $C_{1-20}$ alkyl.

 (CHN-1)
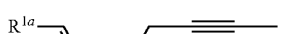 (CHN-2)
 (CHN-3)
 (CHN-4)
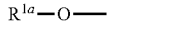 (CHN-6)
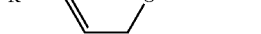 (CHN-7)
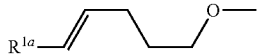 (CHN-8)

[7] The liquid crystal composition according to any one of items 1 to 6, in which the achiral component T further contains a compound of Formula (2).

(2)

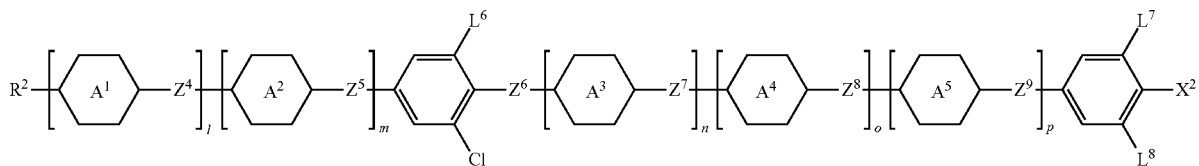

(in Formula (2), $R^2$ is a group of any one of Formulas (CHN-1)-(CHN-4) and Formulas (CHN-6)-(CHN-7), $R^{1a}$ is hydrogen or a $C_{1-20}$ alkyl; Rings $A^1$, $A^2$, $A^3$, $A^4$, and $A^5$ are (RG-1)-(RG-13); $Z^4$, $Z^5$, $Z^6$, $Z^7$, $Z^8$, and $Z^9$ are each independently a single bond or a $C_{1-4}$ alkylene, wherein arbitrary —CH$_2$— in the alkylene may be substituted with —O—, —COO— or —CF$_2$O—; $L^6$, $L^7$ and $L^8$ are each independently hydrogen or fluorine; $X^2$ is fluorine, chlorine, CF$_3$, —CHF$_2$, —CH$_2$F, —OCF$_3$, —OCHF$_2$, —OCH$_2$F, —OCF$_2$CFHCF$_3$, or —CH=CHCF$_3$; and l, m, n, o, and p are each independently 0 or 1, provided that l+m+n+o+p≦4.)

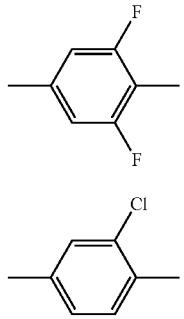

(CHN-1)

(CHN-2)

(CHN-3)

(CHN-4)

(CHN-6)

(CHN-7)

(RG-1)

(RG-2)

(RG-3)

(RG-4)

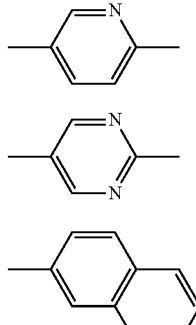

(RG-5)

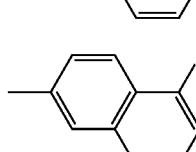

(RG-6)

(RG-7)

(RG-8)

(RG-9)

(RG-10)

(RG-11)

(RG-12)

(RG-13)

[8] The liquid crystal composition according to item 7, in which in Formula (2), $R^2$ is hydrogen or a $C_{1-20}$ alkyl, wherein arbitrary —CH$_2$— in alkyl may be substituted with —O—, —S—, —COO—, —OCO—, —CH=CH—, —CF=CF— or —C≡C—, and any hydrogen in the alkyl and the alkyl with arbitrary —CH$_2$— substituted with —O—, —S—, —COO—, —OCO—, —CH=CH—, —CF=CF— or —C≡C— may be substituted with halogen or a $C_{1-3}$ alkyl; Rings $A^1$, $A^2$, $A^3$, $A^4$, and $A^5$ are each independently a benzene ring, a naphthalene ring, a thiophene ring, a piperidine ring, a cyclohexene ring, a bicyclooctane ring, a tetrahydronaphthalene ring or a cyclohexane ring, wherein arbitrary hydrogen in the rings may be substituted with halogen, a $C_{1-3}$ alkyl, a $C_{1-3}$ alkoxy, or a $C_{1-3}$ haloalkyl, —$CH_2$— in the rings may be substituted with —O— or —S—, and —CH═ in the rings may be substituted with —N═; $Z^4$, $Z^5$, $Z^6$, $Z^7$, $Z^8$, and $Z^9$ are each independently a single bond or a $C_{1-4}$ alkylene, wherein arbitrary —$CH_2$— in the alkylene may be substituted with —O—, —S—, —COO—, —OCO—, —CSO—, —OCS—, —CH═CH—, —CF═CF— or —C≡C—, and arbitrary hydrogen in the alkylene or the alkylene with arbitrary —$CH_2$— substituted with —O—, —S—, —COO—, —OCO—, —CSO—, —OCS—, —CH═CH—, —CF═CF— or —C≡C— may be substituted with halogen; $L^6$, $L^7$, and $L^8$ are each independently hydrogen or halogen; $X^2$ is hydrogen, halogen, —C≡N, —N═C═S, —C≡C—C≡N, —$SF_5$, or a $C_{1-10}$ alkyl, wherein arbitrary —$CH_2$— in the alkyl may be substituted with —O—, —S—, —CH═CH— or —C≡C—, and arbitrary hydrogen in the alkyl and the alkyl with arbitrary —$CH_2$— substituted with —O—, —S—, —CH═CH— or —C≡C— may be substituted with halogen; and l, m, n, o and p are each independently 0 or 1, provided that $l+m+n+o+p \leq 4$.

[9] The liquid crystal composition according to item 8, in which in the compound of Formula (2), $2 \leq l+m+n+o+p \leq 3$.

[10] The liquid crystal composition according to any one of items 1 to 6, in which the achiral component T contains only the compound of Formula (1).

[11] The liquid crystal composition according to any one of items 1 to 9, in which the achiral component T contains only 5-95 weight percent (wt %) of the compound of Formula (1) and 5-50 wt % of the compound of Formula (2).

[12] The liquid crystal composition according to any one of items 1 to 9, in which the achiral component T contains 5-95 wt % of the compound of Formula (1), 5-80 wt % of the compound of Formula (2), and 0-50 wt % of other compounds.

[13] The liquid crystal composition according to any one of items 1 to 9, in which the achiral component T contains 5-94 wt % of the compound of Formula (1), 5-80 wt % of the compound of Formula (2), and 1-50 wt % of other compounds.

[14] The liquid crystal composition according to any one of items 1 to 13, in which the achiral component T contains 10-100 wt % of a compound selected from the group consisting of compounds of Formulas (1-2A)-(1-2H) and Formulas (1-3A)-(1-3D).

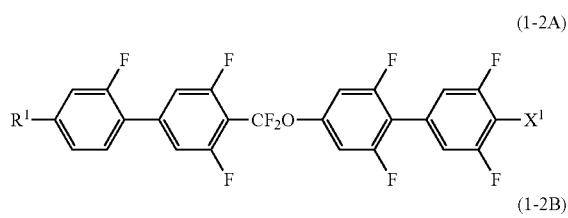

(1-2A)

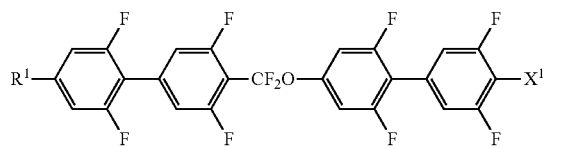

(1-2B)

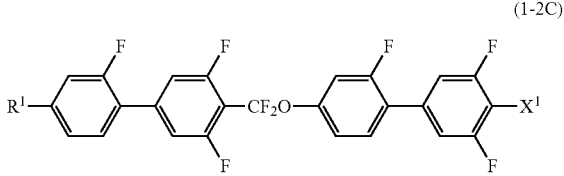

(1-2C)

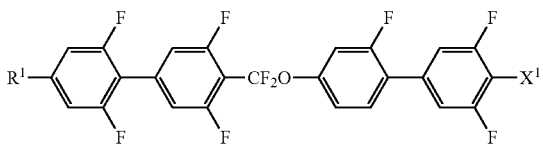

(1-2D)

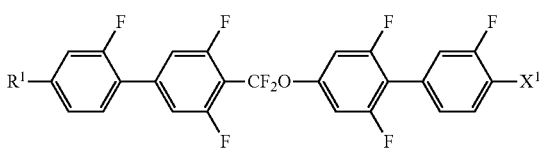

(1-2E)

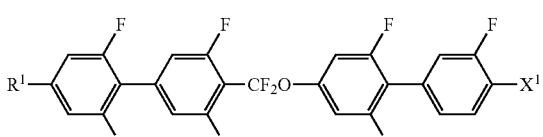

(1-2F)

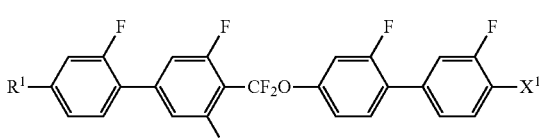

(1-2G)

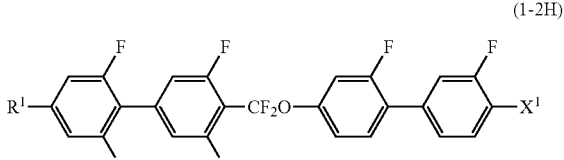

(1-2H)

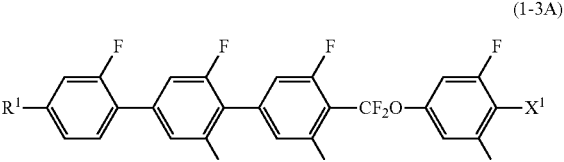

(1-3A)

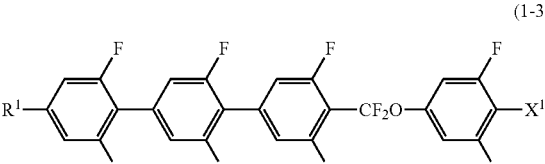

(1-3B)

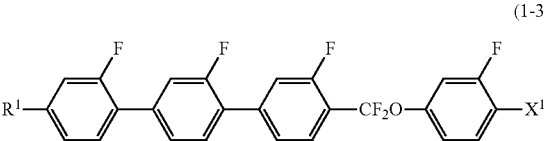

(1-3C)

(1-3D)

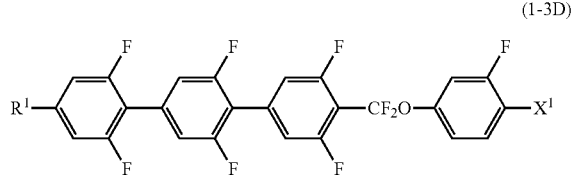

(in the formulas, $R^1$ is a chain selected from Formulas (CHN-1), (CHN-4), (CHN-7), (CHN-8) and (CHN-11); and $X^1$ is fluorine, chlorine, —$CF_3$, —$CHF_2$, —$CH_2F$, —$OCF_3$, —$OCHF_2$, —$OCF_2CFHCF_3$, or —$CH=CHCF_3$.)

[15] The liquid crystal composition according to any one of items 1 to 14, in which the achiral component T further contains at least one compound selected from the group consisting of the compounds of Formulas (3), (4), and (5).

(3)

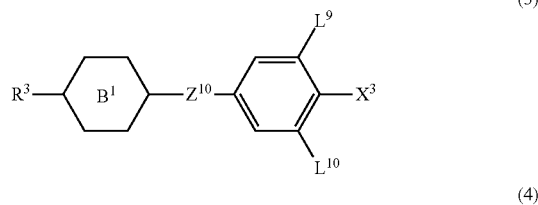

(4)

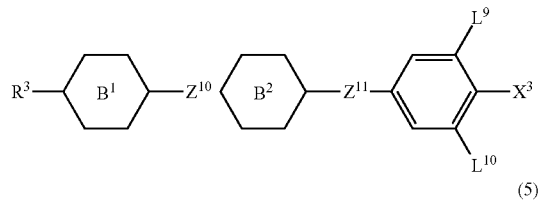

(5)

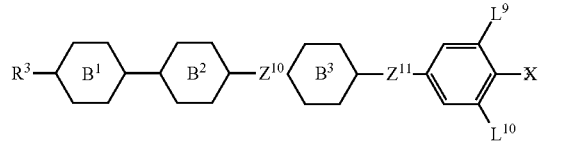

(in the formulas, $R^3$ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; $X^3$ is fluorine, chlorine, —$OCF_3$, —$OCHF_2$, —$CF_3$, —$CHF_2$, —$CH_2F$, —$OCF_2CHF_2$, or —$OCF_2CHFCF_3$; Rings $B^1$, $B^2$, and $B^3$ are each independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene with arbitrary hydrogen substituted with fluorine, or naphthalene-2,6-diyl with arbitrary hydrogen substituted with fluorine or chlorine; in Formula (5), Ring $B^1$ is 1,4-cyclohexylene, 1,3-dioxane-2,5-diyl, pyrimidine-2,5-diyl, tetrahydropyran-2,5-diyl, 1,4-phenylene, naphthalene-2,6-diyl, or naphthalene-2,6-diyl with arbitrary hydrogen substituted with fluorine or chlorine; $Z^{10}$ and $Z^{11}$ are each independently —$(CH_2)_2$—, —$(CH_2)_4$—, —COO—, —$CF_2O$—, —$OCF_2$—, —CH=CH—, —C≡C—, —$CH_2O$—, or a single bond; and $L^9$ and $L^{10}$ are each independently hydrogen or fluorine.)

[16] The liquid crystal composition according to any one of items 1 to 14, in which the achiral component T further contains at least one compound selected from the group consisting of the compound of Formula (6).

(6)

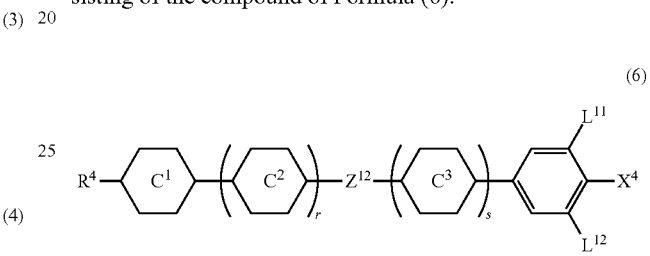

(in the formula, $R^4$ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; $X^4$ is —C≡N or —C≡C—C≡N; Rings $C^1$, $C^2$, and $C^3$ are each independently 1,4-cyclohexylene, 1,4-phenylene, 1,4-phenylene with arbitrary hydrogen substituted with fluorine, naphthalene-2,6-diyl, naphthalene-2,6-diyl with arbitrary hydrogen substituted with fluorine or chlorine, 1,3-dioxane-2,5-diyl, tetrahydropyran-2,5-diyl, or pyrimidine-2,5-diyl; $Z^{12}$ is —$(CH_2)_2$—, —COO—, —$CF_2O$—, —$OCF_2$—, —C≡C—, —$CH_2O$—, or a single bond; $L^{11}$ and $L^{12}$ are each independently hydrogen or fluorine; and r is 0, 1, or 2, s is 0 or 1, and r+s=0, 1 or 2.)

[17] The liquid crystal composition according to any one of items 1 to 14, in which the achiral component T further contains at least one compound selected from the group consisting of compounds of Formulas (7), (8), (9), (10), and (11).

(7)

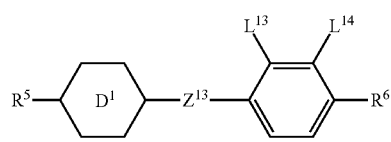

(8)

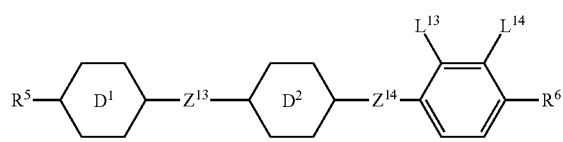

(9)

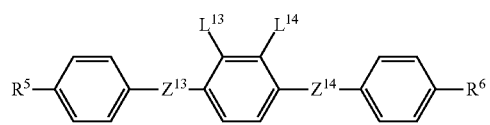

(10)

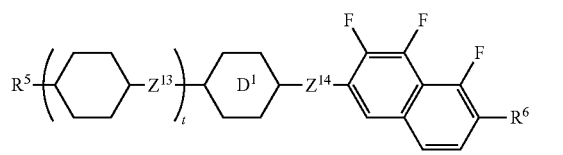

(11)

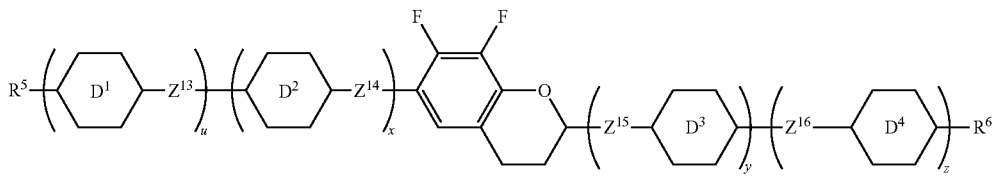

(in the formulas, $R^5$ and $R^6$ are each independently a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; Rings $D^1$, $D^2$, $D^3$, and $D^4$ are each independently 1,4-cyclohexylene, 1,4-cyclohexenylene, 1,4-phenylene, 1,4-phenylene with arbitrary hydrogen substituted with fluorine, tetrahydropyran-2,5-diyl, or decahydronaphthalene-2,6-diyl; $Z^{13}$, $Z^{14}$, $Z^{15}$, and $Z^{16}$ are each independently —$(CH_2)_2$—, —COO—, —$CH_2O$—, —$OCF_2$—, —$OCF_2(CH_2)_2$—, or a single bond; $L^{13}$ and $L^{14}$ are each independently fluorine or chlorine; and t, u, x, y, and z are each independently 0 or 1, and u+x+y+z is 1 or 2.)

[18] The liquid crystal composition according to any one of items 1 to 14, in which the achiral component T further contains at least one compound selected from the group consisting of the compounds of Formulas (12), (13), and (14).

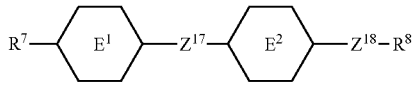
(12)

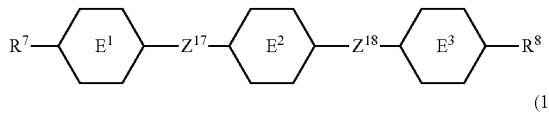
(13)

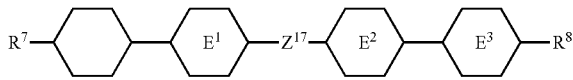
(14)

(in the formulas, $R^7$ and $R^8$ are each independently a $C_{1-10}$ alkyl or a $C_{2-10}$ alkenyl, in which arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; Rings $E^1$, $E^2$, and $E^3$ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; $Z^{17}$ and $Z^{18}$ are each independently —C≡C—, —COO—, —$(CH_2)_2$—, —CH=CH—, or a single bond.)

[19] The liquid crystal composition according to item 15, further containing at least one compound selected from the group consisting of the compound of Formula (6) according to item 16.

[20] The liquid crystal composition according to item 15, further containing at least one compound selected from the group consisting of the compounds of Formula (12), (13), and (14) according to item 18.

[21] The liquid crystal composition according to item 16, further containing at least one compound selected from the group consisting of the compounds of Formulas (12), (13), and (14) according to item 18.

[22] The liquid crystal composition according to item 17, further containing at least one compound selected from the group consisting of the compounds of Formulas (12), (13), and (14) according to item 18.

[23] The liquid crystal composition according to any one of items 1 to 14, in which the achiral component T further contains at least one compound selected from the group consisting of the compounds of Formulas (15), (16), (17), and (18).

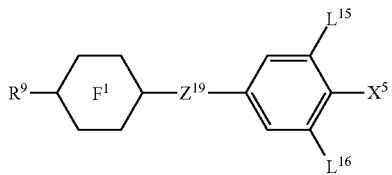
(15)

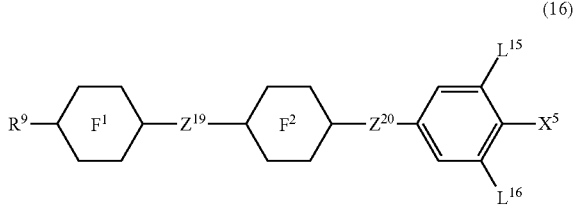
(16)

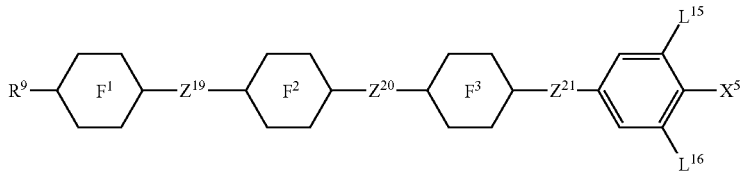
(17)

-continued

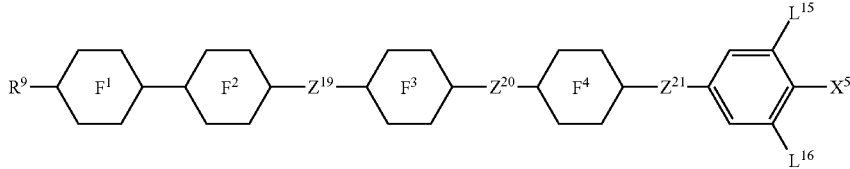
(18)

(in the formulas, $R^9$ is a $C_{1-10}$ alkyl, a $C_{2-10}$ alkenyl, or a $C_{2-10}$ alkynyl, in which arbitrary hydrogen in the alkyl, the alkenyl and the alkynyl may be substituted with fluorine, and arbitrary —$CH_2$— in the alkyl, the alkenyl, the alkynyl, or the alkyl, the alkenyl and the alkynyl with arbitrary hydrogen substituted with fluorine may be substituted with —O—; $X^5$ is fluorine, chlorine, —$SF_5$, —$OCF_3$, —$OCHF_2$, —$CF_3$, —$CHF_2$, —$CH_2F$, —$OCF_2CHF_2$, or —$OCF_2CHFCF_3$; Rings $F^1$, $F^2$, $F^3$, and $F^4$ are each independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene with arbitrary hydrogen substituted with fluorine or chlorine, or naphthalene-2,6-diyl with arbitrary hydrogen substituted with fluorine or chlorine; in Formulas (17), Ring $F^1$ is 1,4-cyclohexylene, 1,3-dioxane-2,5-diyl, pyrimidine-2,5-diyl, tetrahydropyran-2,5-diyl, 1,4-phenylene, naphthalene-2,6-diyl, or naphthalene-2,6-diyl with arbitrary hydrogen substituted with fluorine or chlorine; $Z^{19}$, $Z^{20}$, and $Z^{21}$ are each independently —$(CH_2)_2$—, —$(CH_2)_4$—, —COO—, —$CF_2O$—, —$OCF_2$—, —CH=CH—, —C≡C—, —$CH_2O$—, or a single bond; and $L^{15}$ and $L^{16}$ are each independently hydrogen or fluorine.)

[24] The liquid crystal composition according to any one of items 1 to 14, in which the achiral component T further contains at least one compound selected from the group consisting of the compound of Formula (19).

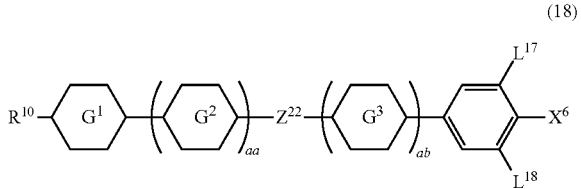
(18)

(in the formulas, $R^{10}$ is a $C_{1-10}$ alkyl, a $C_{2-10}$ alkenyl, or a $C_{2-10}$ alkynyl, in which arbitrary hydrogen in the alkyl, the alkenyl and the alkynyl may be substituted with fluorine, and arbitrary —$CH_2$— in the alkyl, the alkenyl, the alkynyl, or the alkyl, the alkenyl and the alkynyl with arbitrary hydrogen substituted with fluorine may be substituted with —O—; $X^6$ is —C≡N, —N=C=S, or —C≡C—C≡N; Rings $G^1$, $G^2$, and $G^3$ are each independently 1,4-cyclohexylene, 1,4-phenylene, 1,4-phenylene with arbitrary hydrogen substituted with fluorine or chlorine, naphthalene-2,6-diyl, naphthalene-2,6-diyl with arbitrary hydrogen substituted with fluorine or chlorine, 1,3-dioxane-2,5-diyl, tetrahydropyran-2,5-diyl, or pyrimidine-2,5-diyl; $Z^{22}$ is —$(CH_2)_2$—, —COO—, —$CF_2O$—, —$OCF_2$—, —C≡C—, —$CH_2O$—, or a single bond; $L^{17}$ and $L^{18}$ are each independently hydrogen or fluorine; and aa is 0, 1 or 2, ab is 0 or 1, and aa+ab is 0, 1 or 2.)

[25] The liquid crystal composition according to any one of items 1 to 24, containing at least one antioxidant and/or UV absorbent.

[26] The liquid crystal composition according to any one of items 1 to 25, in which the optically isotropic liquid crystal phase does not exhibit two or more colors of diffracted light.

[27] The liquid crystal composition according to any one of items 1 to 25, in which the optically isotropic liquid crystal phase exhibits two or more colors of diffracted light.

[28] The liquid crystal composition according to item 26 or 27, obtained by adding the chiral reagent into a composition having a temperature difference of 3° C.-150° C. between an upper-limit temperature and a lower-limit temperature of coexistence of a chiral nematic phase and a non-liquid crystal isotropic phase.

[29] The liquid crystal composition according to item 26 or 27, obtained by adding the chiral reagent into a composition having a temperature difference of 5° C.-150° C. between an upper-limit temperature and a lower-limit temperature of coexistence of a chiral nematic phase and a non-liquid crystal isotropic phase.

[30] The liquid crystal composition according to item 26 or 27, obtained by adding the chiral reagent into a composition having a temperature difference of 3° C.-150° C. between an upper-limit temperature and a lower-limit temperature of coexistence of a nematic phase and a non-liquid crystal isotropic phase.

[31] The liquid crystal composition according to any one of items 1 to 30, in which a content of the chiral reagent is 1-40 wt % based on the total weight of the liquid crystal composition.

[32] The liquid crystal composition according to any one of items 1 to 30, in which a content of the chiral reagent is 5-15 wt % based on the total weight of the liquid crystal composition.

[33] The liquid crystal composition according to item 31 or 32, exhibiting a chiral nematic phase at any temperature in the range of 70° C. to −20° C., and having a helical pitch of 700 nm or less within at least a part of the temperature range.

[34] The liquid crystal composition according to any one of items 31 to 33, in which the chiral reagent contains at least one compound selected from the group consisting of the compounds of Formulas (K1)-(K5).

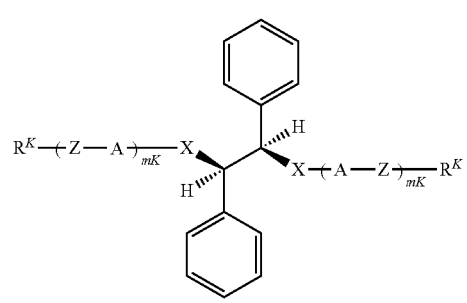
(K1)

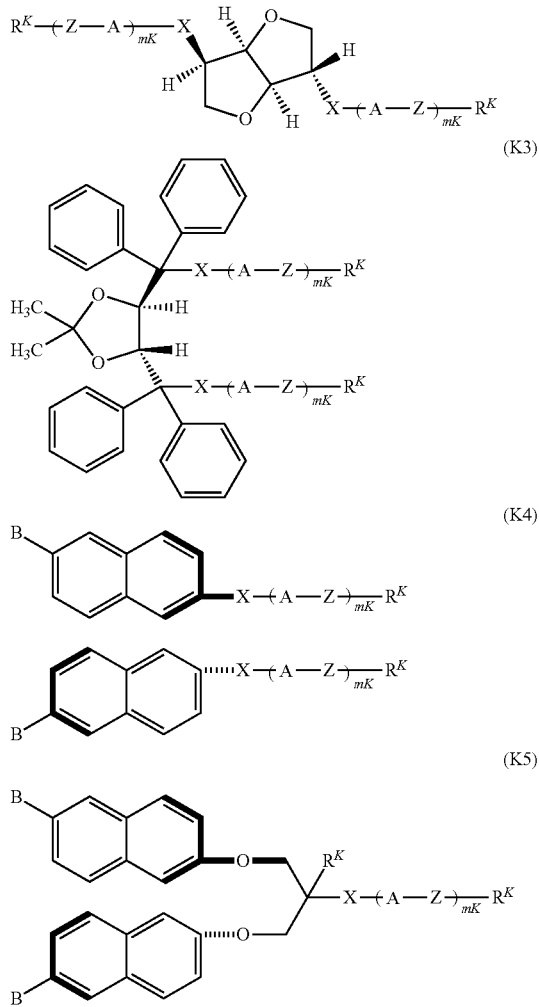

(in Formulas (K1)-(K5), $R^K$ is each independently hydrogen, halogen, —C≡N, —N=C=O, —N=C=S, or a $C_{1-20}$ alkyl, wherein arbitrary —$CH_2$— in the alkyl may be substituted with —O—, —S—, —COO—, —OCO—, —CH=CH—, —CF=CF— or —C≡C—, arbitrary hydrogen in the alkyl may be substituted with halogen, and additionally, a terminal —$CH_3$ may be substituted with:

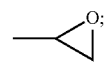

A is each independently an aromatic or non-aromatic 3- to 8-membered ring, or a fused ring having 9 or more carbon atoms, wherein arbitrary hydrogen in the rings may be substituted with halogen, a $C_{1-3}$ alkyl or haloalkyl, —$CH_2$— in the rings may be substituted with —O—, —S—, or —NH—, and —CH= in the rings may be substituted with —N=; B is each independently hydrogen, halogen, a $C_{1-3}$ alkyl, a $C_{1-3}$ haloalkyl, an aromatic or non-aromatic 3- to 8-membered ring, or a fused ring having 9 or more carbon atoms, wherein arbitrary hydrogen in the rings may be substituted with halogen, a $C_{1-3}$ alkyl or haloalkyl, —$CH_2$— in the rings may be substituted with —O—, —S— or —NH—, and —CH= in the rings may be substituted with —N=; Z is each independently a single bond, or a $C_{1-8}$ alkylene, wherein arbitrary —$CH_2$— in the alkylene may be substituted with —O—, —S—, —COO—, —OCO—, —CSO—, —OCS—, —N=N—, —CH=N—, —N=CH—, —CH=CH—, —CF=CF—, or —C≡C—, and arbitrary hydrogen in the alkylene may be substituted with halogen;

X is a single bond, —COO—, —OCO—, —$CH_2O$—, —$OCH_2$—, —$CF_2O$—, —$OCF_2$—, or —$CH_2CH_2$—; and mK is an integer of 1-4.)

[35] The liquid crystal composition according to items 31 to 33, in which the chiral reagent contains at least one compound selected from the group consisting of the compounds of Formulas (K2-1)-(K2-8), Formulas (K4-1)-(K4-6), and Formulas (K5-1)-(K5-3).

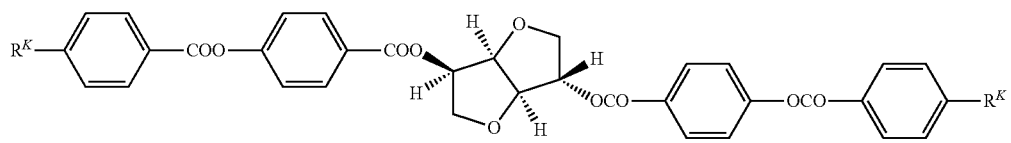

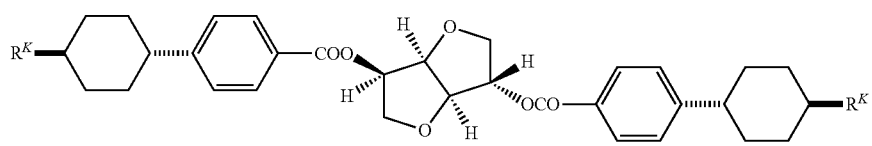

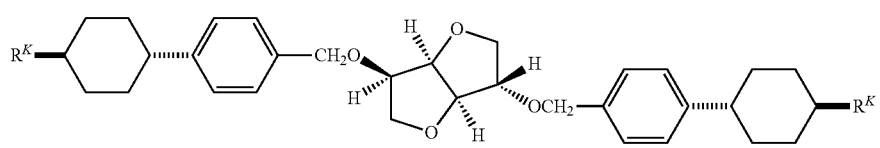

-continued
(K2-4)
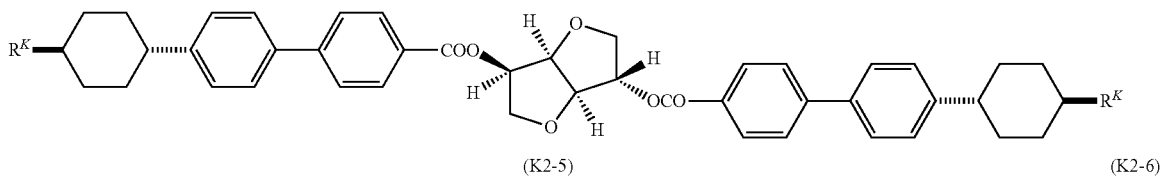
(K2-5) (K2-6)
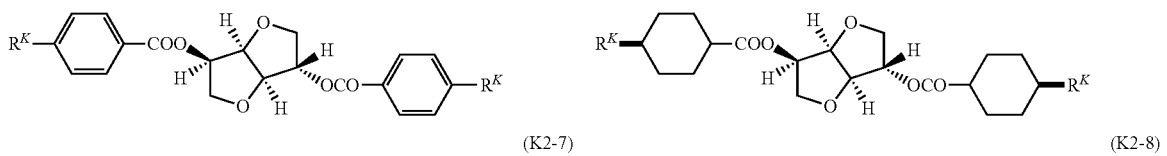
(K2-7) (K2-8)
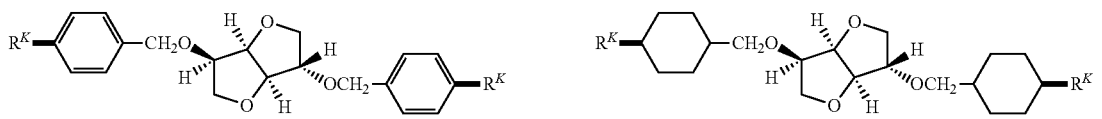
(K4-1) (K4-2)
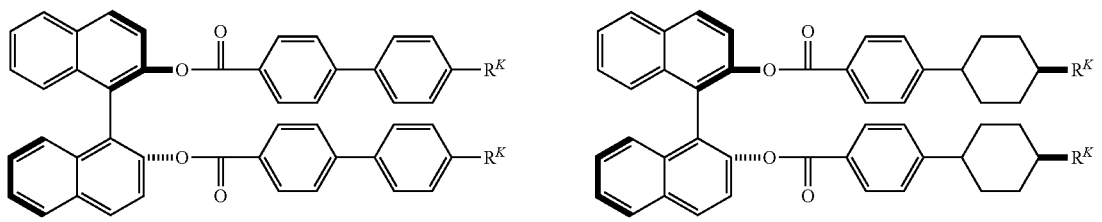
(K4-3)
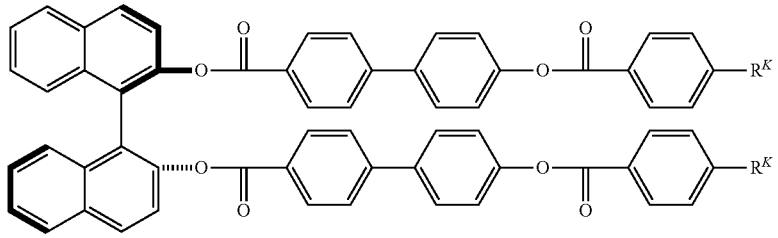
(K4-4) (K4-5)
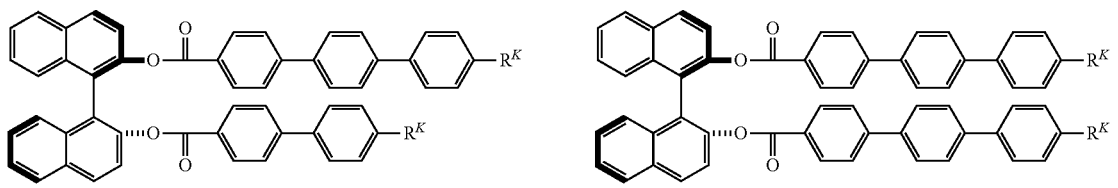
(K4-6)
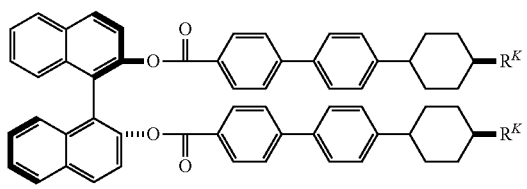

(in the formulas, $R^K$ is each independently a $C_{3-10}$ alkyl, wherein —$CH_2$— adjacent to the ring in the alkyl may be substituted with —O—, and arbitrary —$CH_2$— in the alkyl may be substituted with —CH=CH—.)

[36] A mixture, containing the liquid crystal composition according to any one of items 1 to 35 and a polymerizable monomer.

[37] The mixture according to item 36, in which the polymerizable monomer is a photopolymerizable monomer or a thermal-polymerizable monomer.

[38] A polymer/liquid crystal composite material, obtained by polymerizing the mixture according to item 36 or 37, for use in a device driven in an optically isotropic liquid crystal phase.

[39] The polymer/liquid crystal composite material according to item 38, obtained by polymerizing the mixture according to item 36 or 37 in a non-liquid crystal isotropic phase or an optically isotropic liquid crystal phase.

[40] The polymer/liquid crystal composite material according to item 38 or 39, in which the polymer contained in the polymer/liquid crystal composite material has a mesogen moiety.

[41] The polymer/liquid crystal composite material according to any one of items 38 to 40, in which the polymer contained in the polymer/liquid crystal composite material has a cross-linked structure.

[42] The polymer/liquid crystal composite material according to any one of items 38 to 41, in which a content of the liquid crystal composition is 60-99 wt %, and a content of the polymer is 1-40 wt %.

[44] An optical device, provided with a set of substrates having electrodes disposed on either or both surfaces thereof, at least one of which being transparent, a liquid crystal medium disposed between the substrates, a polarizer disposed outside of the substrates, and an electric field-applying means for applying an electric field to the liquid crystal medium via the electrodes, in which the liquid crystal medium is the liquid crystal composition according to any one of items 31 to 35 or the polymer/liquid crystal composite material according to any one of items 38 to 42.

[45] The optical device according to item 43 or 44, in which on at least one of the set of substrates, the electrodes are configured in a manner such that an electric field is applied in at least two directions.

[46] The optical device according to item 43 or 44, in which on one or two of the set of substrates disposed in parallel with each other, the electrodes are configured in a manner such that an electric field is applied in at least two directions.

[47] The optical device according to any one of items 43 to 46, in which the electrodes are configured in a matrix to form pixel electrodes, and each pixel is provided with an active element being a thin film transistor (TFT).

In the present invention, the so-called liquid crystal medium is a general term of a liquid crystal composition and a polymer/liquid crystal composite. Furthermore, as described above, the so-called optical device refers to various devices using electro-optic effect to achieve the function of optical modulation or optical switching, for example, display devices (LCD devices), and optical modulation devices used in optical communication systems, optical information processing or various sensor systems. As for the optical modulation with changes in refractive index caused by applying a voltage to an optically isotropic liquid crystal medium, the Kerr effect is known. The so-called Kerr effect is a phenomenon, in which the electric birefringence value $\Delta n(E)$ is proportional to the square of electric field E, that is, $\Delta n(E)=K\lambda E^2$ (K=Kerr coefficient (or Kerr constant), $\lambda$: wavelength), for a material exhibiting the Kerr effect. Herein, the so-called electric birefringence value refers to a refractive index anisotropy value induced by applying an electric field to an isotropic medium.

The terms used in the specification are defined as follows. The liquid crystal compound is a general term of compounds having a liquid crystal phase such as nematic phase and smectic phase and compounds having no liquid crystal phase but being useful as a component of a liquid crystal composition. The chiral reagent is an optically active compound, which is added to impart the necessary twisted molecular arrangement to a liquid crystal composition. The LCD device is a general term of LCD panels and LCD modules. The liquid crystal compound, the liquid crystal composition, and the LCD device are sometimes simply referred as the compound, the composition, and the device, respectively. Furthermore, for example, the upper-limit temperature of a liquid crystal phase is the phase transition temperature from the liquid crystal phase to the isotropic phase, and simply referred as the clearing point or upper-limit temperature. The lower-limit temperature of the liquid crystal phase is simply referred as the lower-limit temperature. The compound of Formula (1) is simply referred as Compound (1), and the similar reference is also correspondingly applied to a compound of Formula (2). In Formulas (1)-(19), the symbols B, D, and E surrounded by hexagons are corresponding to rings B, D, and E, respectively. The compound content by percentage is weight percent (wt %) based on the total weight of the composition. Numerous identical symbols such as rings $A^1$, $Y^1$, or B are included in the same or different formulas; however, the groups represented by these symbols can be identical or different.

"Arbitrary" denotes not only arbitrary position, but also arbitrary number, except for the case when the number is 0. The expression that arbitrary A may be substituted with B, C, or D not only means arbitrary A may be substituted with B, arbitrary A may be substituted with C, and arbitrary A may be substituted with D, but also means that a plurality of A may be substituted with at least two of B-D. For example, the alkyl in which arbitrary —$CH_2$— may be substituted with —O— or —CH=CH— includes alkyl, alkenyl, alkoxy, alkoxyalkyl, alkoxyalkenyl, alkenyloxyalkyl, and so on. Furthermore, in the present invention, two contiguous —$CH_2$— being substituted with —O— to form —O—O— is unsuitable, and the terminal —$CH_2$— in an alkyl being substituted with —O— is also unsuitable. The present invention will be further described below. The terminal groups, rings, and linking groups of the compound of Formula (1) will also be illustrated with preferred examples.

[Effects of the Invention]

The liquid crystal composition of the present invention is stable to heat and light, and has an optically isotropic liquid crystal phase having a high upper-limit temperature and a low lower-limit temperature, and has a low driving voltage when being used in a device driven in an optically isotropic liquid crystal phase. The polymer/liquid crystal composite material of the present invention includes a material of an optically isotropic liquid crystal phase that exhibits a high upper-limit temperature and a low lower-limit temperature, and has a low driving voltage when being used in a device driven in an optically isotropic liquid crystal phase.

The optical device of the present invention driven in an optically isotropic liquid crystal phase has a wide usable temperature range, a short response time, a high contrast, and a low driving voltage.

Figure 1:
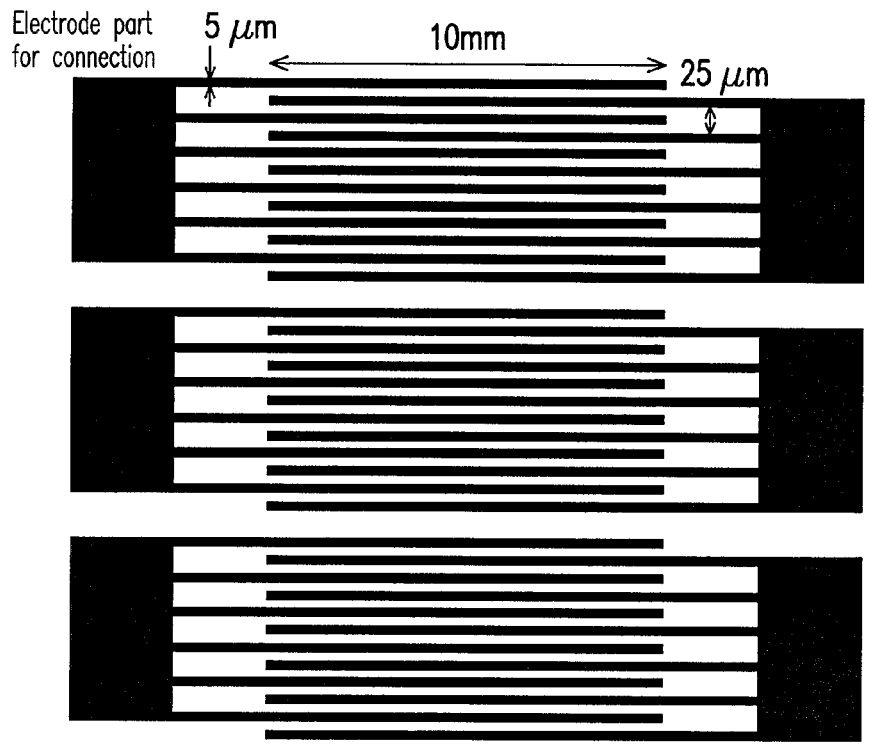
FIG. 1 shows a comb-like electrode substrate used in an embodiment.

DESCRIPTION OF THE EMBODIMENTS 1-1 Compound (1)

The liquid crystal composition exhibiting an optically isotropic liquid crystal phase of the present invention contains an achiral component T and a chiral reagent, wherein the achiral component T contains a compound of Formula (1) as Component A. A first aspect of the present invention is that the achiral component T contains only Component A, the achiral component T contains Component A and Component B of Formula (2), the achiral component T contains Component A and other components not specifically disclosed in the specification, or the achiral component T contains Component A, Component B, and other components not specifically disclosed in the specification. In order for the liquid crystal composition of the present invention to exhibit excellent properties, it is preferred that 0.1-100 wt % of at least one of the compound of Formula (1) of the present invention is contained as the achiral component T.

The compound of Formula (1) is described.

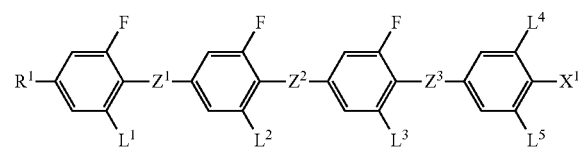

(1)

In Formulas (1), $R^1$ is hydrogen or a $C_{1\text{-}20}$ alkyl, wherein arbitrary —CH$_2$— in the alkyl may be substituted with —O—, —S—, —COO—, —OCO—, —CH=CH—, —CF=CF— or —C≡C—, and arbitrary hydrogen in the alkyl and the alkyl with arbitrary —CH$_2$— substituted with —O—, —S—, —COO—, —OCO—, —CH=CH—, —CF=CF— or —C≡C— may be substituted with halogen or a $C_{1\text{-}3}$ alkyl; $Z^1$, $Z^2$, and $Z^3$ are each independently a single bond, —COO—, or —CF$_2$O—, provide that at least one of $Z^1$, $Z^2$, and $Z^3$ is —CF$_2$O—; $L^1$, $L^2$, $L^3$, $L^4$, and $L^5$ are each independently hydrogen or fluorine; $X^1$ is hydrogen, halogen, —SF$_5$, or a $C_{1\text{-}10}$ alkyl, wherein arbitrary —CH$_2$— in the alkyl may be substituted with —O—, —S—, —CH=CH—, or —C≡C—, and arbitrary hydrogen in the alkyl or the alkyl with arbitrary —CH$_2$— substituted with —O—, —S—, —CH=CH— or —C≡C— may be substituted with fluorine.

As for such a $R^1$, a linear group is preferred to a branched group. A preferred stereo configuration of —CH=CH— in alkenyl depends on the position of the double bond. A trans-configuration is preferred for such an alkenyl having a double bond at an odd position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$, and —C$_2$H$_4$CH=CHC$_2$H$_5$. A cis-configuration is preferred for such an alkenyl having a double bond at an even position, such as —CH$_2$CH=CHCH$_3$, —CH$_2$CH=CHC$_2$H$_5$, and —CH$_2$CH=CHC$_3$H$_7$. An alkenyl compound having a preferred stereo configuration has a high upper-limit temperature or has a liquid crystal phase over a wide temperature range, as illustrated in detail in Mol. Cryst. Liq. Cryst., 1985, 131, 109 and Mol. Cryst. Liq. Cryst., 1985, 131, 327.

The alkyl may be linear or branched, and specific examples include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$, and —C$_{15}$H$_{31}$.

The alkoxy may be linear or branched, and specific examples include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$, and —OC$_{14}$H$_{29}$.

The alkoxyalkyl may be linear or branched, and specific examples include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$, and —(CH$_2$)$_5$—OCH$_3$.

The alkenyl may be linear or branched, and specific examples include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$, and —(CH$_2$)$_3$—CH=CH$_2$.

The alkenyloxy may be linear or branched, and specific examples include —OCH$_2$CH=CH$_2$, —OCH$_2$CH=CHCH$_3$, and —OCH$_2$CH=CHC$_2$H$_5$.

The alkynyl may be linear or branched, and specific examples include —C≡CH, —C≡CCH$_3$, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$, and —C≡C(CH$_2$)$_5$.

Preferably, $R^1$ has a structure of Formulas (CHN-1)-(CHN-19). Herein, $R^{1a}$ is hydrogen, or a $C_{1\text{-}20}$ alkyl. More preferably, $R^1$ has a structure of Formulas (CHN-1)-(CHN-4) or Formulas (CHN-6)-(CHN-7).

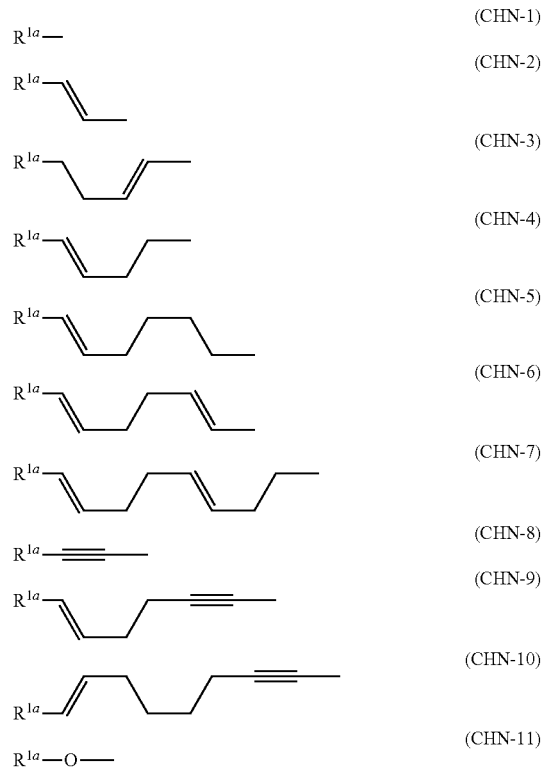

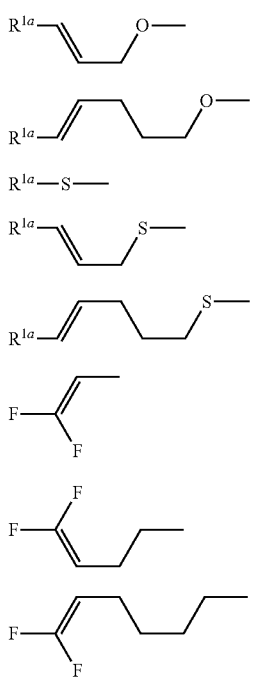

(CHN-12)
(CHN-13)
(CHN-14)
(CHN-15)
(CHN-16)
(CHN-17)
(CHN-18)
(CHN-19)

In Formula (1), $Z^1$, $Z^2$, and $Z^3$ are each independently a single bond, —COO—, or —CF$_2$O—, provided that at least one of $Z^1$, $Z^2$, and $Z^3$ is —CF$_2$O—.

Preferred examples of $Z^1$, $Z^2$, and $Z^3$ include a single bond and —CF$_2$O—.

In Formula (1), $L^1$, $L^2$, $L^3$, $L^4$, and $L^5$ are each independently hydrogen or fluorine. Furthermore, preferably $L^2$ and $L^4$ are fluorine, and more preferably, $L^2$, $L^4$ and $L^5$ are fluorine.

In Formula (1), $X^1$ is hydrogen, halogen, —SF$_5$, or a $C_{1-10}$ alkyl, wherein arbitrary —CH$_2$— in the alkyl may be substituted with —O—, —S—, —CH═CH— or —C≡C—, and arbitrary hydrogen in the alkyl and the alkyl with arbitrary —CH$_2$— substituted with —O—, —S—, —CH═CH— or —C≡C— may be substituted with fluorine.

Specific examples of the alkyl with arbitrary hydrogen substituted with halogen include —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, and —(CF$_2$)$_5$—F.

Specific examples of alkoxy with arbitrary hydrogen substituted with halogen include —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, and —O—(CF$_2$)$_5$—F.

Specific examples of alkenyl with arbitrary hydrogen substituted with halogen include —CH═CHF, —CH═CF$_2$, —CF═CHF, —CH═CHCH$_2$F, —CH═CHCF$_3$, —(CH$_2$)$_2$—CH═CF$_2$, —CH$_2$CH═CHCF$_3$, —CH═CHCF$_3$, and —CH═CHCF$_2$CF$_3$.

Specific examples of $X^1$ include hydrogen, fluorine, chlorine, —C≡N, —N═C═S, —SF$_5$, —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_3$, —OC$_2$H$_5$, —OC$_3$H$_7$, —OC$_4$H$_9$, —OC$_5$H$_{11}$, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH═CH$_2$, —CH═CHCH$_3$, —CH$_2$CH═CH$_2$, —CH═CHC$_2$H$_5$, —CH$_2$CH═CHCH$_3$, —(CH$_2$)$_2$—CH═CH$_2$, —CH═CHC$_3$H$_7$, —CH$_2$CH═CHC$_2$H$_5$, —(CH$_2$)$_2$—CH═CHCH$_3$, —(CH$_2$)$_3$—CH═CH$_2$, —CH═CHF, —CH═CF$_2$, —CF═CHF, —CH═CHCH$_2$F, —CH═CHCF$_3$, —(CH$_2$)$_2$—CH═CF$_2$, —CH═CHCF$_3$, —CH$_2$CH═CHCF$_3$, and —CH═CHCF$_2$CF$_3$.

Preferred examples of $X^1$ include fluorine, chlorine, —CF$_3$, —CHF$_2$, —OCF$_3$, and —OCHF$_2$. Most preferred examples of $X^1$ include fluorine, chlorine, —CF$_3$, and —OCF$_3$.

In Formula (1), structures of Formulas (1-1)-(1-3) are preferred.

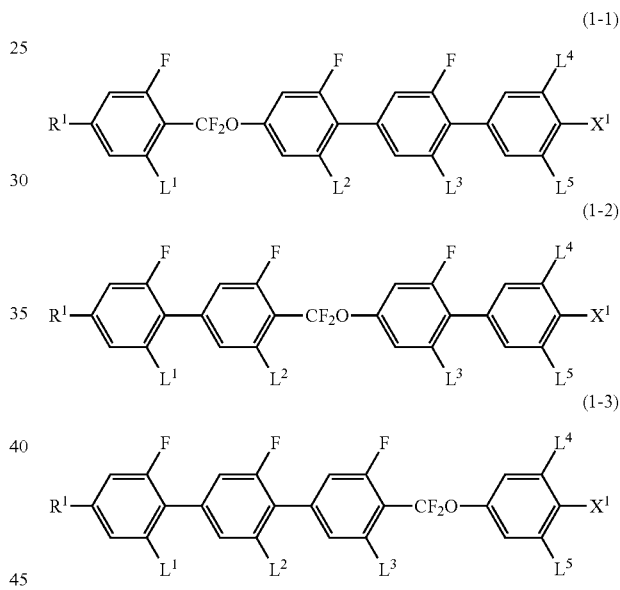

In the formulas, $R^1$ has a structure of any one of Formulas (CHN-1)-(CHN-19), $R^{1a}$ is hydrogen, or a $C_{1-20}$ alkyl; $L^1$, $L^2$, $L^3$, $L^4$, and $L^5$ are each independently hydrogen or fluorine; and $X^1$ is fluorine, chlorine, —CF$_3$, —CHF$_2$, —OCF$_3$, —OCHF$_2$, —C≡C—CF$_3$, —CH═CHCF$_3$, or —OCF$_2$CFHCF$_3$.

1-2 Properties of Compound (1)

Compound (1) used in the present invention is further described in detail. Compound (1) is a compound having four benzene rings and at least one linking group —CF$_2$O—, which has very stable physical and chemical properties under the conditions where the device is conventionally used, and has an excellent compatibility with other liquid crystal compounds. The composition containing such a compound is stable under the conditions where the device is conventionally used. Therefore, the composition containing the compound has an expanded temperature range of an optically isotropic liquid crystal phase, and thus can be used in a display device over a wide temperature range. Moreover, due to large dielectric anisotropy and large refractive index anisotropy, the compound may be used as a component for lowering the driving voltage of a composition driven in an optically isotropic liquid crystal phase.

By properly selecting the left terminal group $R^1$, the groups on the benzene rings ($L^1$-$L^5$, and $X^1$), or the linking groups $Z^1$-$Z^3$ in Compound (1), the physical properties such as clearing point, refractive index anisotropy, and dielectric anisotropy can be adjusted at will. The effects of the types of the left terminal group $R^1$, the groups on the benzene rings ($L^1$-$L^5$, and $X^1$), or the linking groups $Z^1$-$Z^3$ on the physical properties of Compound (1) will be described below.

When $R^1$ is linear, Compound (1) has a liquid crystal phase over a wide temperature range and a low viscosity. When $R^1$ is branched, Compound (1) has good compatibility with other liquid crystal compounds. When $R^1$ is an alkenyl, a preferred stereo configuration depends on the position of the double bond. An alkenyl compound having a preferred stereo configuration has a high upper-limit temperature or has a liquid crystal phase with over a wide temperature range.

When the linking groups $Z^1$, $Z^2$, and $Z^3$ are a single bond or —$CF_2O$—, Compound (1) has a low viscosity. When the linking groups $Z^1$, $Z^2$, and $Z^3$ are —COO—, or —$CF_2O$—, Compound (1) has a large dielectric anisotropy. When the linking groups $Z^1$, $Z^2$, and $Z^3$ are a single bond, or —$CF_2O$—, Compound (1) has stable chemical properties, and is unlikely to be deteriorated.

When the right terminal group $X^1$ is fluorine, chlorine, —$SF_5$, —$CF_3$, —$CHF_2$, —$CH_2F$, —$OCF_3$, —$OCHF_2$, or —$OCH_2F$, Compound (1) has a large dielectric anisotropy. When $X^1$ is fluorine, —$OCF_3$, or —$CF_3$, Compound (1) has stable chemical properties.

When the number of $L^1$-$L^5$, which is fluorine, is large, Compound (1) has a large dielectric anisotropy. When $L^1$ is hydrogen, Compound (1) has excellent compatibility with other liquid crystal compounds. When $L^4$ and $L^5$ are both fluorine, Compound (1) has an especially large dielectric anisotropy.

As described above, a compound with target properties can be obtained by properly selecting the types of the terminal groups, linking groups, and the like.

1-3 Specific Examples of Compound (1)

Preferred examples of Compound (1) include Formulas (1-1)-(1-3). More preferred examples include Formulas (1-2A)-(1-2H), and Formulas (1-3A)-(1-3C). Further more preferred examples include Formulas (1-2A)-(1-2D), (1-3A), and (1-3B). Most preferred examples include Formulas (1-2A) and (1-2C).

(1-2A)

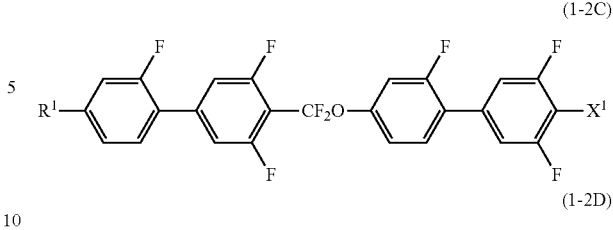

(1-2B)

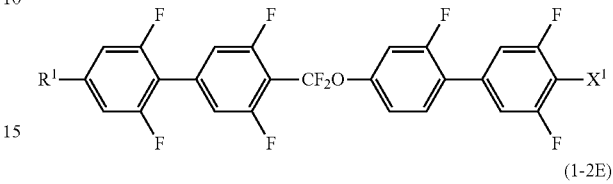

(1-2C)

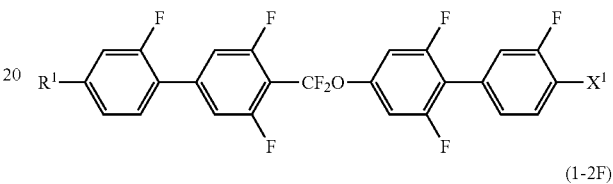

(1-2D)

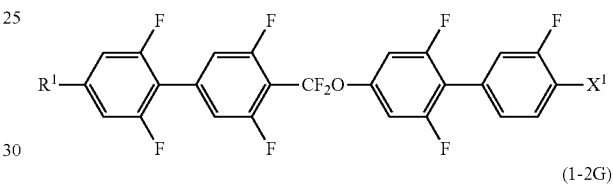

(1-2E)

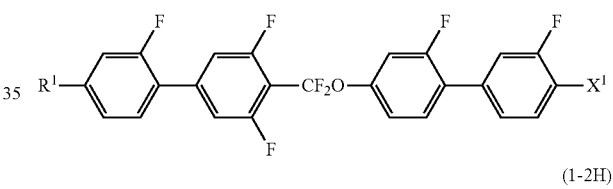

(1-2F)

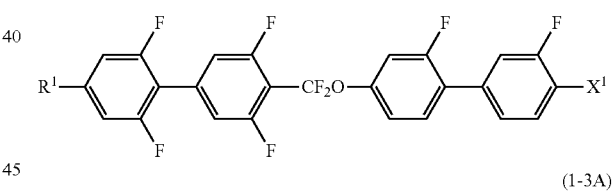

(1-2G)

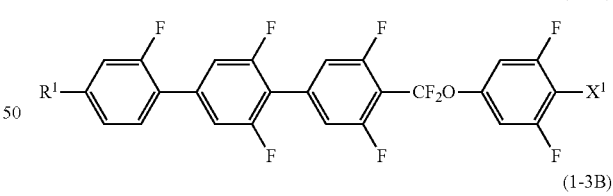

(1-2H)

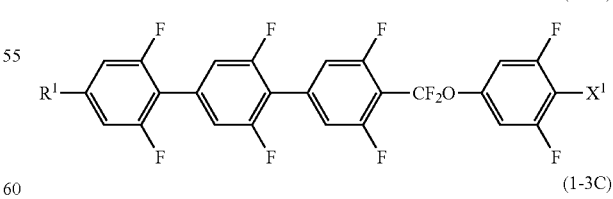

(1-3A)

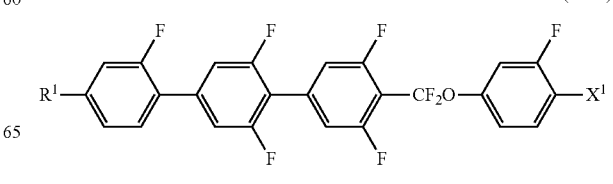

(1-3B)

(1-3C)

(1-3D)

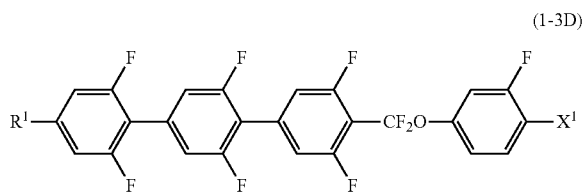

(in the formulas, R$^1$ is a chain selected from Formulas (CHN-1), (CHN-4), (CHN-7), (CHN-8), and (CHN-11); X$^1$ is fluorine, chlorine, —CF$_3$, —CHF$_2$, —CH$_2$F, —OCF$_3$, —OCHF$_2$, —OCF$_2$CFHCF$_3$, or —CH=CHCF$_3$.)

1-4 Synthesis of Compound (1)

Next, the synthesis of Compound (1) is described. Compound (1) may be synthesized by a suitable combination of organic synthesis methods. The methods for introducing target terminal groups, rings, and linking groups into a starting compound are described in, for example, Organic Syntheses John Wiley & Sons, Inc, Organic Reactions, John Wiley & Sons, Inc, Comprehensive Organic Synthesis, Pergamon Press, and New Lectures on Experimental Chemistry (Maruzen).

1-4-2 Methods for Generating Linking Groups Z$^1$-Z$^3$

An example of the methods for generating the linking groups Z$^1$-Z$^3$ in Compound (1) is as shown in a scheme below. In the scheme, MSG$^1$ or MSG$^2$ is monovalent organic group having at least one ring. The multiple MSGs$^1$ (or MSGs$^2$) in the scheme may be identical or different. Compounds (1A)-(1J) are equivalent to Compound (1).

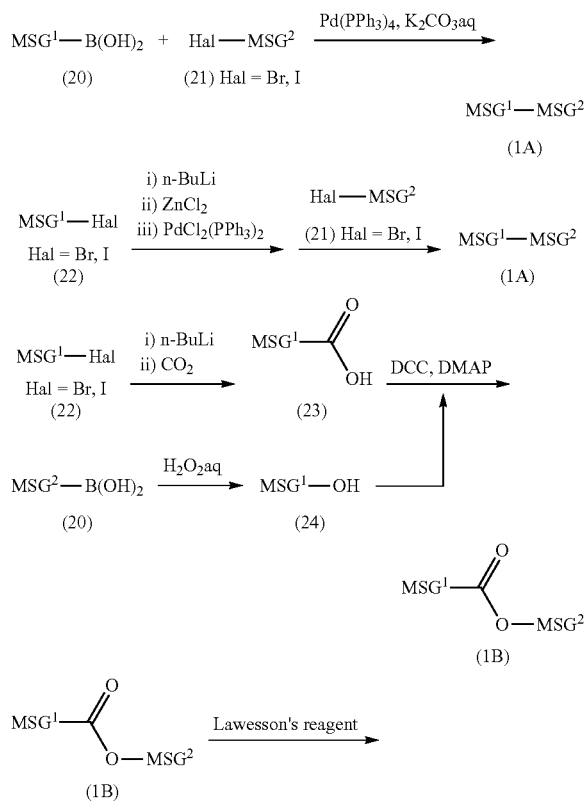

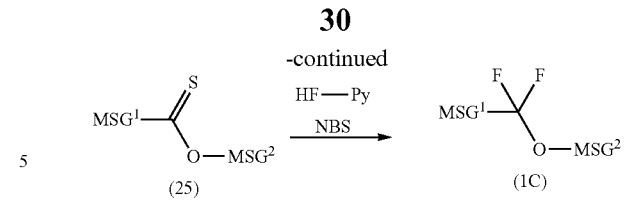

Subsequently, as for the linking groups Z$^1$-Z$^3$ in Compound (1), generation methods of various bonds are described in Sections (I)-(III) below.

(I) Generation of a Single Bond

Arylboronic acid (20) is reacted with Compound (21) synthesized via a well-known process in an aqueous carbonate solution in presence of a catalyst such as tetrakis(triphenylphosphine)palladium, to synthesize Compound (1A). Compound (1A) may also be synthesized by reacting Compound (22) synthesized via a well-known process with n-butyl lithium, then with zinc chloride, and finally with Compound (21) in the presence of a catalyst such as bis(triphenylphosphine)palladium dichloride.

(II) Generation of —COO— and —OCO—

Compound (22) is reacted with n-butyl lithium, and then with carbon dioxide, to obtain a carboxylic acid (23). Compound (23) and phenol (24) synthesized via a well-known process are dehydrated in the presence of 1,3-dicyclohexylcarbodiimide (DCC) and 4-dimethylaminopyridine (DMAP), to synthesize Compound (1B) having —COO—. A compound having —OCO— may also be synthesized through this method.

(III) Generation of —CF$_2$O— and —OCF$_2$—

Compound (1B) is treated with a thionating agent such as Lawesson's Reagent, to obtain Compound (25). Compound (25) is florinated by using hydrogen fluoride pyridine complex and N-bromosuccinimide (NBS), to synthesize Compound (1C) having —CF$_2$O—. See M. Kuroboshi et al., Chem. Lett., 1992, 827. Compound (1C) may also be synthesized by fluorinating Compound (25) with (diethylamino)sulfurtrifluoride (DAST). See W. H. Bunnelle et al., J. Org. Chem. 1990, 55, 768. A compound having —OCF$_2$— may also be synthesized through this method. The linking groups may also be generated by the method described in Peer. Kirsch et al., Angew. Chem. Int. Ed. 2001, 40, 1480.

1-4-4 Methods for Synthesizing Compound (1)

There are many methods for synthesizing the compounds of Formula (1), and they may be synthesized from commercially available reagents, with proper reference to examples in the specification, or documents and books.

1-4-5 Methods for Synthesizing Compound (2)

There are many methods for synthesizing the compounds of Formula (2), and they may be synthesized from commercially available reagents, with proper reference to examples in the specification, or documents and books.

2 Compounds (2)-(18)

A second aspect of the present invention is a liquid crystal composition containing an achiral component T and a chiral reagent, wherein the achiral component T is obtained by adding a component selected from Components B, C, D, and E below into Component A formed of the compound of Formula (1). Compared with a composition with an achiral component T containing Component A alone, the liquid crystal composition may be freely adjusted for the driving voltage, the temperature range of a liquid crystal phase, the refractive index anisotropy value, the dielectric anisotropy value, and viscosity.

The component added into the Component A is preferably obtained by mixing Components B, C, D, or E, where Component B contains at least one compound selected from the group consisting of the compounds of Formula (2), Component C contains at least one compound selected from the group consisting of the compounds of Formulas (3), (4), and (5), Component D contains at least one compound selected from the group consisting of the compounds of Formula (6), and Component E contains at least one compound selected from the group consisting of the compounds of Formulas (7), (8), (9), (10), and (11).

Moreover, by mixing Component F containing at least one compound selected from the group consisting of the compounds of Formulas (12), (13), and (14), the threshold voltage, the temperature range of a liquid crystal phase, the refractive index anisotropy value, the dielectric anisotropy value, and the viscosity may be adjusted.

The component added into the Component A is preferably Component G containing at least one compound selected from the group consisting of the compounds of Formulas (15), (16), and (17), or Component H containing at least one compound selected from the group consisting of the compounds of Formula (18). Components G and H are especially useful for improving the refractive index anisotropy value and the dielectric anisotropy value.

Moreover, for each component of the liquid crystal composition used in the present invention, an analogue containing isotopes of each element may be used, because no significant difference in physical properties exists.

In Component B above, preferred examples of the compound of Formula (2) include Formulas (2-1)-(2-9).

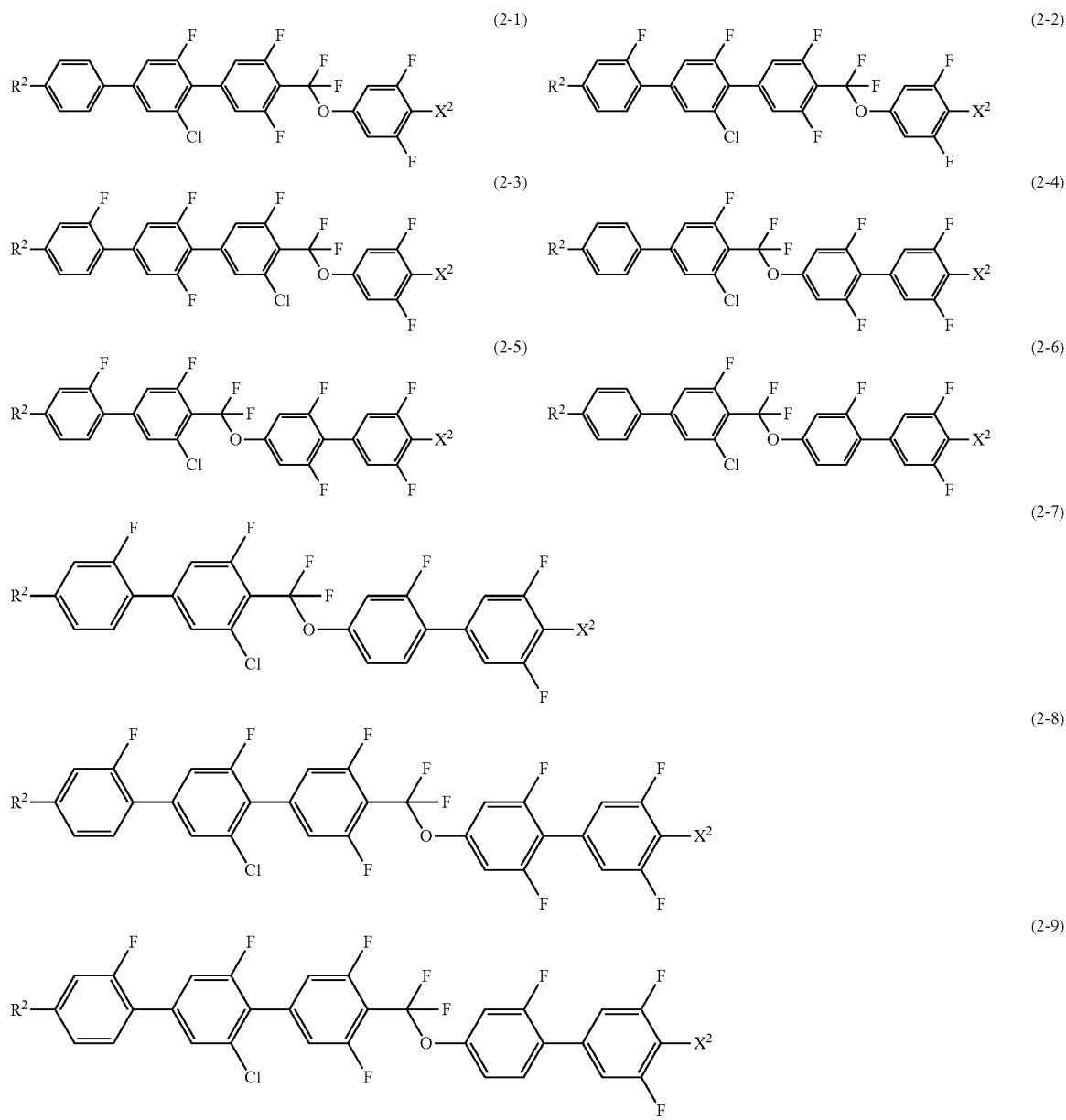

(in the formulas, $R^2$ and $X^2$ have the same meaning as $R^2$ and $X^2$ in Formula (2).)

In Component C, preferred examples of the compound of Formula (3) include Formulas (3-1)-(3-16), preferred examples of the compound of Formula (4) include Formulas (4-1)-(4-112), and preferred examples of the compound of Formula (5) include Formulas (5-1)-(5-52).
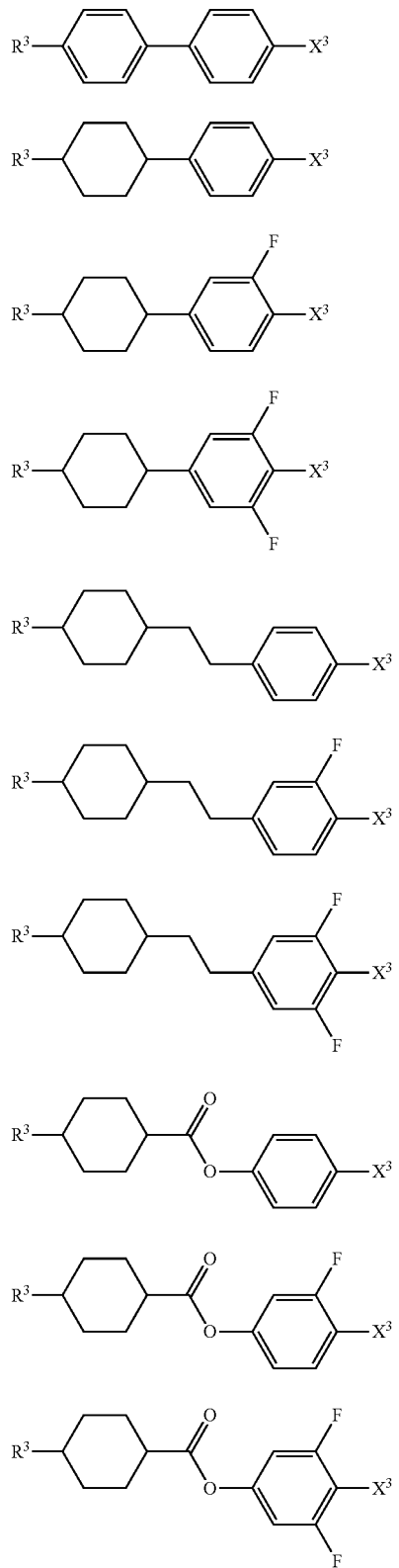
-continued
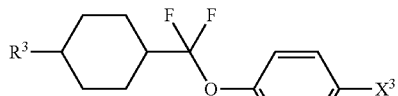
(3-11)
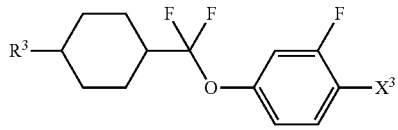
(3-12)
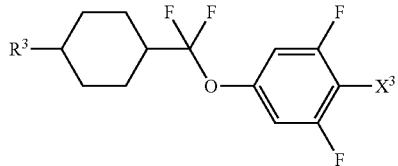
(3-13)
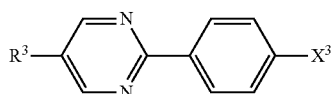
(3-14)
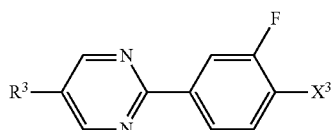
(3-15)
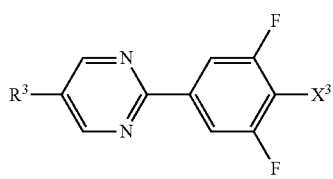
(3-16)
(4-1)
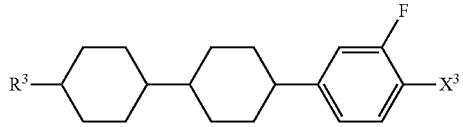
(4-2)
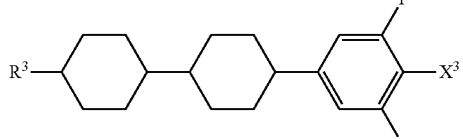
(4-3)
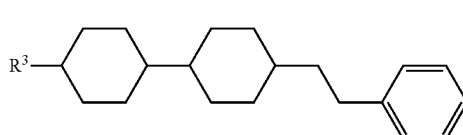
(4-4)
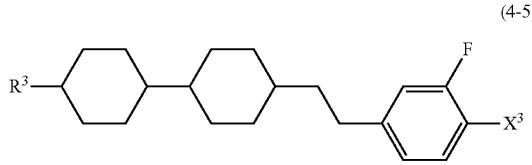
(4-5)

(4-6)
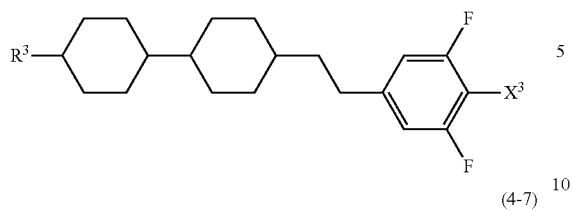
(4-7)
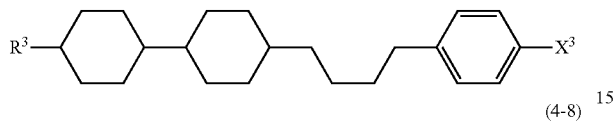
(4-8)
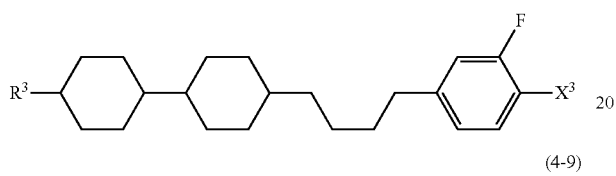
(4-9)
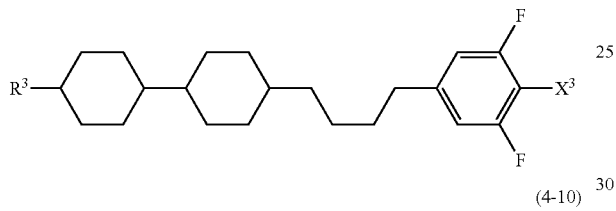
(4-10)
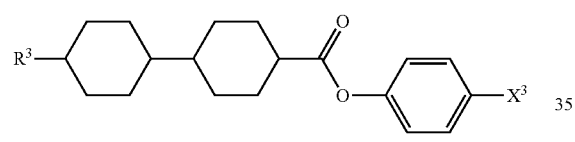
(4-11)
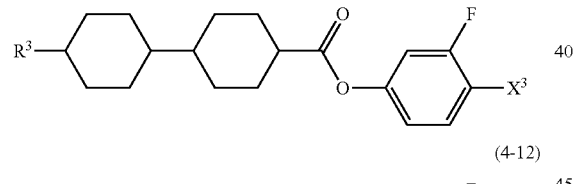
(4-12)
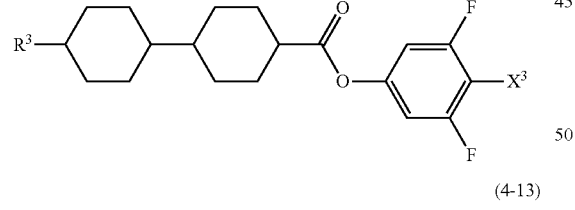
(4-13)
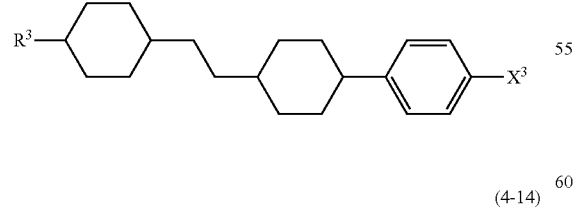
(4-14)
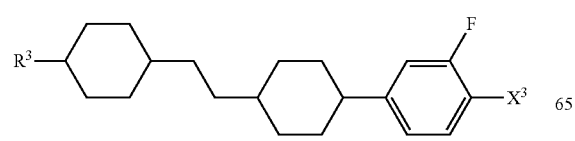
(4-15)
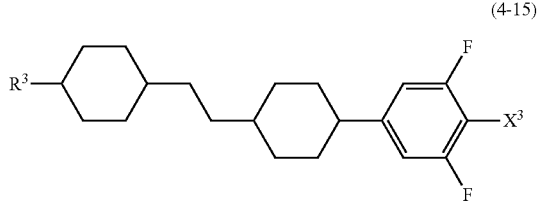
(4-16)
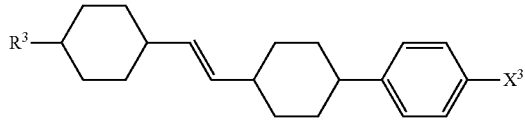
(4-17)
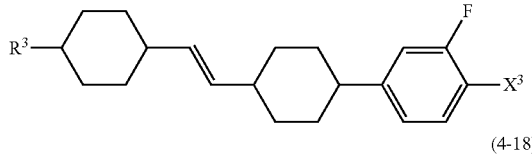
(4-18)
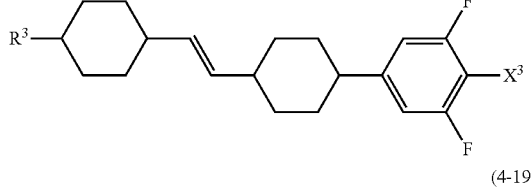
(4-19)
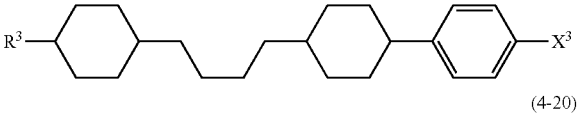
(4-20)
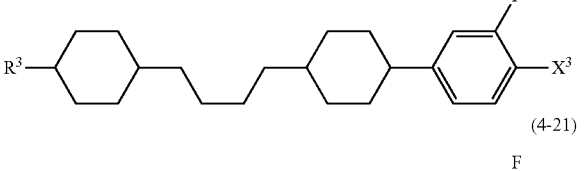
(4-21)
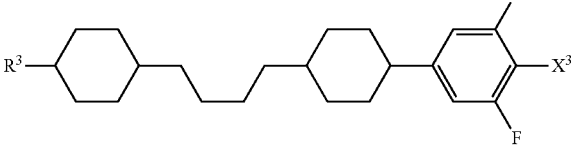
(4-22)
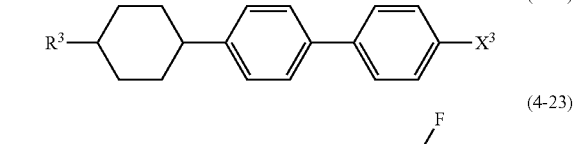
(4-23)
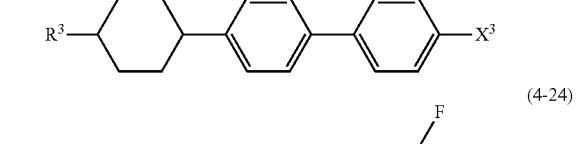
(4-24)

(4-25) 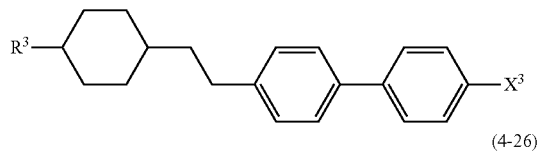
(4-26) 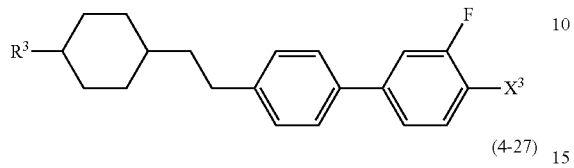
(4-27) 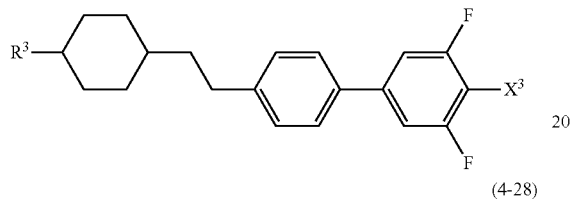
(4-28) 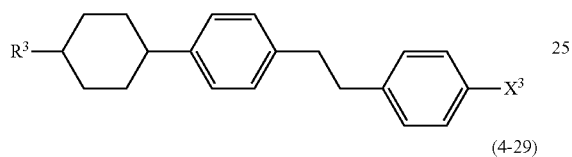
(4-29) 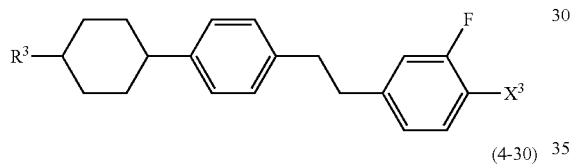
(4-30) 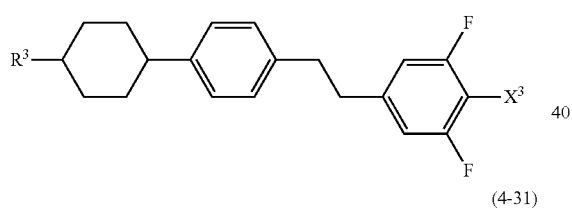
(4-31) 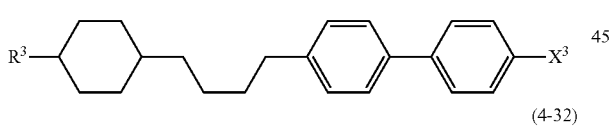
(4-32) 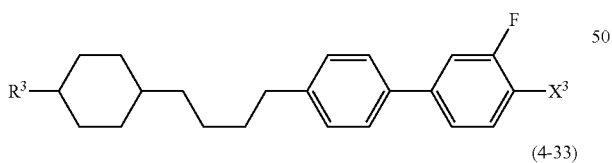
(4-33) 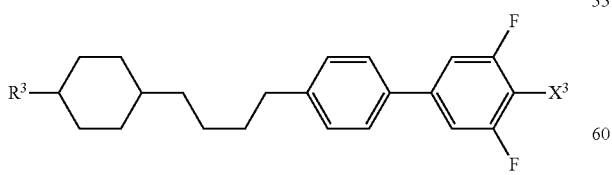
(4-34) 
(4-35) 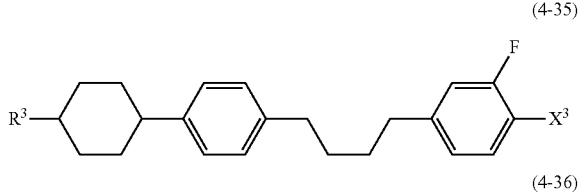
(4-36) 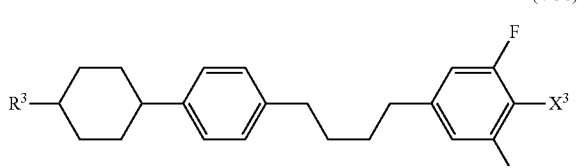
(4-37) 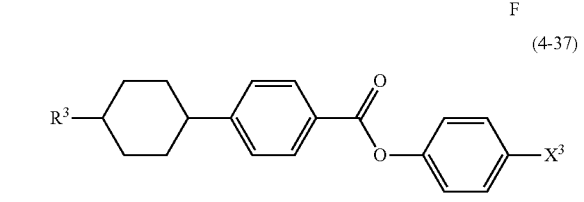
(4-38) 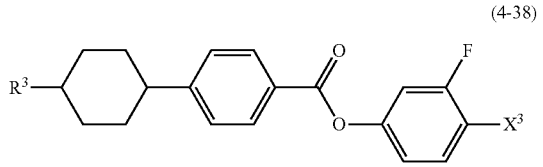
(4-39) 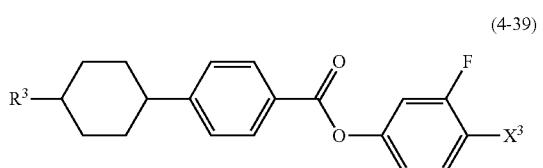
(4-40) 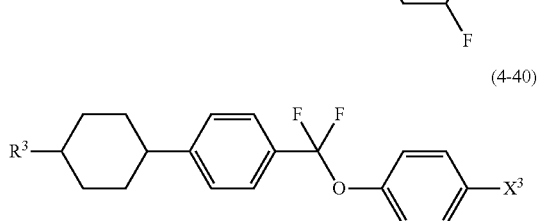
(4-41) 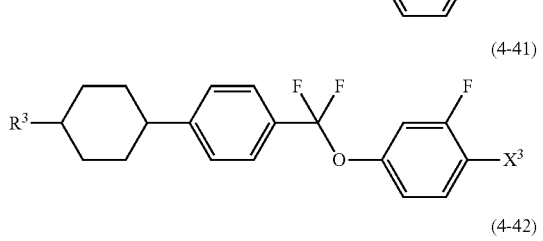
(4-42) 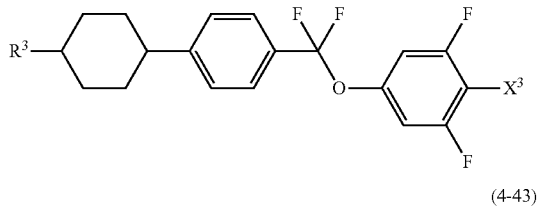
(4-43) 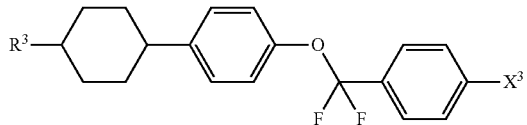

(4-44) 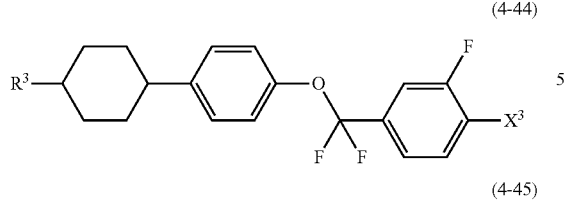
(4-45) 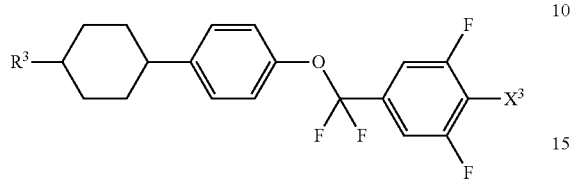
(4-46) 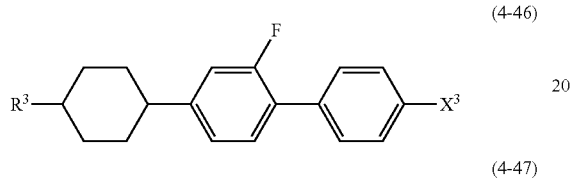
(4-47) 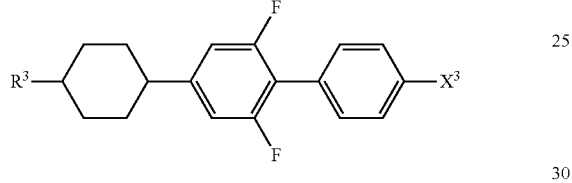
(4-48) 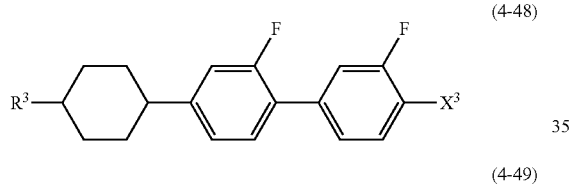
(4-49) 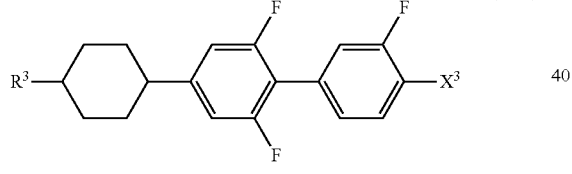
(4-50) 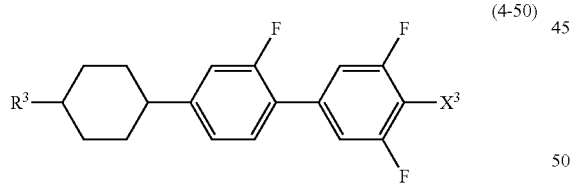
(4-51) 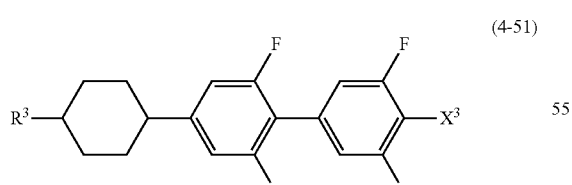
(4-52) 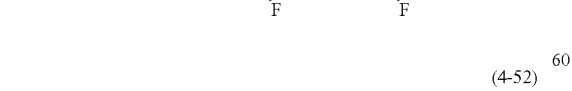
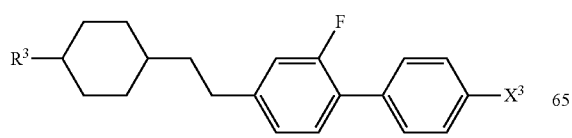
(4-53) 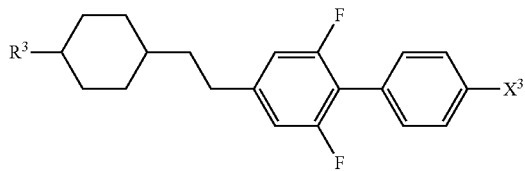
(4-54) 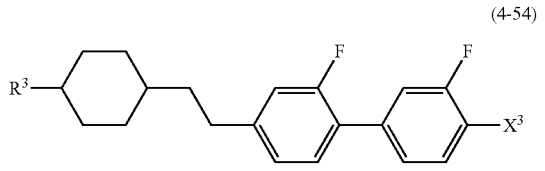
(4-55) 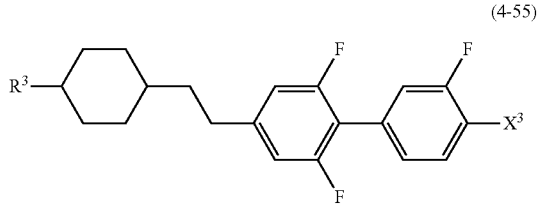
(4-56) 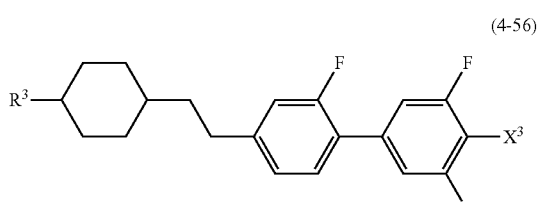
(4-57) 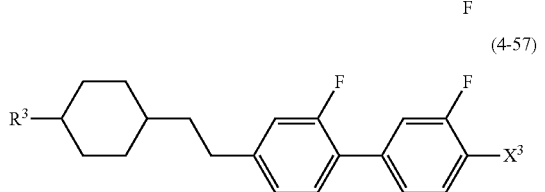
(4-58)
(4-59) 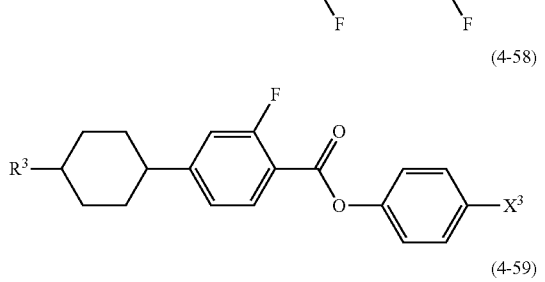
(4-60) 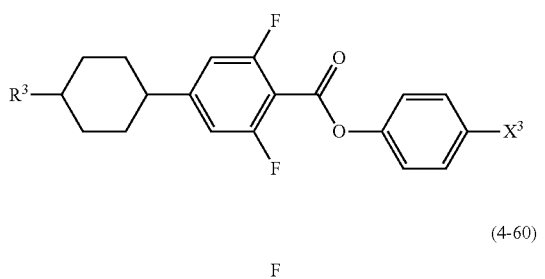

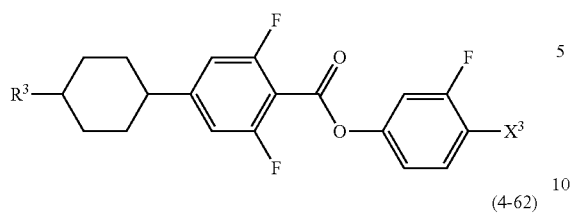 (4-61)
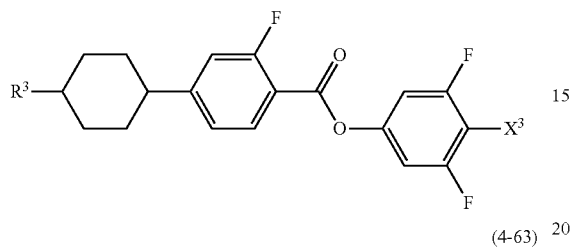 (4-62)
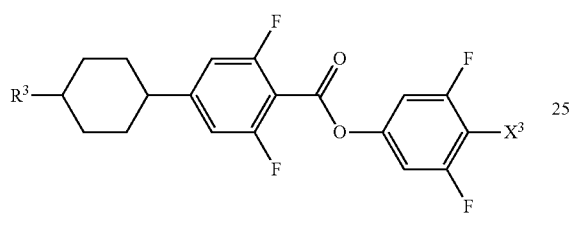 (4-63)
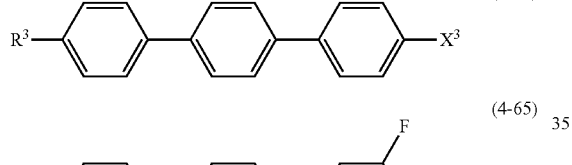 (4-64)
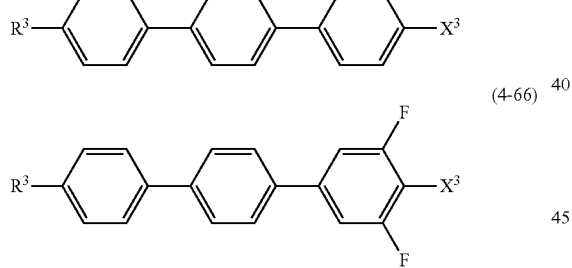 (4-65)
(4-66)
(4-67)
(4-68)
(4-69)
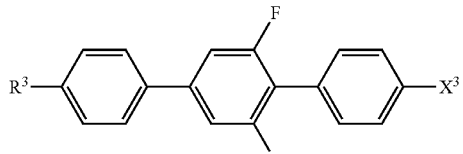 (4-70)
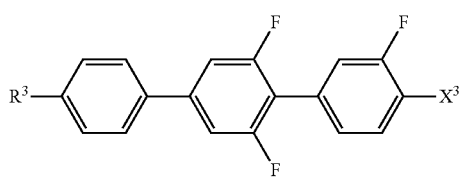 (4-71)
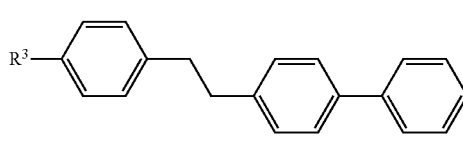 (4-72)
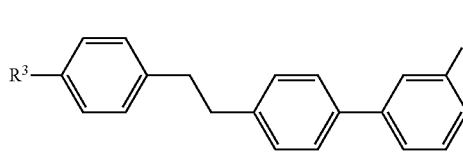 (4-73)
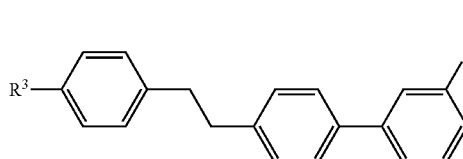 (4-74)
 (4-75)
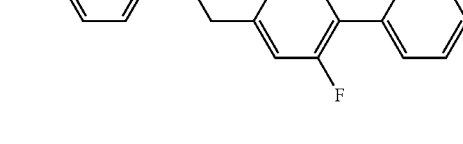 (4-76)
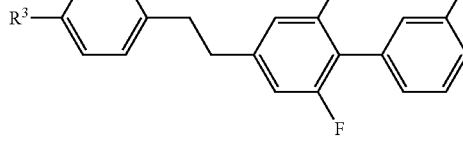 (4-77)
(4-78)

(4-79) 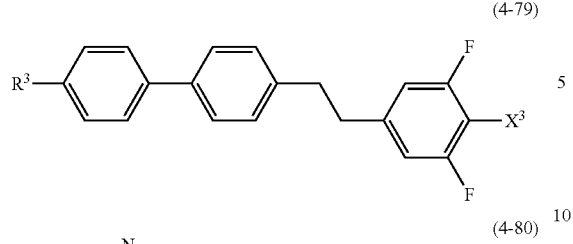
(4-80) 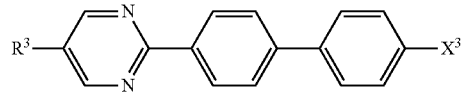
(4-81) 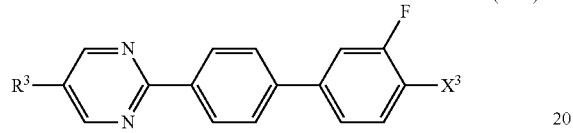
(4-82) 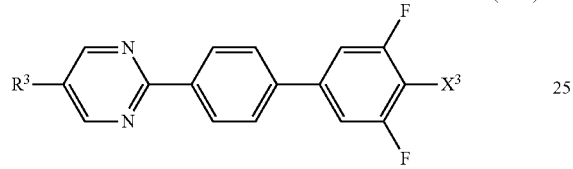
(4-83) 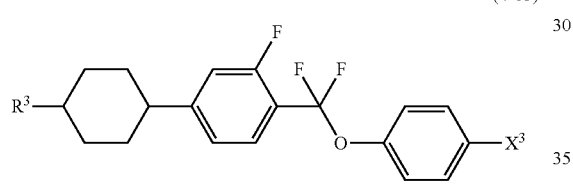
(4-84) 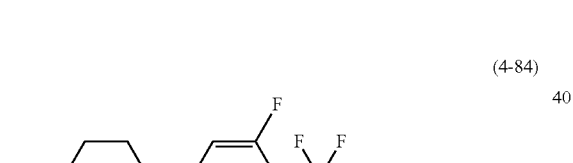
(4-85) 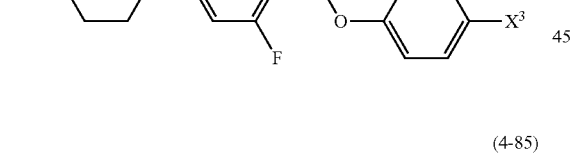
(4-86) 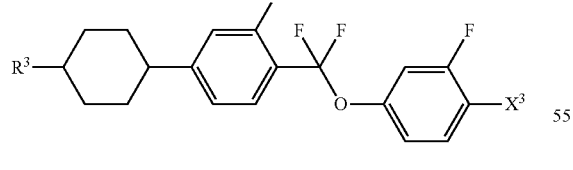
(4-87) 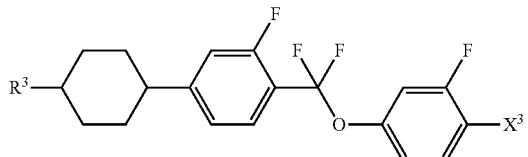
(4-88) 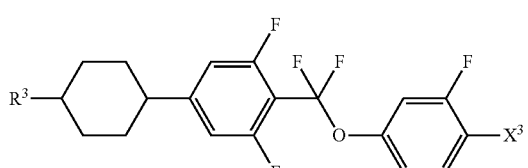
(4-89) 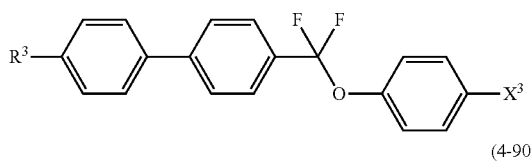
(4-90) 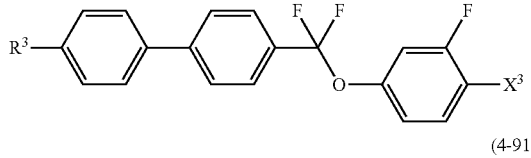
(4-91) 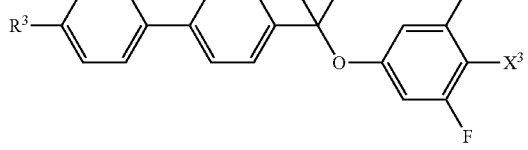
(4-92) 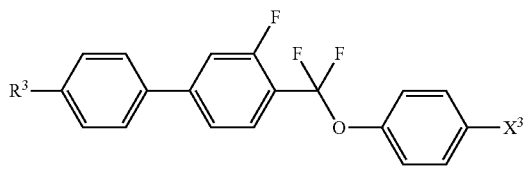
(4-93) 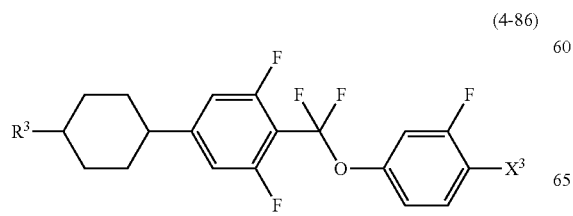
(4-94) 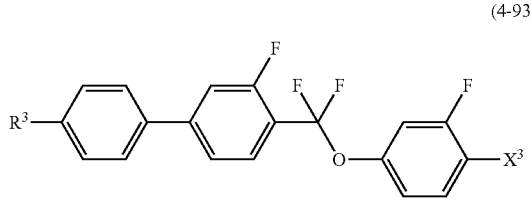

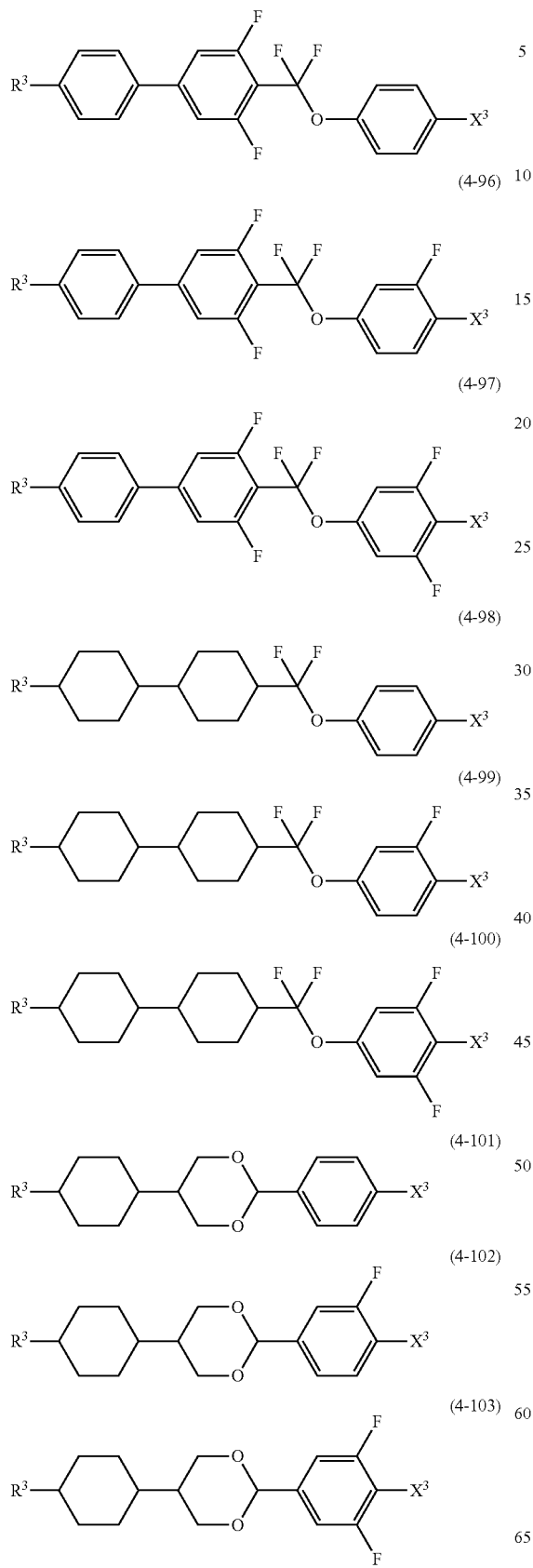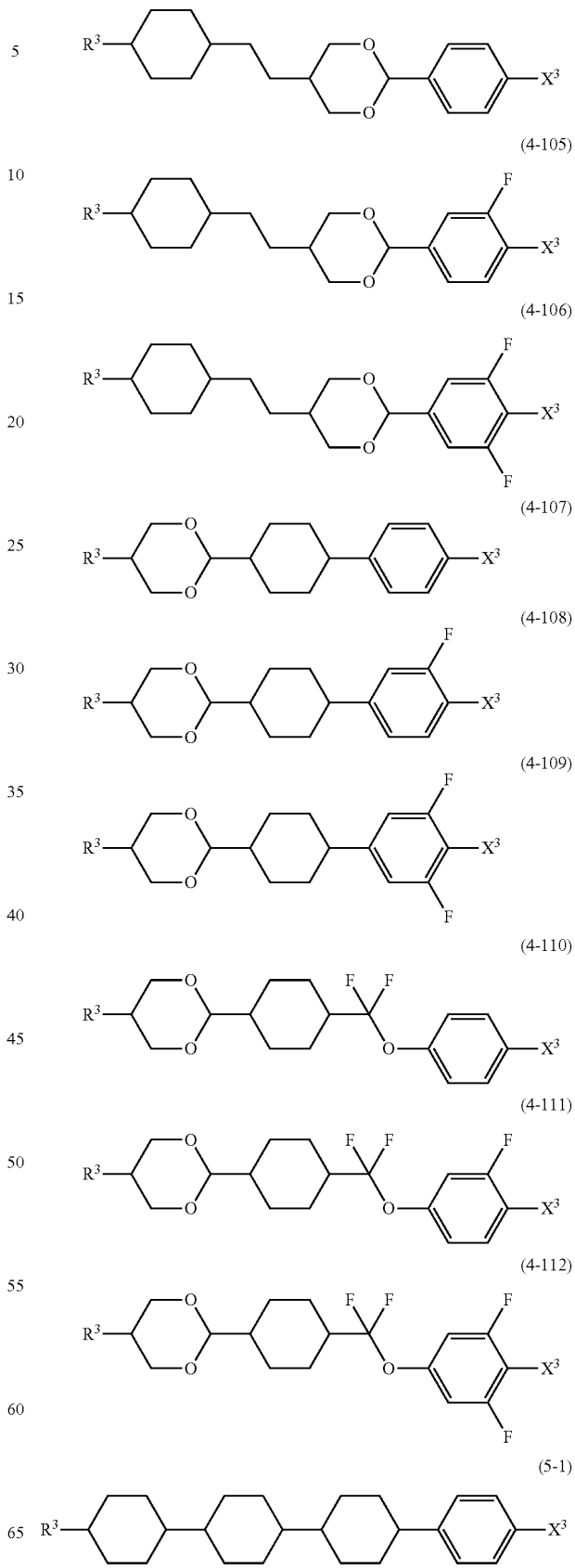

(5-2)
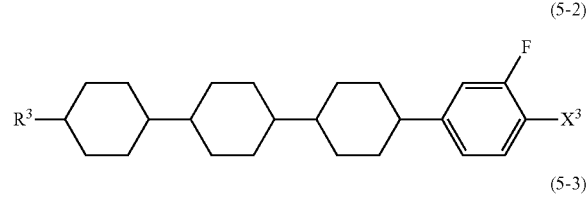
(5-3)
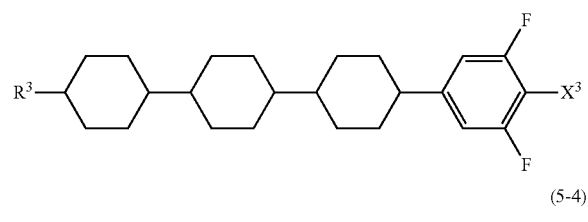
(5-4)
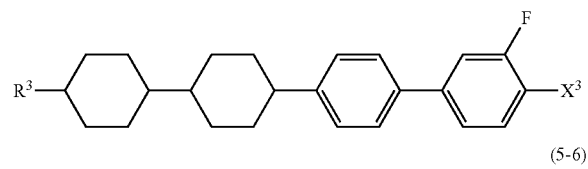
(5-5)
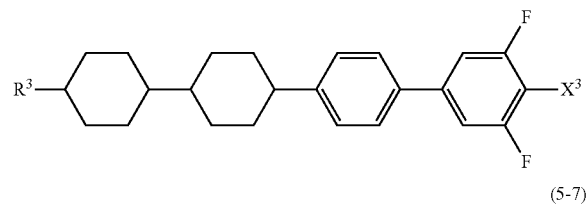
(5-6)
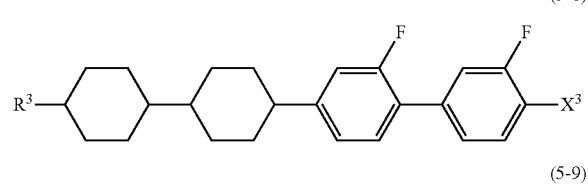
(5-7)
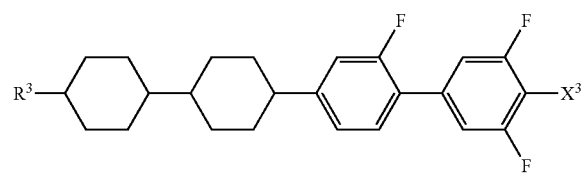
(5-8)
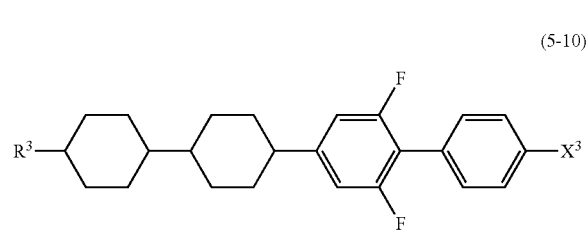
(5-9)
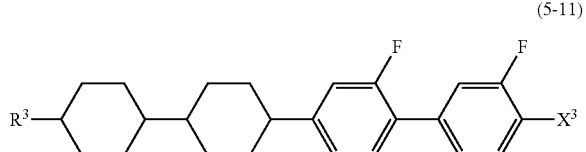
(5-10)
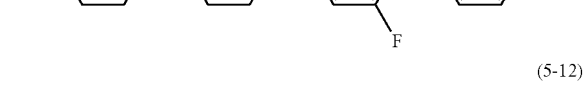
(5-11)
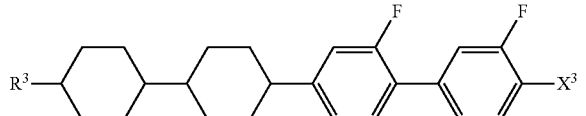
(5-12)
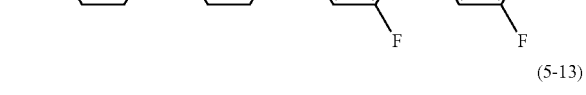
(5-13)
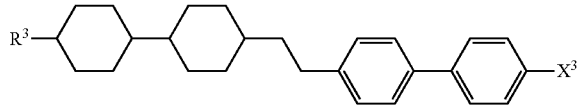
(5-14)
(5-15)
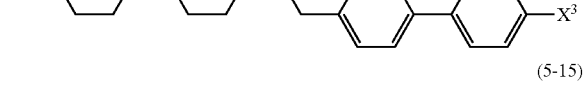
(5-16)
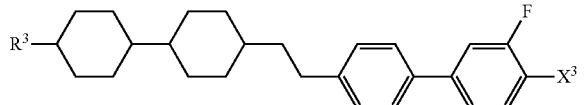
(5-17)
(5-18)
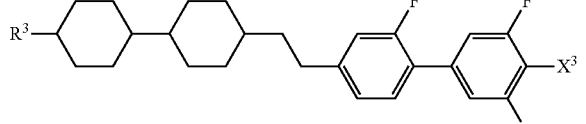
(5-19)

(5-20)
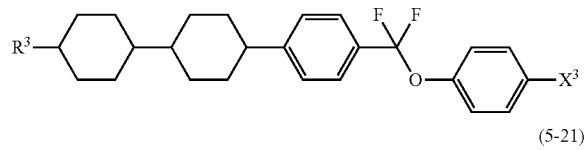
(5-21)
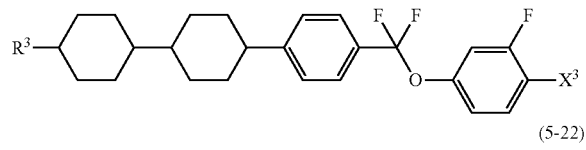
(5-22)
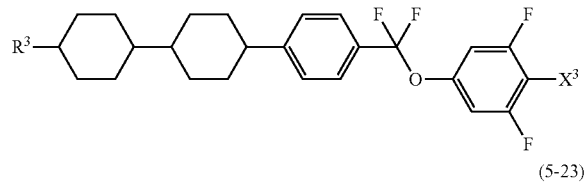
(5-23)
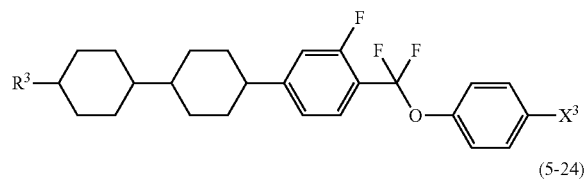
(5-24)
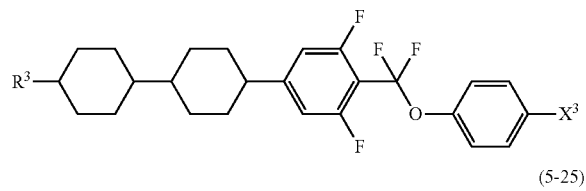
(5-25)
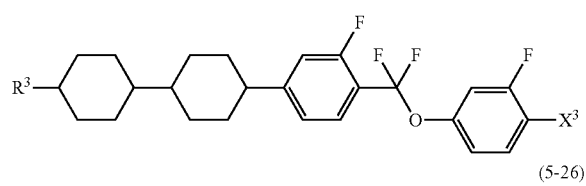
(5-26)
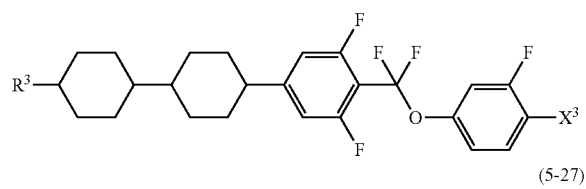
(5-27)
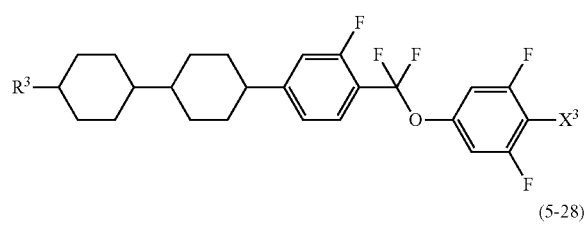
(5-28)
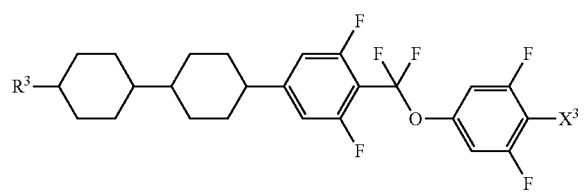
(5-29)
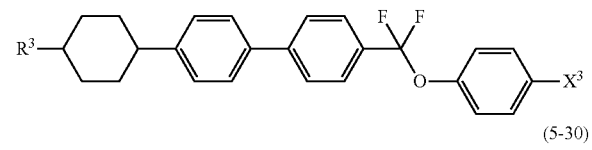
(5-30)
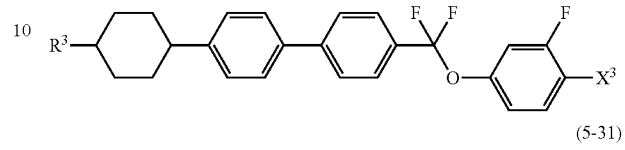
(5-31)
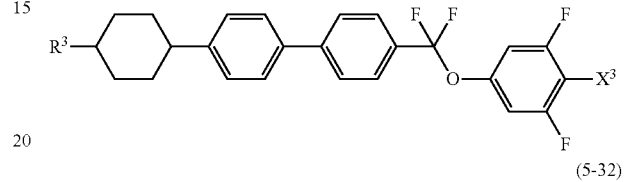
(5-32)
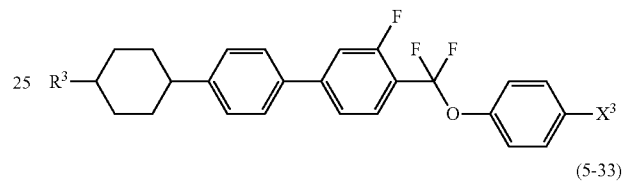
(5-33)
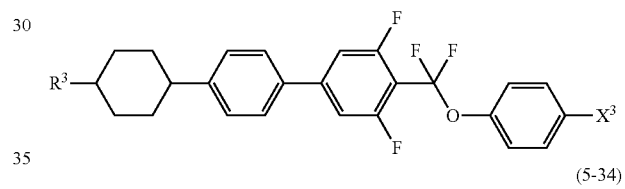
(5-34)
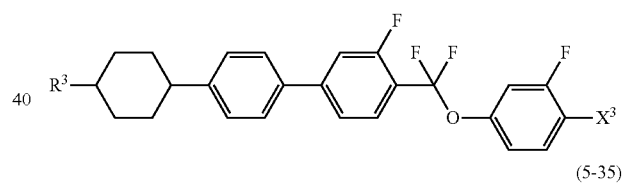
(5-35)
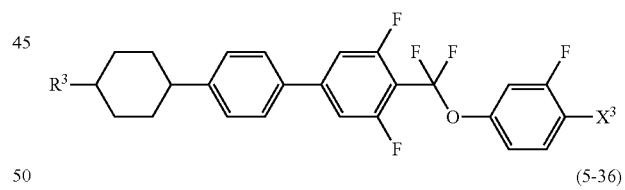
(5-36)
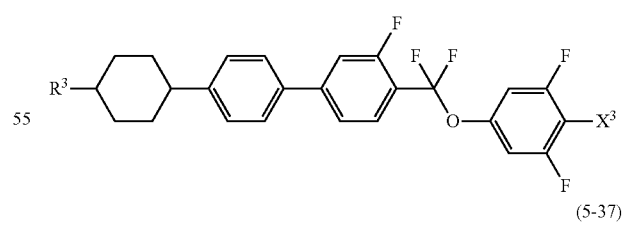
(5-37)
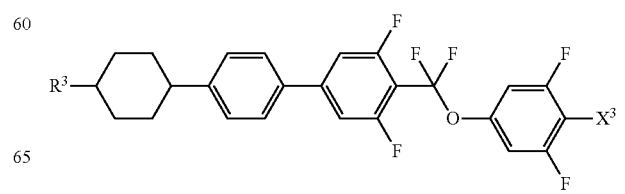

(5-38) 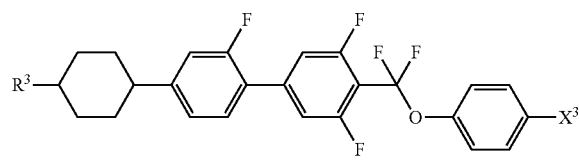

(5-39) 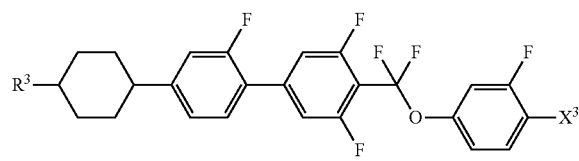

(5-40) 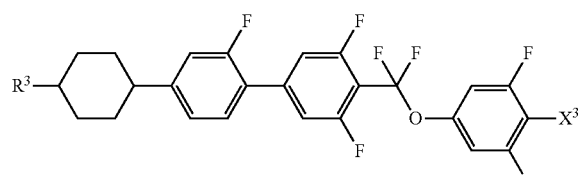

(5-41) 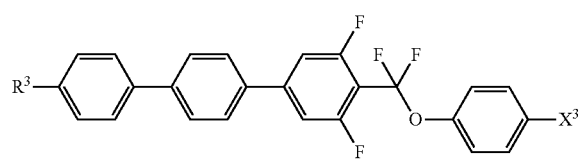

(5-42) 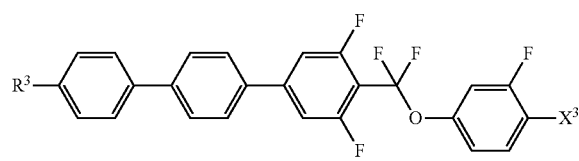

(5-43) 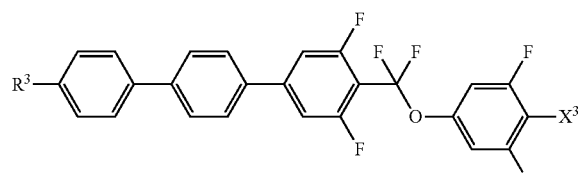

(5-44) 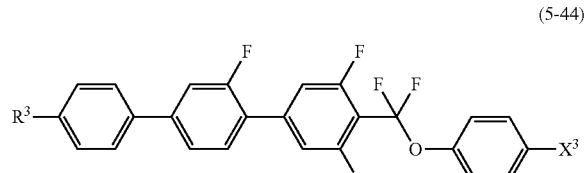

(5-45) 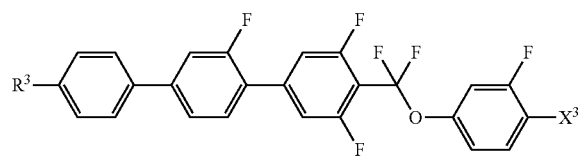

(5-46) 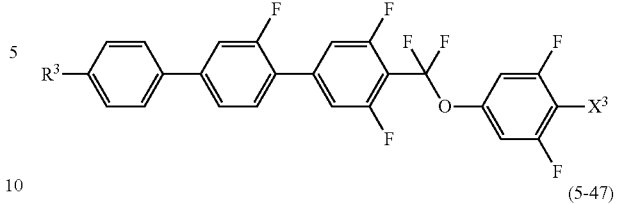

(5-47) 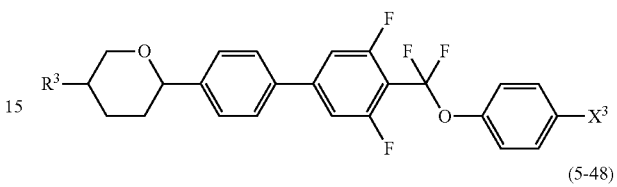

(5-48) 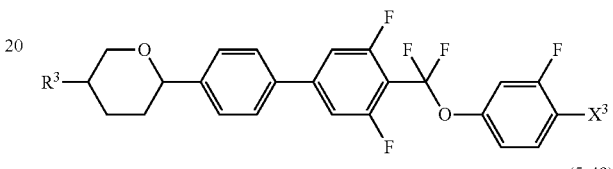

(5-49) 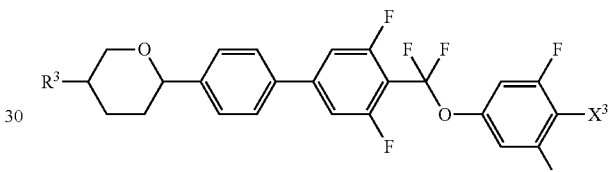

(5-50) 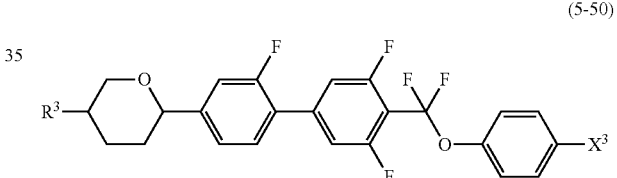

(5-51) 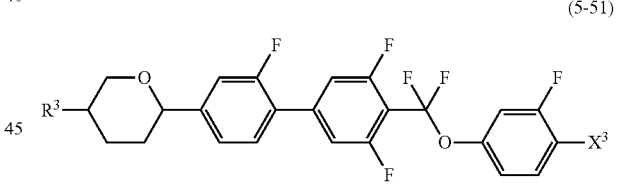

(5-52) 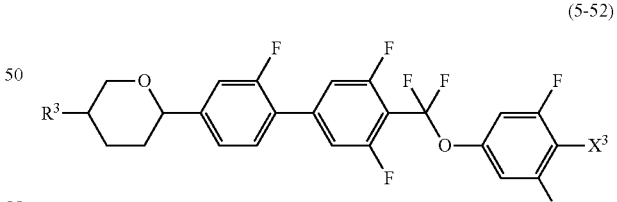

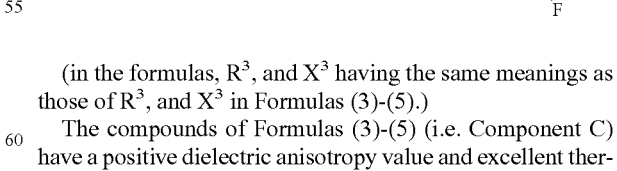

(in the formulas, $R^3$, and $X^3$ having the same meanings as those of $R^3$, and $X^3$ in Formulas (3)-(5).)

The compounds of Formulas (3)-(5) (i.e. Component C) have a positive dielectric anisotropy value and excellent thermal or chemical stability, and thus are useful for preparing a liquid crystal composition for TFTs. Based on the total weight of the liquid crystal composition of the present invention, the content of Component C in the liquid crystal composition of the present invention is suitably in a range of 1-99 wt %, preferably 1-60 wt %, and more preferably 1-35 wt %.

Furthermore, by further containing the compounds of Formulas (12)-(14) (i.e., Component F), the viscosity may be adjusted.
Preferred examples of the compound of Formula (6) (i.e. Component D) include Formulas (6-1)-(6-62).
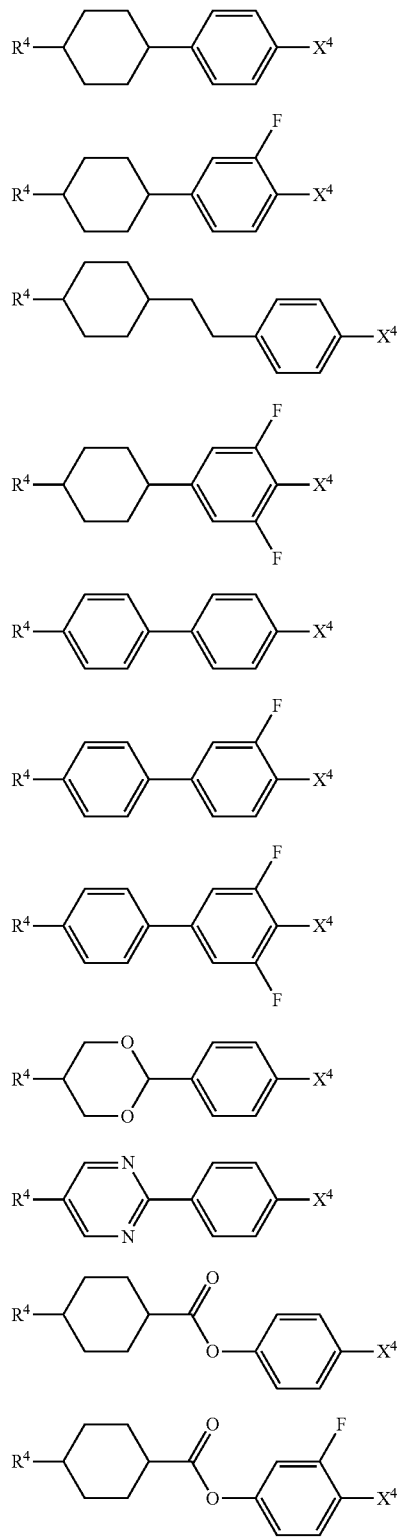
(6-1)
(6-2)
(6-3)
(6-4)
(6-5)
(6-6)
(6-7)
(6-8)
(6-9)
(6-10)
(6-11)
-continued
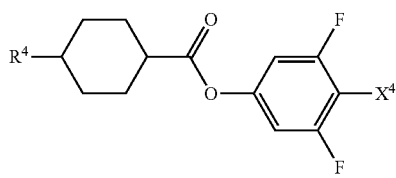
(6-12)
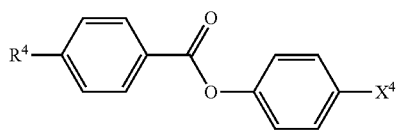
(6-13)
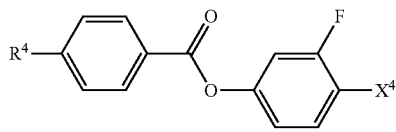
(6-14)
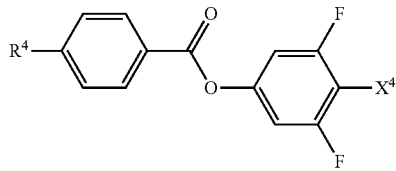
(6-15)
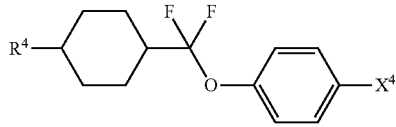
(6-16)
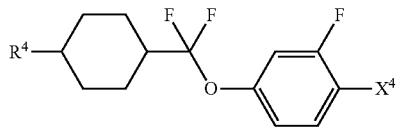
(6-17)
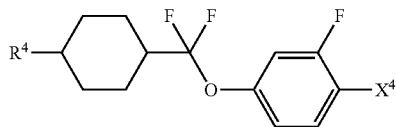
(6-18)
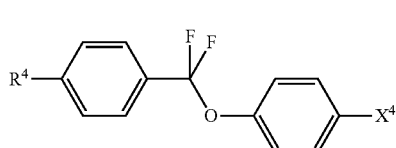
(6-19)
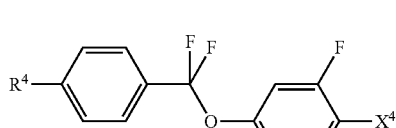
(6-20)
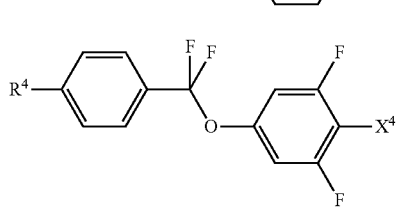
(6-21)

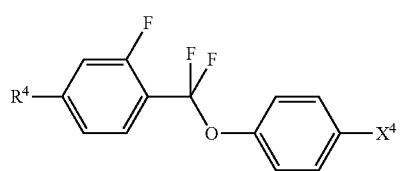 (6-22)
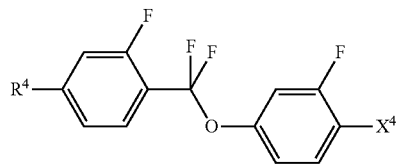 (6-23)
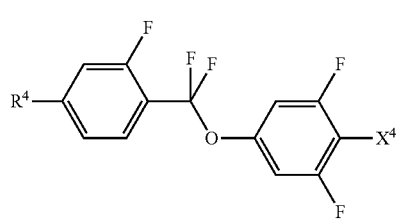 (6-24)
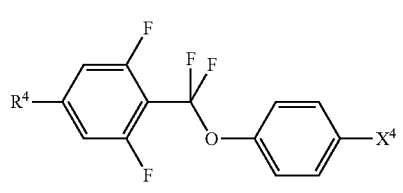 (6-25)
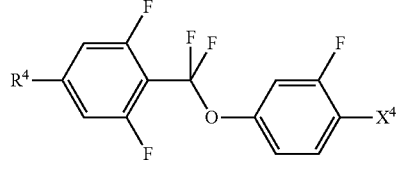 (6-26)
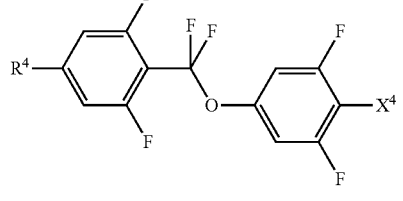 (6-27)
 (6-28)
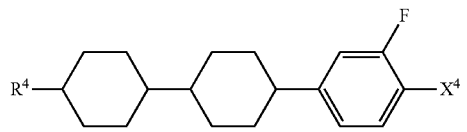 (6-29)
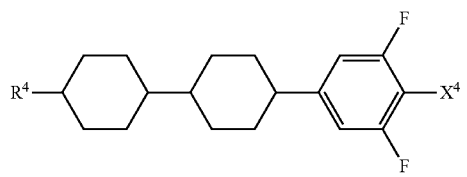 (6-30)
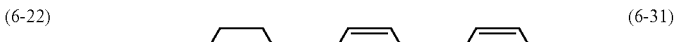 (6-31)
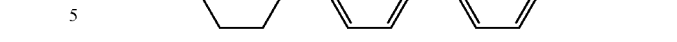 (6-32)
 (6-33)
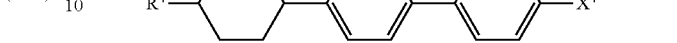 (6-34)
 (6-35)
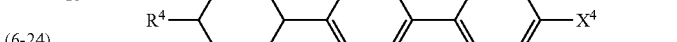 (6-36)
 (6-37)
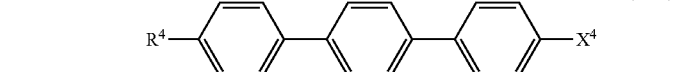 (6-38)
 (6-39)
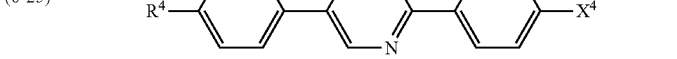 (6-40)

(6-41) 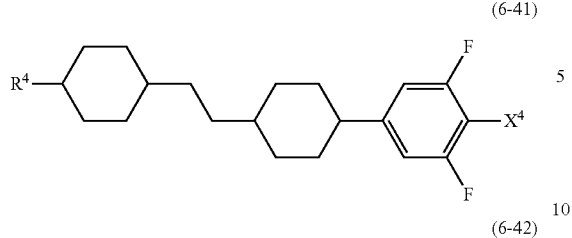
(6-42) 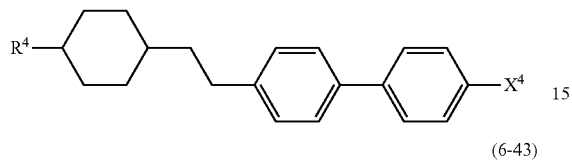
(6-43) 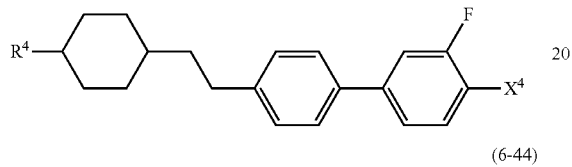
(6-44) 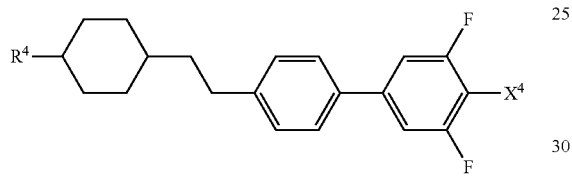
(6-45) 
(6-46) 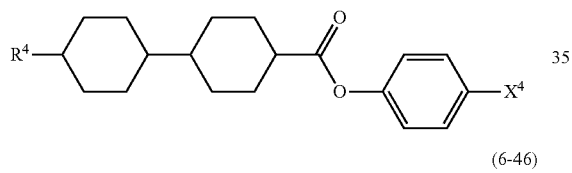
(6-47) 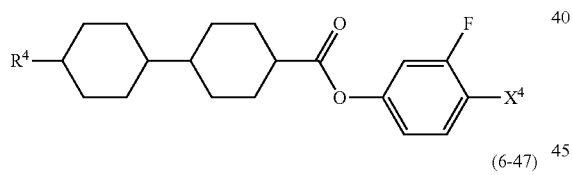
(6-48) 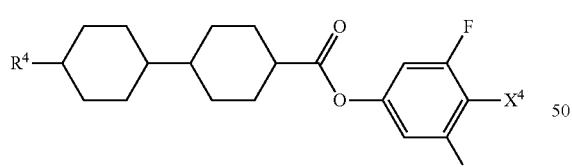
(6-49) 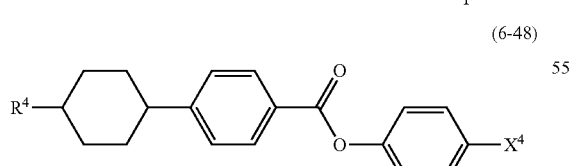
(6-50) 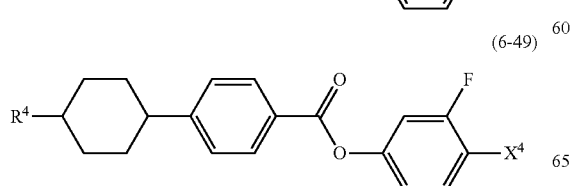
(6-51) 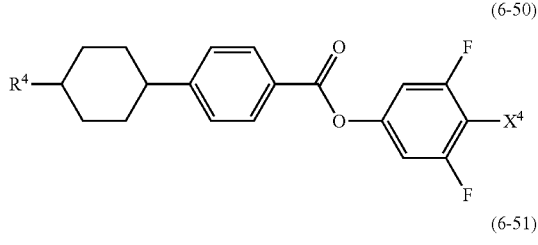
(6-52) 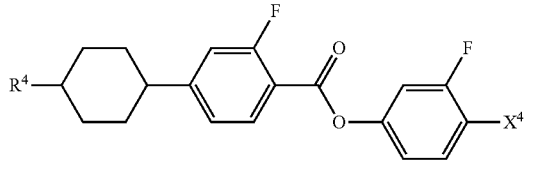
(6-53) 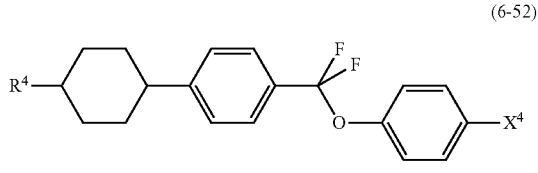
(6-54) 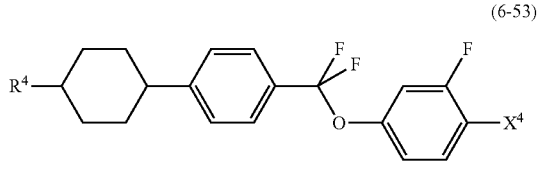
(6-55) 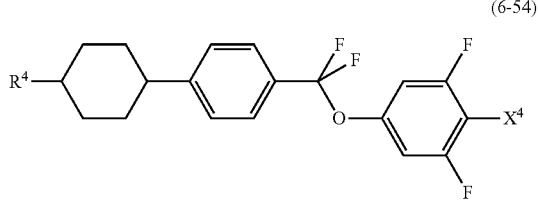
(6-56) 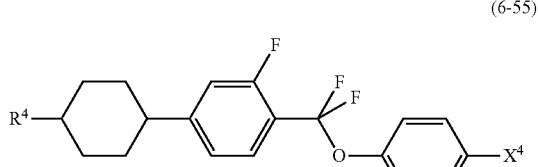
(6-57) 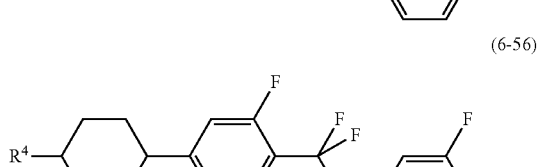

(6-58)
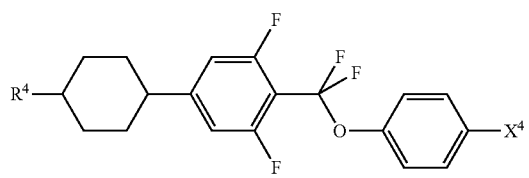

(6-59)
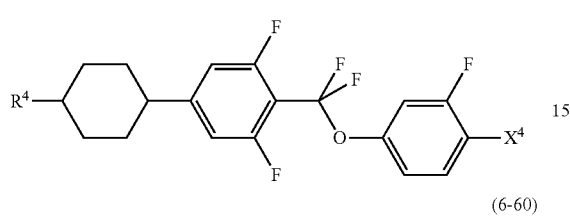

(6-60)
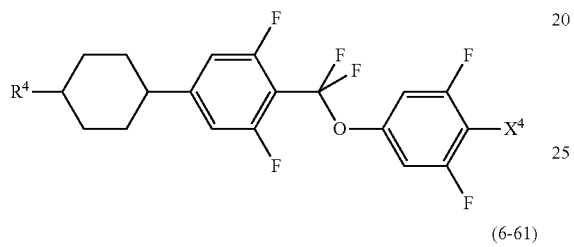

(6-61)
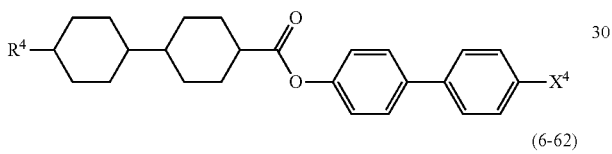

(6-62)
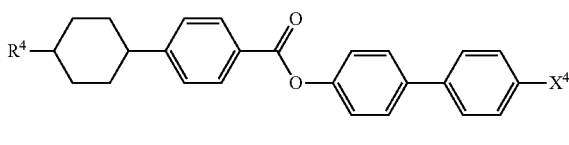

(in the formulas, $R^4$ and $X^4$ have the same meanings as those of $R^4$ and $X^4$ in Formula (6).)

The compounds of Formula (6) (i.e., Component D) have a positive and very large dielectric anisotropy value. By containing Component D, the driving voltage of the composition is lowered. In addition, the viscosity and refractive index anisotropy value can be adjusted, and the temperature range of a liquid crystal phase can be expanded.

Based on the total weight of the composition, the content of Component D is preferably 0.1-99.9 wt %, more preferably 1-97 wt %, and still more preferably 1-30 wt %. Furthermore, by mixing the components below, the threshold voltage, the temperature range of a liquid crystal phase, the refractive index anisotropy value, dielectric anisotropy value, and the viscosity may be adjusted.

Component E containing at least one compound selected from the group consisting of the compounds of Formulas (7)-(11) is a preferred component for preparing the liquid crystal composition of the present invention having a negative dielectric anisotropy value.

Preferred examples of the compounds of Formulas (7)-(11) (Component E) are respectively Formulas (7-1)-(7-5), Formulas (8-1)-(8-9), Formulas (9-1)-(9-3), and Formulas (11-1)-(11-11).

(7-1)
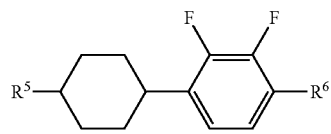

(7-2)
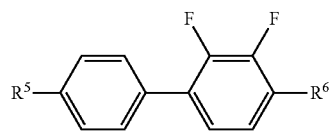

(7-3)
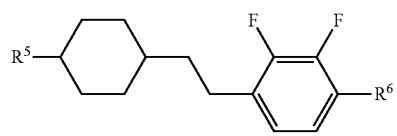

(7-4)
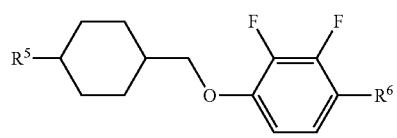

(7-5)
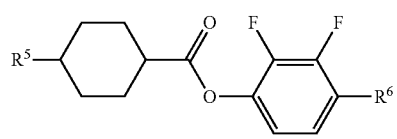

(8-1)
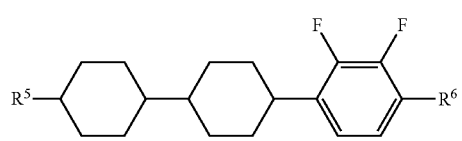

(8-2)
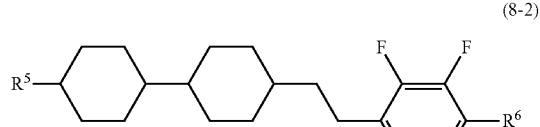

(8-3)
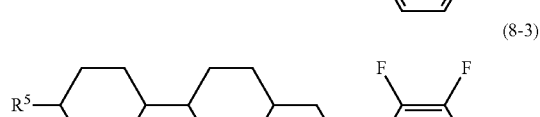

(8-4)

(8-5)
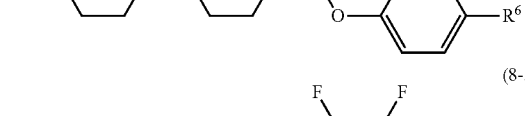

(8-6)
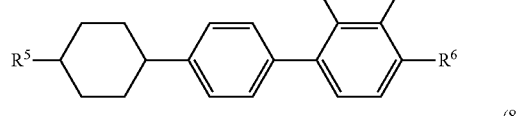

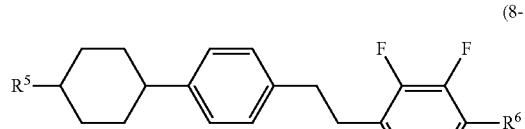

-continued

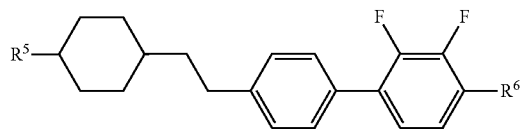
(8-7)

(8-8)

(8-9)

(9-1)

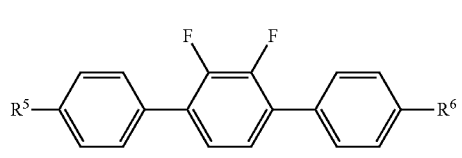
(9-2)

(9-3)

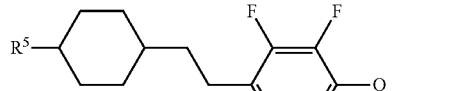
(11-1)

(11-2)

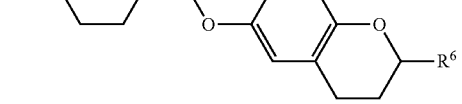
(11-3)

(11-4)

-continued

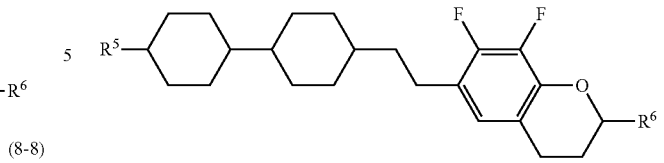
(11-5)

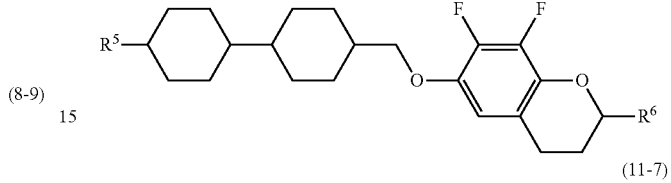
(11-6)

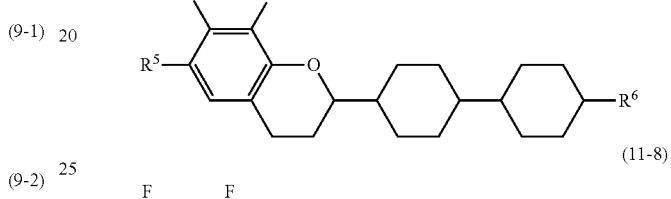
(11-7)

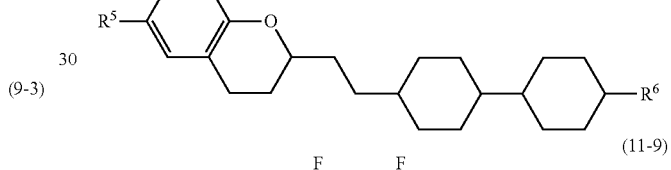
(11-8)

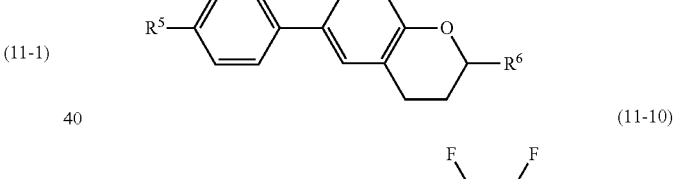
(11-9)

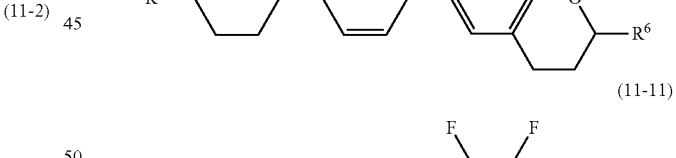
(11-10)

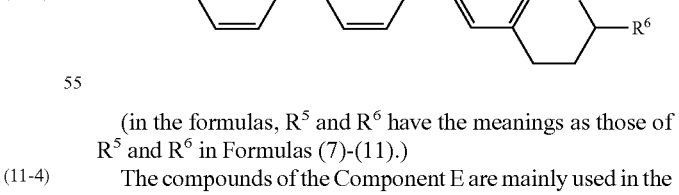
(11-11)

(in the formulas, $R^5$ and $R^6$ have the meanings as those of $R^5$ and $R^6$ in Formulas (7)-(11).)

The compounds of the Component E are mainly used in the liquid crystal compositions having a negative dielectric anisotropy value. In Component E, the compound of Formula (7) is a bicyclic compound, thereby mainly having the effect of adjusting the threshold voltage, the viscosity, or the refractive index anisotropy value. Furthermore, the compounds of Formulas (8) and (9) are tricyclic compounds, thereby having the effect of increasing the clearing point, expanding the temperature range of an optically isotropic liquid crystal phase, and increasing the refractive index anisotropy value. The compounds of Formulas (10) and (11) have a negative and large dielectric anisotropy value, thereby mainly having the effect of adjusting the driving voltage.

In preparing a composition having a negative dielectric anisotropy value, the content of Component E is preferably higher than or equal to 40 wt %, and more preferably in the range of 50 wt %-95 wt %, based on the total weight of the composition. Furthermore, by mixing Component E, the elastic constant and the voltage-transmittance curve of the composition may be controlled. When mixing Component E into a composition having a positive dielectric anisotropy value, the content of Component E is preferably lower than or equal to 30 wt %, based on the total weight of the composition.

Preferred examples of the compounds of Formulas (12), (13), and (14) (Component F) include respectively Formulas (12-1)-(12-11), Formulas (13-1)-(13-18), and Formulas (14-1)-(14-6).

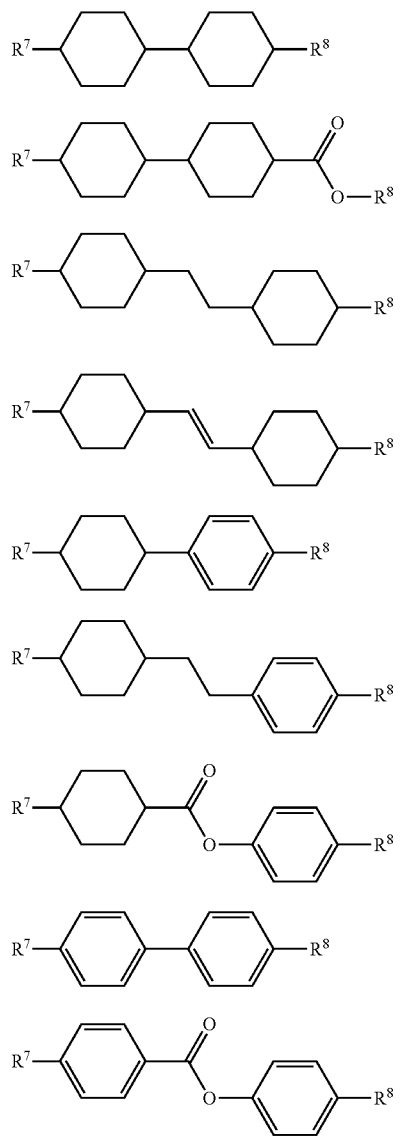

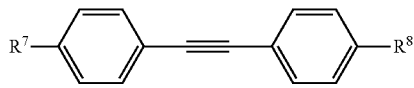
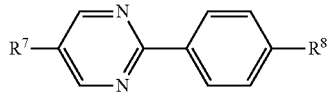
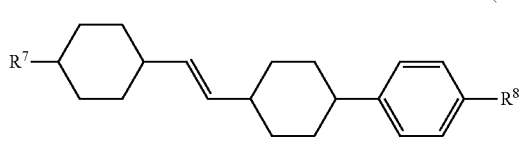
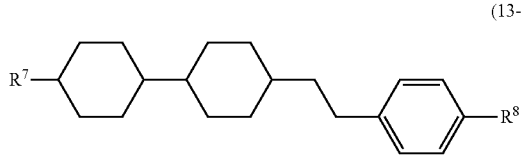
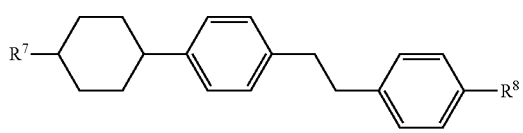
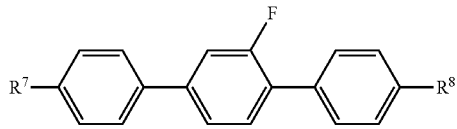
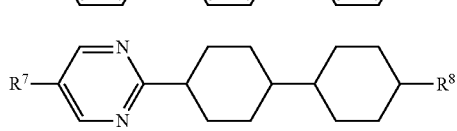
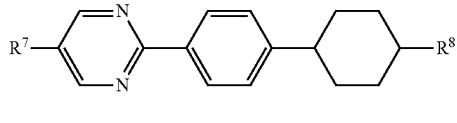
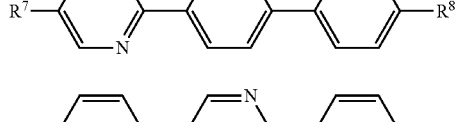
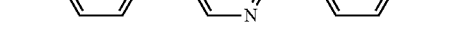

(13-12)
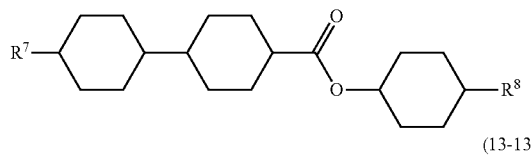

(13-13)
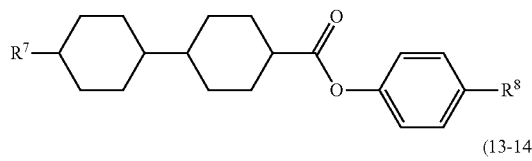

(13-14)
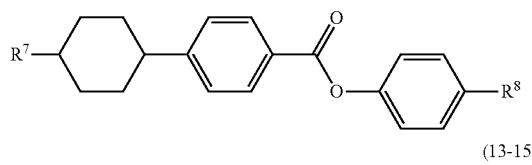

(13-15)
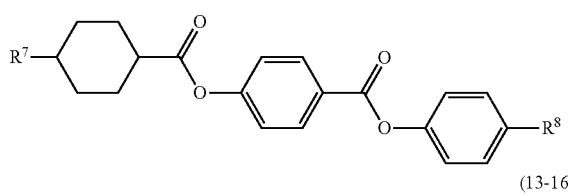

(13-16)
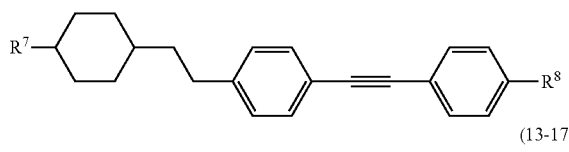

(13-17)
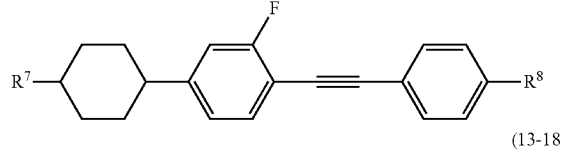

(13-18)
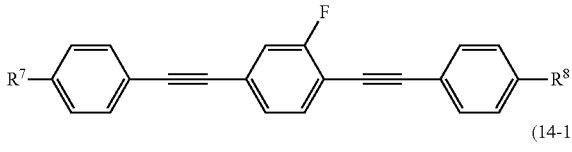

(14-1)
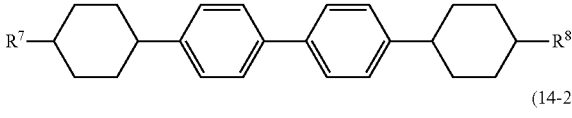

(14-2)
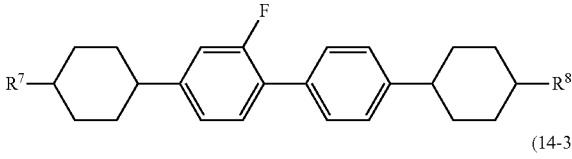

(14-3)
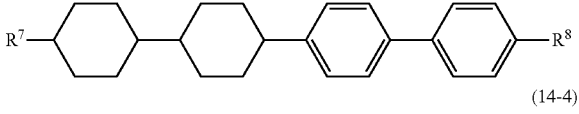

(14-4)

(14-5)
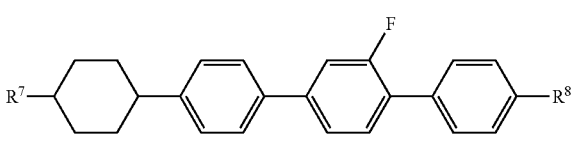

(14-6)
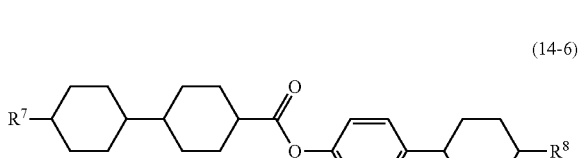

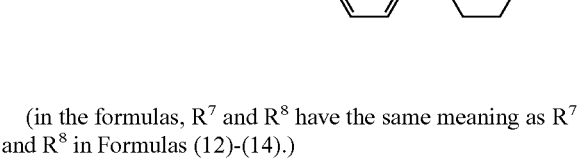

(in the formulas, $R^7$ and $R^8$ have the same meaning as $R^7$ and $R^8$ in Formulas (12)-(14).)

The compounds of Formulas (12)-(14) (Component F) are compounds having a low absolute value of dielectric anisotropy, and are nearly neutral. The compounds of Formula (12) mainly have the effect of adjusting the viscosity or the refractive index anisotropy value. Furthermore, the compounds of Formulas (13) and (14) have the effect of increasing the clearing point and expanding the temperature range of an optically isotropic liquid crystal phase, or the effect of adjusting the refractive index anisotropy value.

If the content of the compounds of Component F is increased, the driving voltage of the liquid crystal composition is raised, and the viscosity is lowered. Therefore, the content of the compounds of Component E is expected to be as high as possible, provided that the desired driving voltage of the liquid crystal composition is met. In preparing a liquid crystal composition for a TFT, the content of Component F is preferably 60 wt % or less, and more preferably 40 wt % or less, based on the total weight of the composition.

3 Compound (15)-Compound (19)

A third aspect of the present invention is a liquid crystal composition obtained by adding a component selected from Components G and H below into Component A.

The component added into Component A is preferably obtained by mixing Component G or H, where Component G contains at least one compound selected from the group consisting of the compounds of Formulas (15), (16), (17), and (18), and Component H contains at least one compound selected from the group consisting of the compounds of Formulas (19).

Moreover, for each component of the liquid crystal composition of the present invention, an analogue containing isotopes of each element also can be used, because no significant difference in physical properties exists.

In Component G, preferred examples of the compounds of Formula (15) include Formulas (15-1)-(15-8), preferred examples of the compounds of Formula (16) include Formulas (16-1)-(16-26), preferred examples of the compounds of Formula (17) include Formulas (17-1)-(17-13), and preferred examples of the compounds of Formula (18) include Formulas (18-1)-(18-12). Formulas (17-7), and (17-8) have the effect of expanding the temperature range at a low temperature side.

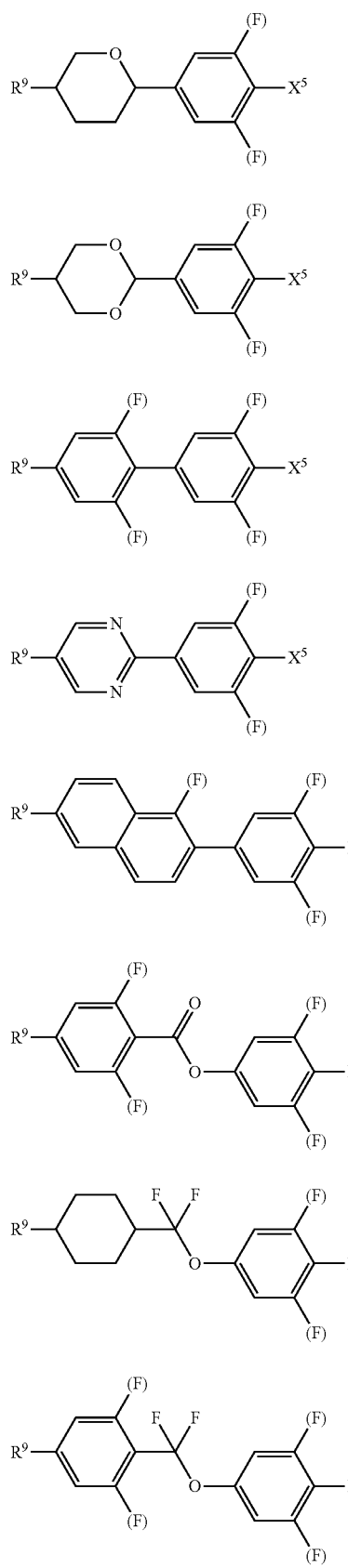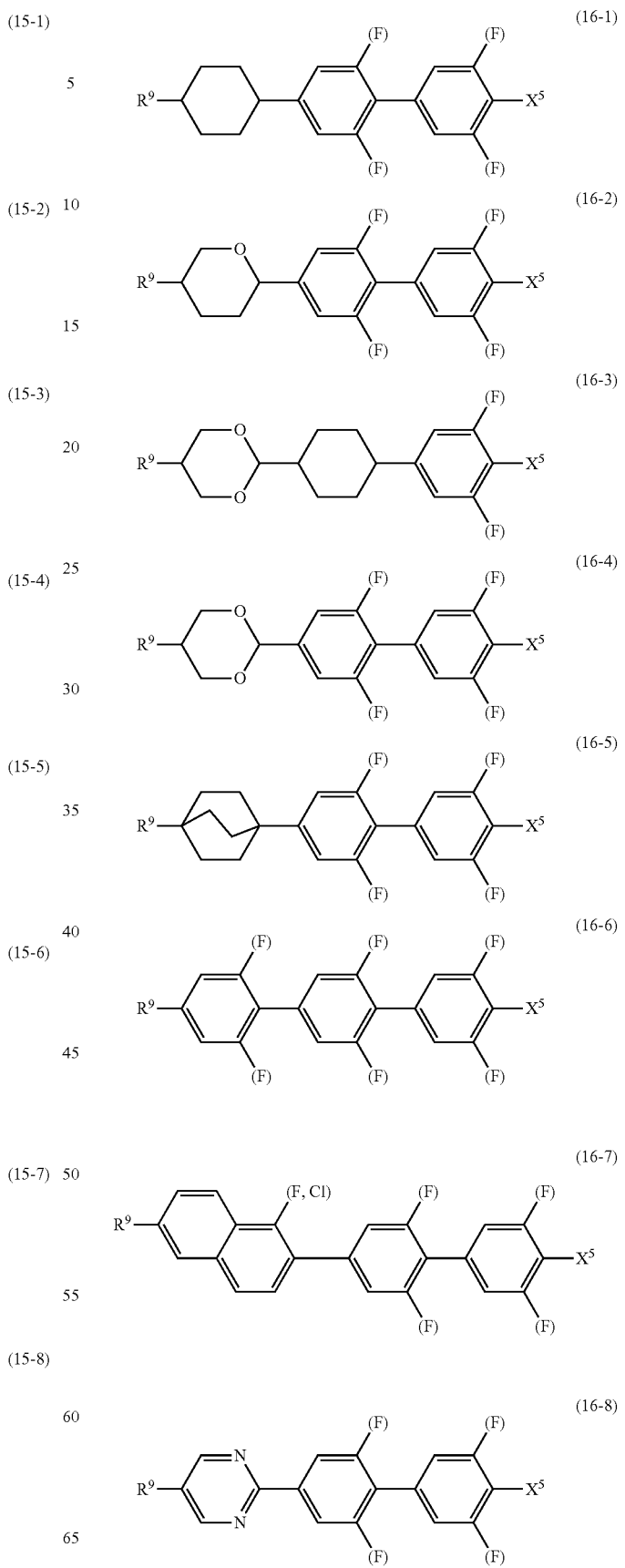

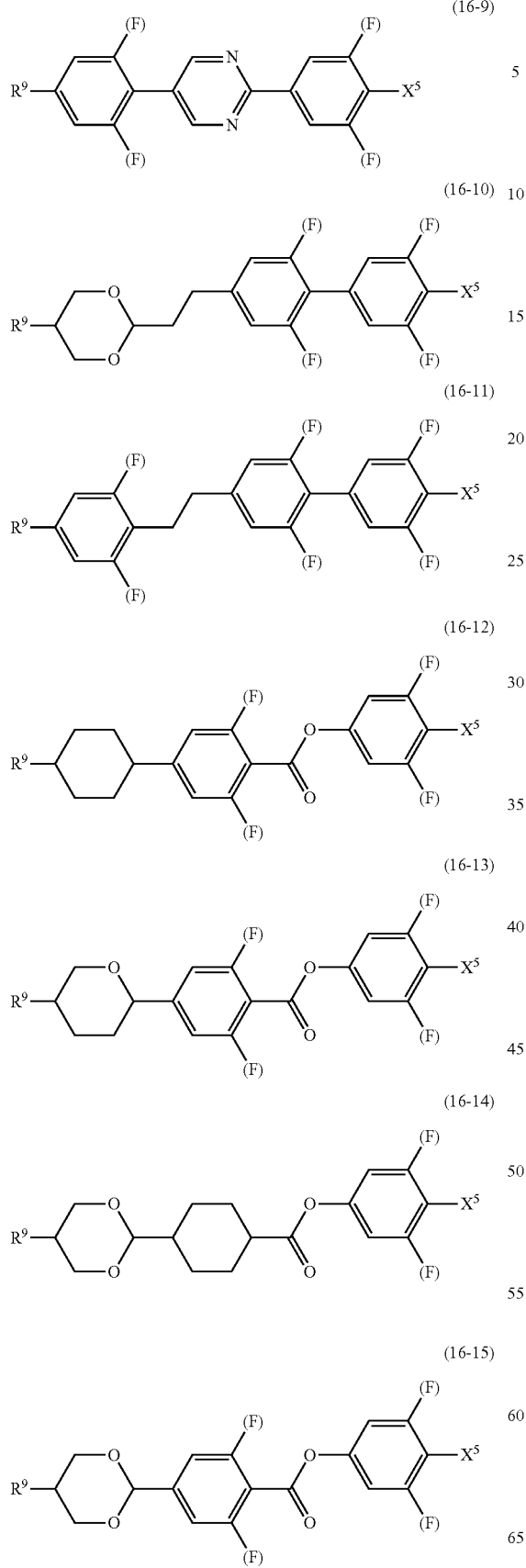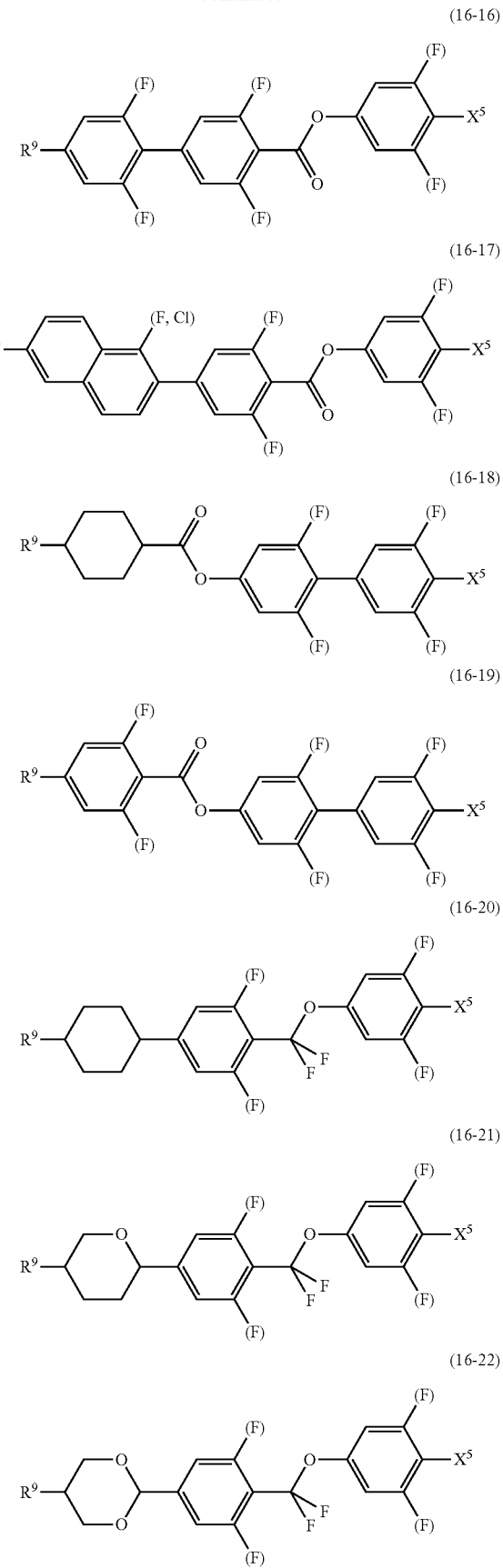

(16-23) 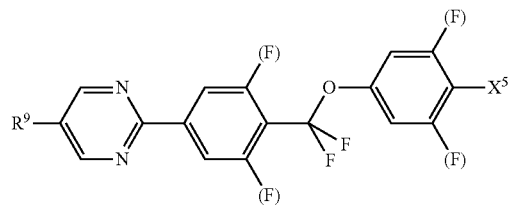
(16-24) 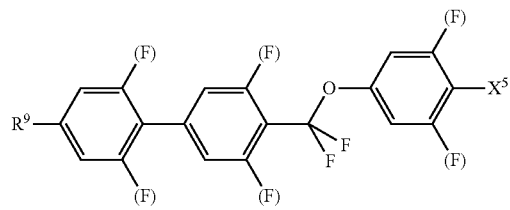
(16-25) 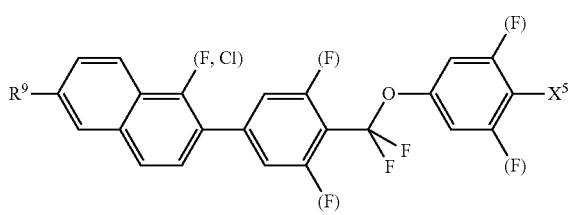
(16-26) 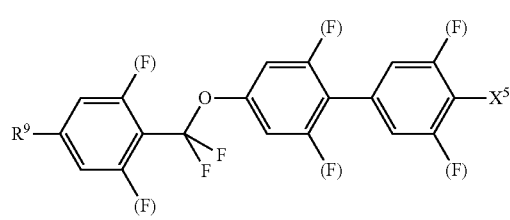
(17-1) 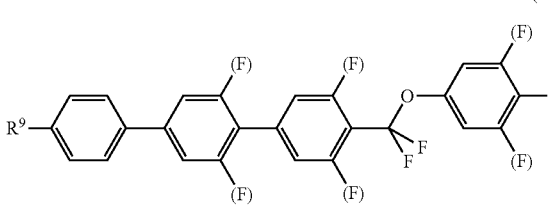
(17-2) 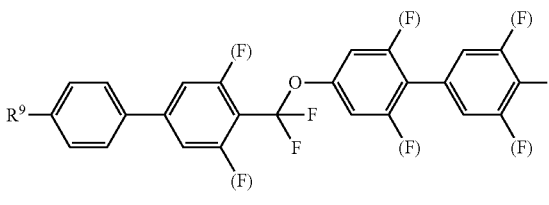
(17-3) 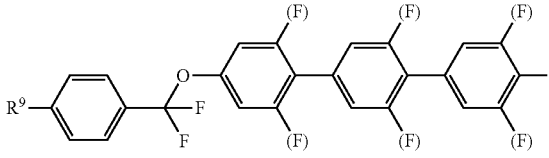
(17-4) 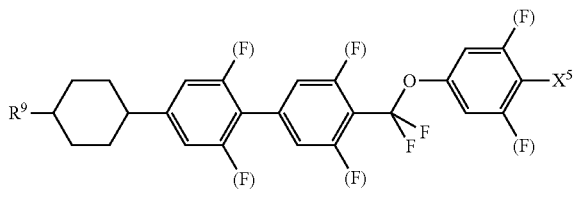
(17-5) 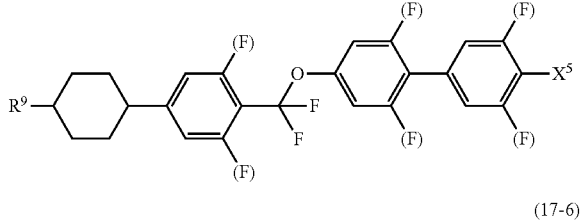
(17-6) 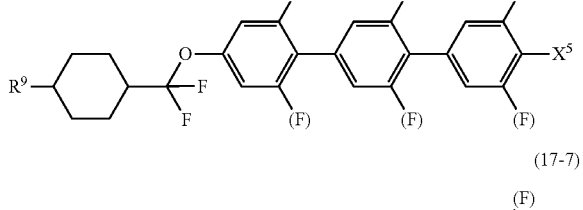
(17-7) 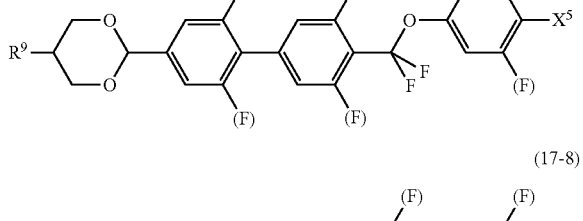
(17-8) 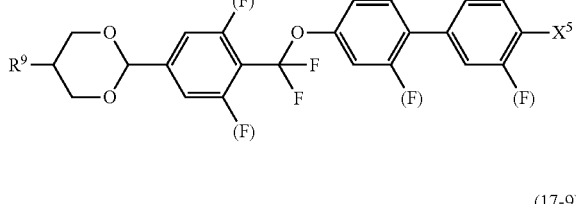
(17-9) 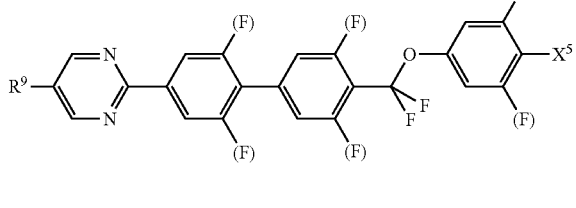
(17-10) 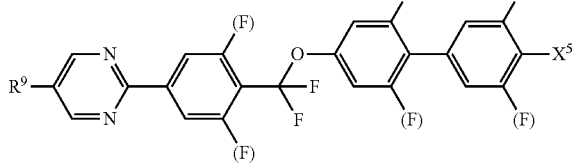

(18-1)
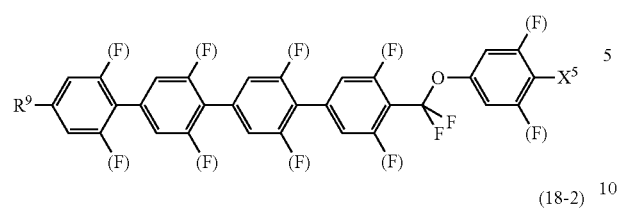

(18-2)
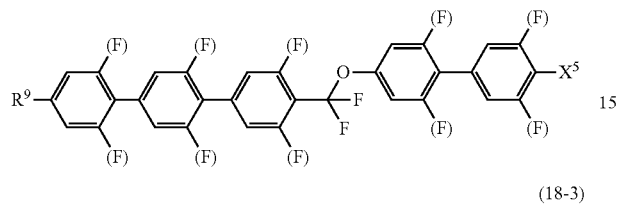

(18-3)
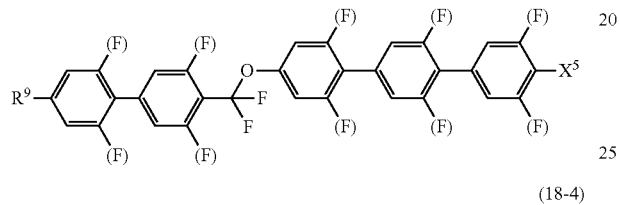

(18-4)

(18-5)
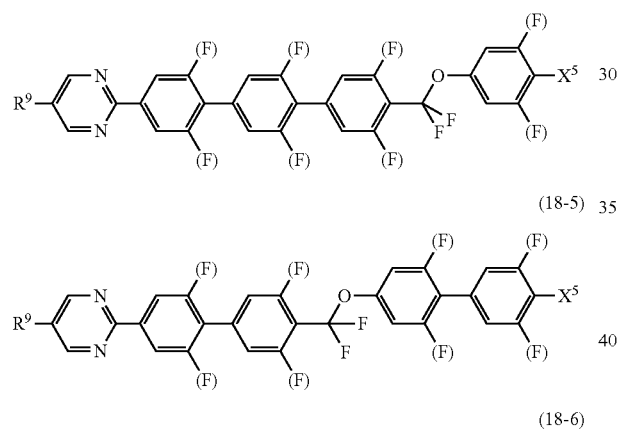

(18-6)

(18-7)
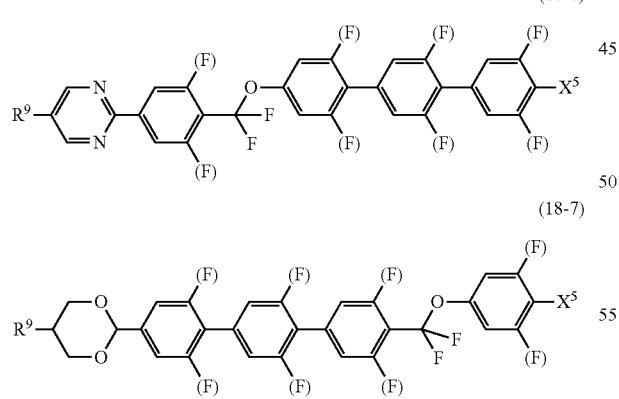

(18-8)
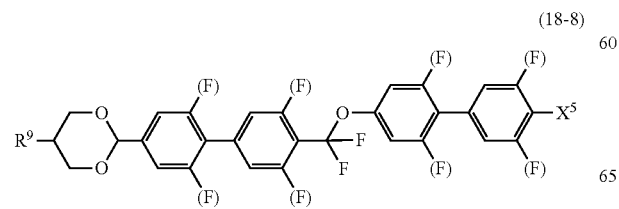

(18-9)
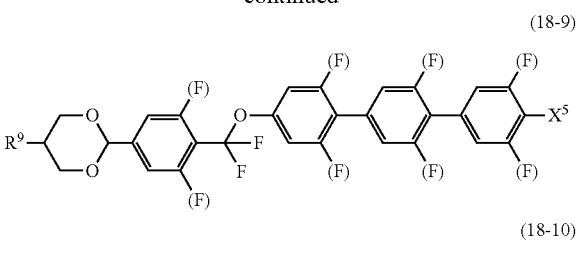

(18-10)

(18-11)
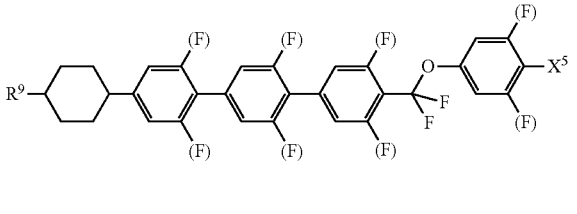

(18-12)

(in the formulas, $R^9$ and $X^5$ have the same meaning as $R^9$ and $X^5$ in Formulas (15)-(18), (F) denotes hydrogen or fluorine, and (F, Cl) denotes hydrogen, fluorine or chlorine.)

The compounds of Formulas (15)-(18) (i.e. Component G) have a positive and very large dielectric anisotropy value and excellent thermal or chemical stability, thereby being suitable for preparing a liquid crystal composition used in active driving, such as TFT driving. In the liquid crystal composition of the present invention, the content of Component G is suitably in the range of 1 wt %-99 wt %, preferably 10 wt %-97 wt %, and more preferably 20 wt %-95 wt %, based on the total weight of the liquid crystal composition of the present invention. Furthermore, by further containing the compounds of Formulas (12)-(14) (Component F), the viscosity may be adjusted.

Preferred examples of the compounds of Formula (19) (i.e. Component H) include Formulas (19-1)-(19-37).

(19-1)
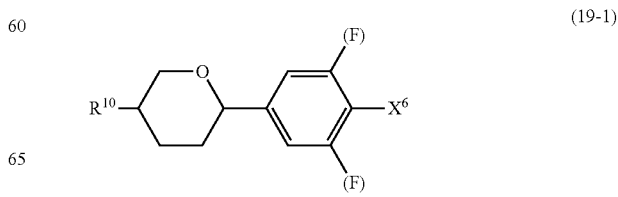

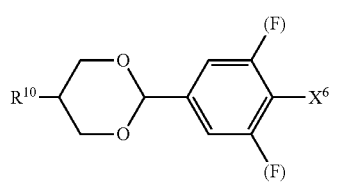 (19-2)
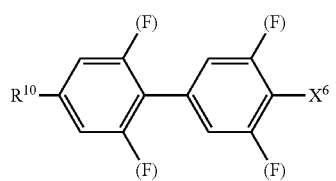 (19-3)
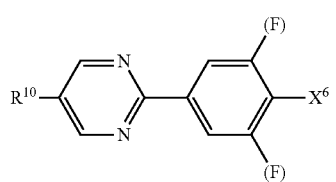 (19-4)
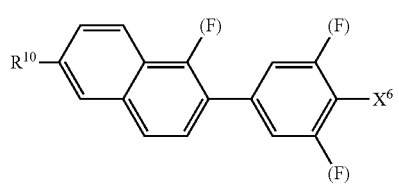 (19-5)
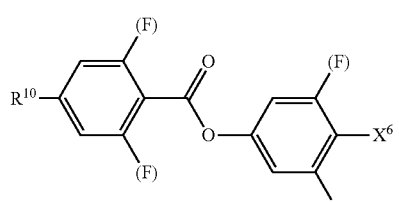 (19-6)
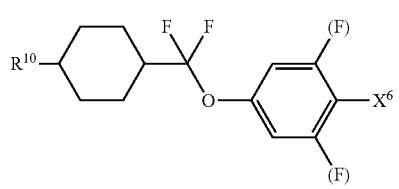 (19-7)
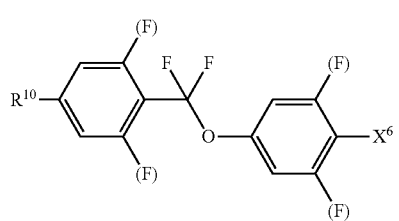 (19-8)
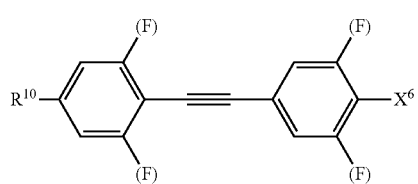 (19-9)
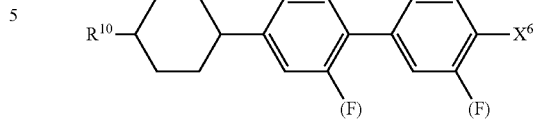 (19-10)
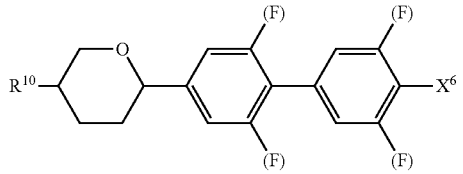 (19-11)
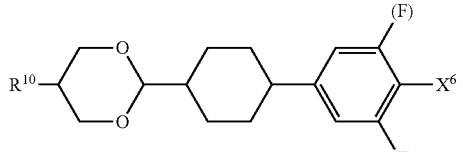 (19-12)
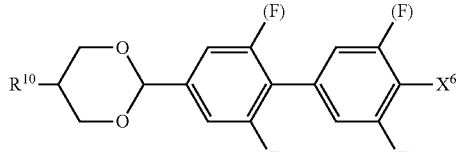 (19-13)
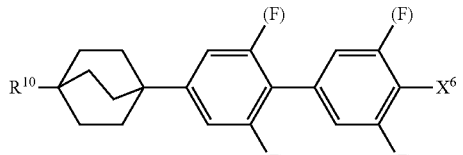 (19-14)
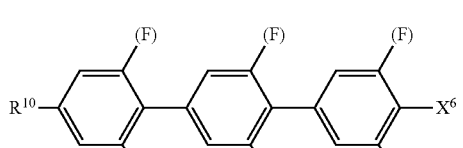 (19-15)
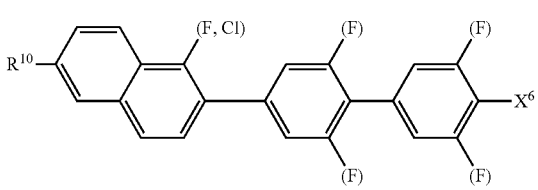 (19-16)
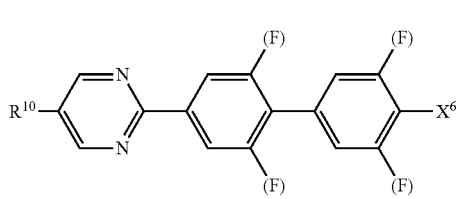 (19-17)

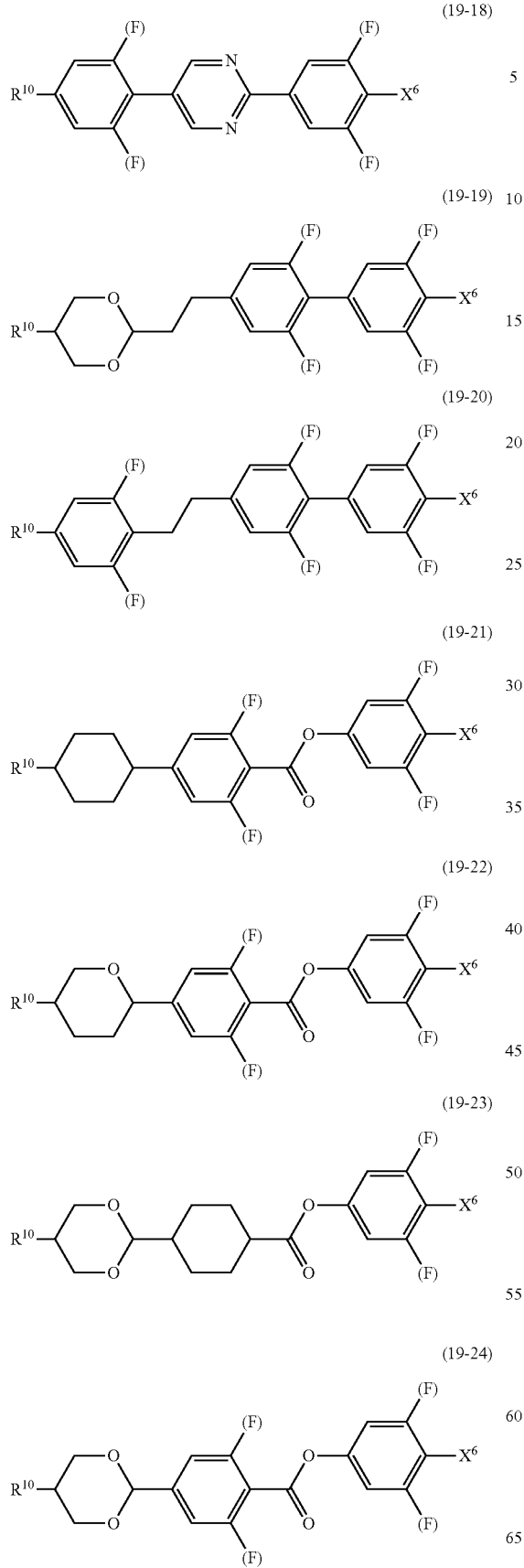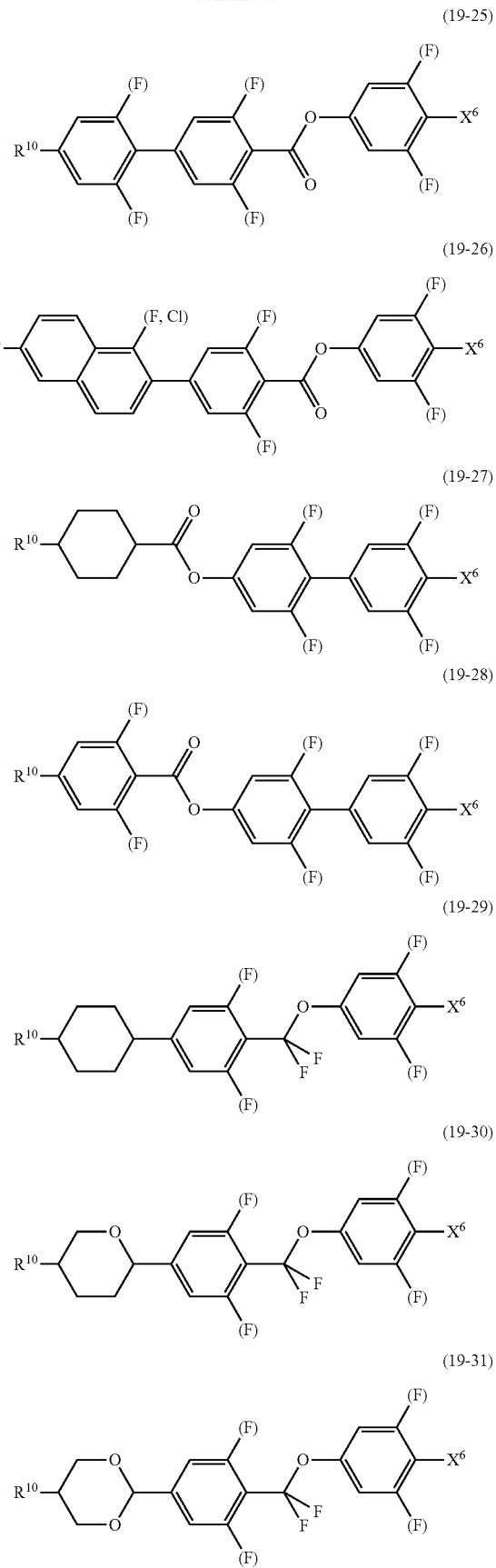

-continued

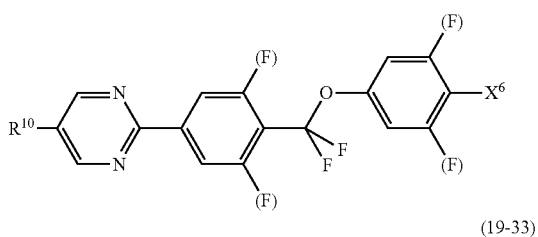
(19-32)

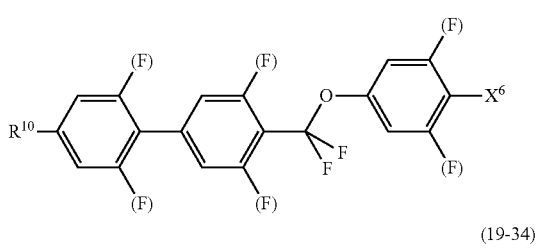
(19-33)

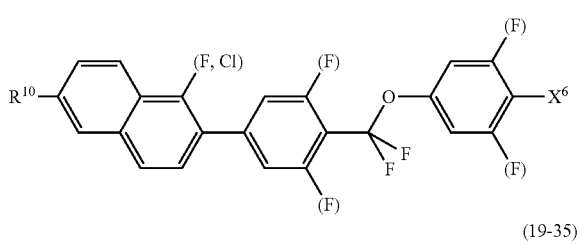
(19-34)

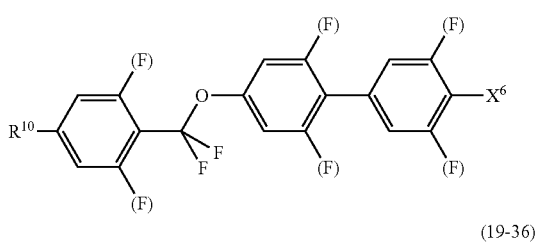
(19-35)

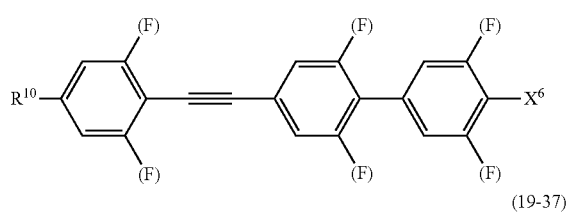
(19-36)

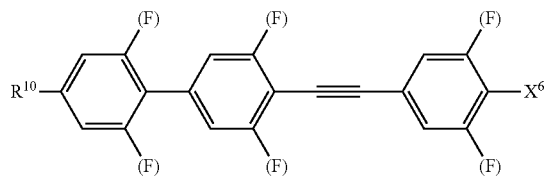
(19-37)

(in the formulas, $R^{10}$ and $X^6$ have the same meaning as $R^{10}$ and $X^6$ in Formula (19), (F) denotes hydrogen or fluorine, and (F, Cl) denotes hydrogen, fluorine, or chlorine.)

The compounds of Formula (19) (i.e., Component H) have a positive and very large dielectric anisotropy value, thereby mainly being used to lower the driving voltage of the devices. By containing Component H, the driving voltage of the composition is lowered, as well as the viscosity and the refractive index anisotropy value may be adjusted, and the temperature range of a liquid crystal phase is expanded. Moreover, the steepness is also improved.

The content of Component H is preferably in the range of 0.1 wt %-99.9 wt %, more preferably 1 wt %-97 wt %, and more preferably 1 wt %-45 wt %, based on the total weight of the composition.

The liquid crystal composition of the present invention may be prepared generally through a well-known method, for example, by dissolving the required components at a high temperature.

4 Composition Having Optically Isotropic Liquid Crystal Phase 4.1 Composition of Composition Having Optically Isotropic Liquid Crystal Phase A fourth aspect of the present invention is a composition containing the compound of Formula (1) and a chiral reagent, which is a liquid crystal composition useful in an optical device driven in an optically isotropic liquid crystal phase and exhibiting an optically isotropic liquid crystal phase.

Although being a tetracyclic compound, the compound of Formula (1) has a low clearing point, and a large dielectric anisotropy and a large refractive index anisotropy; therefore, in order to exhibit excellent properties, the content of the compound of Formula (1) is preferably 0.1-100 wt % based on the total weight of the achiral component T without the chiral reagent. The content of the compound of Formula (1) is more preferably 5-100 wt %, still preferably 30-100 wt %, and still more preferably 70-100 wt %.

Furthermore, the compound of Formula (1-2) have good compatibility with other liquid crystal compositions, and thus the content thereof may be 5-100 wt %, preferably 20-100 wt %, and more preferably 20-80 wt %, based on the total weight of the achiral component T.

Based on the total weight of the liquid crystal composition of the present invention, the content of the chiral reagent is preferably 1-40 wt %, more preferably 3-25 wt %, and most preferably 5-15 wt %. A liquid crystal composition containing the chiral reagent in these ranges tends to have an optically isotropic liquid crystal phase, and thus is preferred.

The chiral reagent contained in the liquid crystal composition may be one, two, or more.

4.2 Chiral Reagent

The chiral reagent contained in the optically isotropic liquid crystal composition is not particularly limited, provided that it is an optically active compound capable of twisting the liquid crystal composition after being added into the achiral component T. The chiral reagent is preferably a compound with a large helical twisting power. As a compound with a large helical twisting power reduces the adding amount required for obtaining a desired pitch, a rise in the driving voltage can be suppressed, which is advantageous in practice. Specifically, the compounds of Formulas (K1)-(K5) below are preferred.

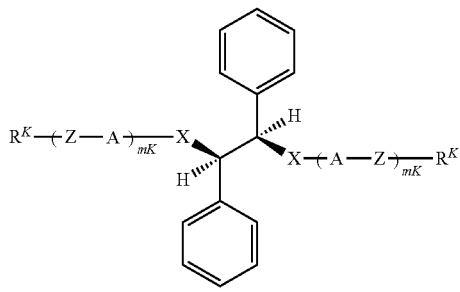
(K1)

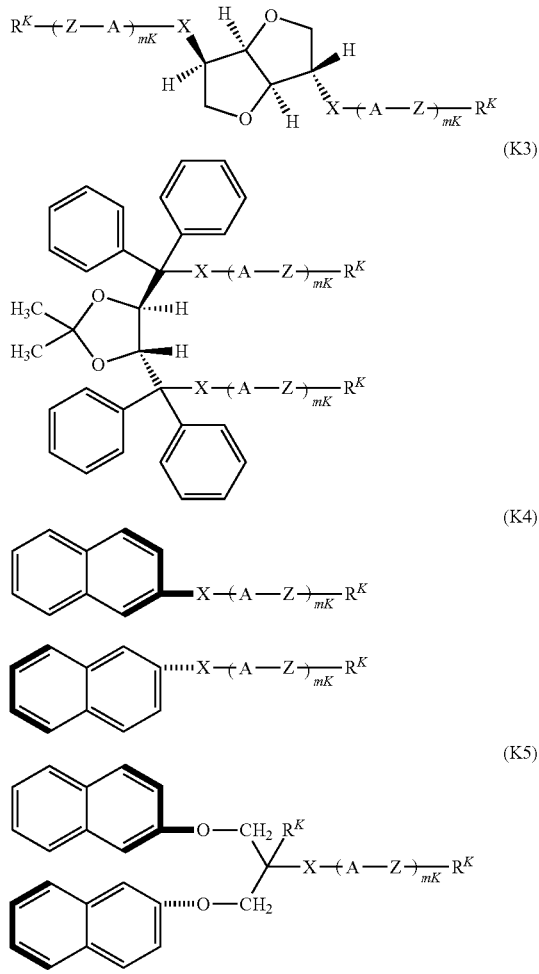

(in Formulas (K1)-(K5), $R^K$ is each independently hydrogen, halogen, —C≡N, —N═C═O, —N═C═S, or a $C_{1-20}$ alkyl, in which arbitrary —CH$_2$— may be substituted with —O—, —S—, —COO—, —OCO—, —CH═CH—, —CF═CF— or —C≡C—, arbitrary hydrogen may be substituted with halogen, and terminal —CH$_3$ may be substituted with

A is each independently an aromatic or non-aromatic 3- to 8-membered ring, or a fused ring having 9 or more carbon atoms, wherein arbitrary hydrogen in the rings may be substituted with halogen or a $C_{1-3}$ alkyl or haloalkyl, —CH$_2$— in the rings may be substituted with —O—, —S— or —NH—, and —CH═ in the rings may be substituted with —N═; B is each independently hydrogen, halogen, a $C_{1-3}$ alkyl, a $C_{1-3}$ haloalkyl, an aromatic or non-aromatic 3- to 8-membered ring, or a fused ring having 9 or more carbon atoms, wherein arbitrary hydrogen in the rings may be substituted with halogen or a $C_{1-3}$ alkyl or haloalkyl, —CH$_2$— in the rings may be substituted with —O—, —S— or —NH—, and —CH═ in the rings may be substituted with —N═; and Z is each independently a single bond, or a $C_{1-8}$ alkylene, wherein arbitrary —CH$_2$— in the alkylene may be substituted with —O—, —S—, —COO—, —OCO—, —CSO—, —OCS—, —N═N—, —CH═N—, —N═CH—, —CH═CH—, —CF═CF— or —C≡C—, and arbitrary hydrogen in the alkylene may be substituted with halogen;

X is a single bond, —COO—, —OCO—, —CH$_2$O—, —OCH$_2$—, —CF$_2$O—, —OCF$_2$— or —CH$_2$CH$_2$—;

mK is an integer of 1-4. Moreover, when two or more $R^K$, A, Z, and mK exist, the $R^K$, A, Z, and mK may be identical or different.)

Among the compounds, the chiral reagent added into the liquid crystal composition is preferably Formulas (K2-1)-(K2-8) included in Formula (K2), Formulas (K4-1)-(K4-6) included in Formula (K4), and Formulas (K5-1)-(K5-3) included in Formula (K5).

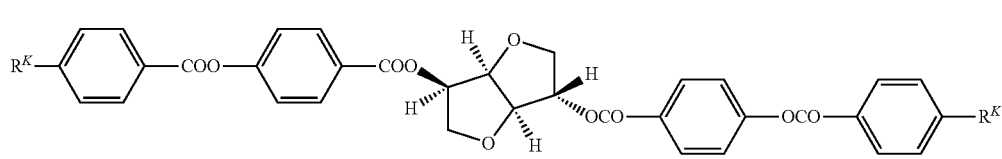

(K2-1)

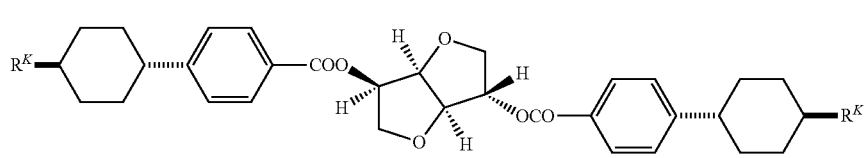

(K2-2)

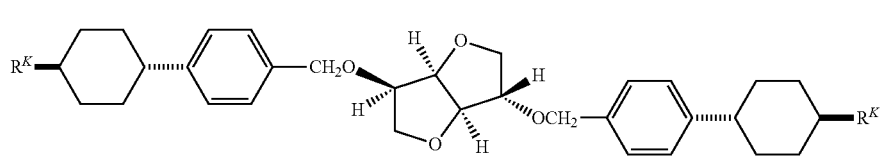

(K2-3)

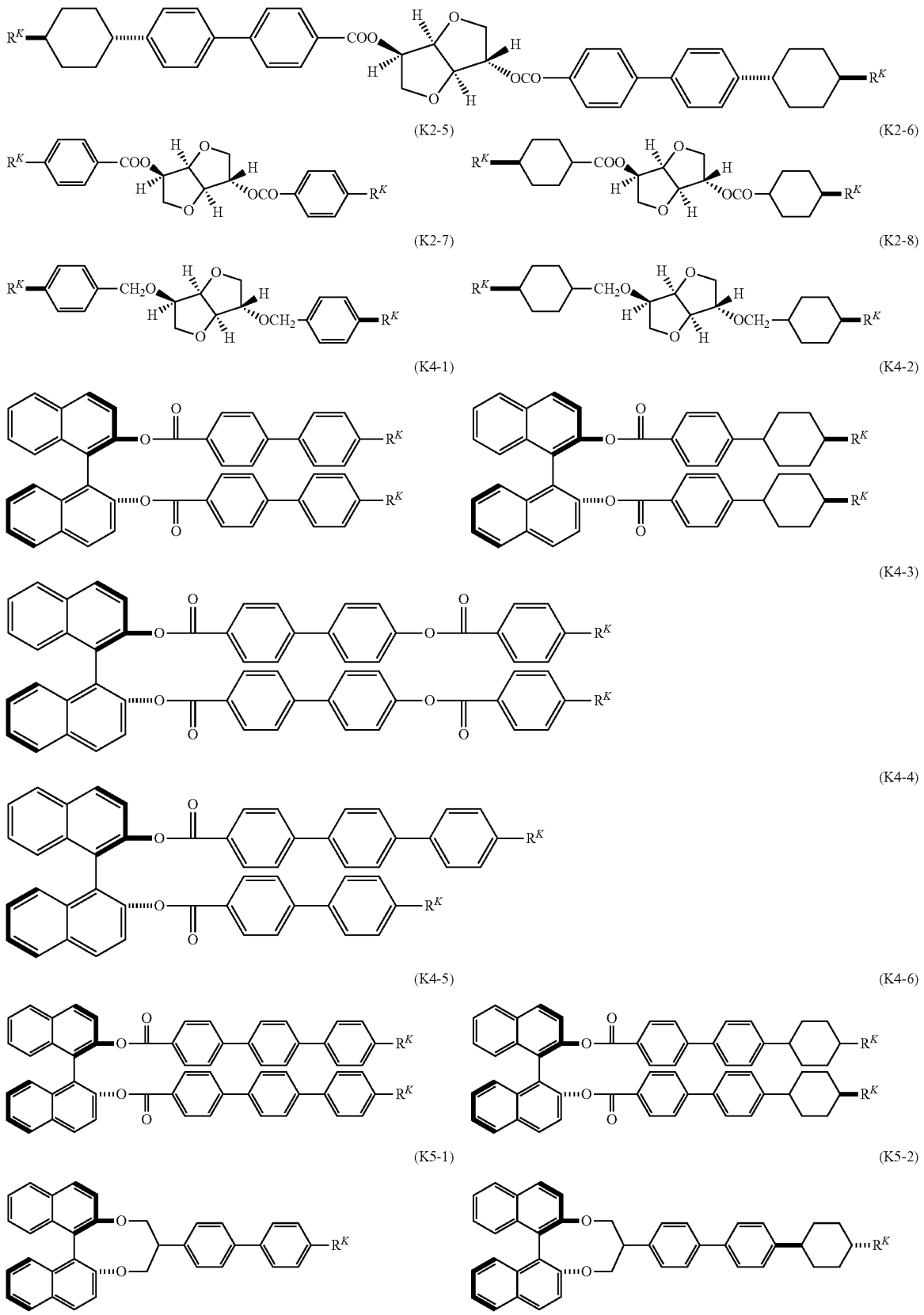

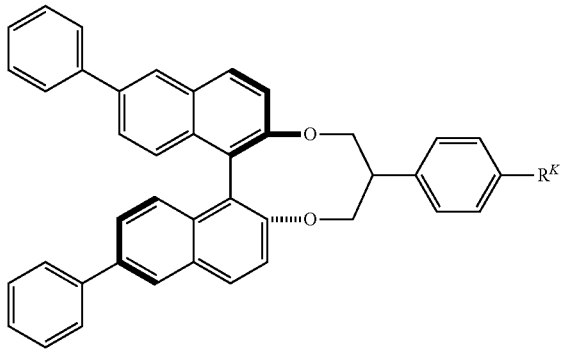

(K5-3)

(in the formulas, $R^K$ is each independently a $C_{3-10}$ alkyl, in which —$CH_2$— adjacent to the ring in the alkyl may be substituted with —O—, and arbitrary —$CH_2$— in the alkyl or the alkyl with —$CH_2$— adjacent to the ring substituted with —O— may be substituted with —CH=CH—.)

4.3 Optically Isotropic Liquid Crystal Phase

The so-called liquid crystal composition having optically isotropy means that the composition exhibits an optical isotropy because the liquid crystal molecules macroscopically have an isotropic arrangement, but microscopically a liquid crystal order exists. "Pitch corresponding to the microscopic liquid crystal order of the liquid crystal composition (sometimes referred to as pitch, hereafter)" is preferably 700 nm or less, more preferably 500 nm or less, and most preferably 350 nm or less.

Herein, the so-called "non-liquid crystal isotropic phase" refers to a commonly defined isotropic phase (i.e. disordered phase), and refers to an isotropic phase where a region with a non-zero local order parameter is generated due to fluctuation. For example, an isotropic phase exhibited at a high temperature side of a nematic phase is equivalent to the non-liquid crystal isotropic phase in the specification. The chiral liquid crystal in the specification also has a similar definition. Moreover, the so-called "optically isotropic liquid crystal phase" in the specification means a phase that exhibits an optical isotropy without fluctuation, an example of which is a phase exhibiting a platelet tissue (i.e. blue phase in narrow sense).

The optically isotropic liquid crystal composition of the present invention has an optically isotropic liquid crystal phase. However, the typical platelet tissue is not observed in the blue phase under a polarizing microscope sometimes. Therefore, in the specification, a phase exhibiting the platelet tissue is designated as blue phase, and an optically isotropic liquid crystal phase including the blue phase is designated as optically isotropic liquid crystal phase. That is, the blue phase is included in the optically isotropic liquid crystal phase.

Generally, the blue phase is divided into three types, that is, blue phase I, blue phase II, and blue phase III, and all the three blue phases are optically active and isotropic. In the blue phase I or blue phase II, two or more diffracted lights produced by the Bragg reflection from different lattice planes are observed. The blue phase is generally observed between the non-liquid crystal isotropic phase and the chiral nematic phase.

The so-called state that the optically isotropic liquid crystal phase does not exhibit two or more colors of diffracted light means that a platelet tissue observed in the blue phase I and blue phase II is not observed and the phase exhibits substantially a single color in the entire plane. For an optically isotropic liquid crystal phase not exhibiting two or more colors of diffracted light, brightness/darkness of the colors is not necessarily to be even in plane.

The optically isotropic liquid crystal phase not exhibiting two or more colors of diffracted light has the advantage of inhibiting the intensity of reflected light caused by Bragg reflection, or shifting the reflected light toward the low wavelength side.

Furthermore, when a liquid crystal material reflecting visible light is used in a display device, a color variation problem may sometimes occur. However, for a liquid crystal not exhibiting two or more colors of diffracted light, because reflection wavelength shift toward the low wavelength side, the reflection of visible light may be eliminated by the pitch longer than that in the blue phase in a narrow sense (a phase exhibiting the platelet tissue).

The optically isotropic liquid crystal composition of the present invention may be obtained by adding a chiral reagent into a composition having a nematic phase. In this case, the chiral reagent is preferably added in a concentration such that the pitch is 700 nm or less. Furthermore, the composition having a nematic phase contains the compound of Formula (1) and other optional components. Moreover, the optically isotropic liquid crystal composition of the present invention can also be obtained by adding a chiral reagent to a composition having a chiral nematic phase but no optically isotropic liquid crystal phase. Furthermore, the composition having a chiral nematic phase but no optically isotropic liquid phase contains the compound of Formula (1), an optically active compound, and other optional components. In this case, the optically active compound is preferably added in a concentration such that the pitch is 700 nm or more, so as not to exhibit an optically isotropic liquid crystal phase. Here, the optically active compounds to be added may be the compounds with a large helical twisting power above, that is, the compounds of Formulas (K-1)-(K-5), Formulas (K2-1)-(K2-8), or Formulas (K5-1)-(K5-3). Moreover, the optically active compound added may not have a large helical twisting power. Such an optically active compound is, for example, one added in a liquid crystal composition for a device driven in a nematic phase (TN mode, STN mode, and the like).

Examples of the optically active compound without a large helical twisting power are the following optically active compounds (Op-1)-(Op-13).

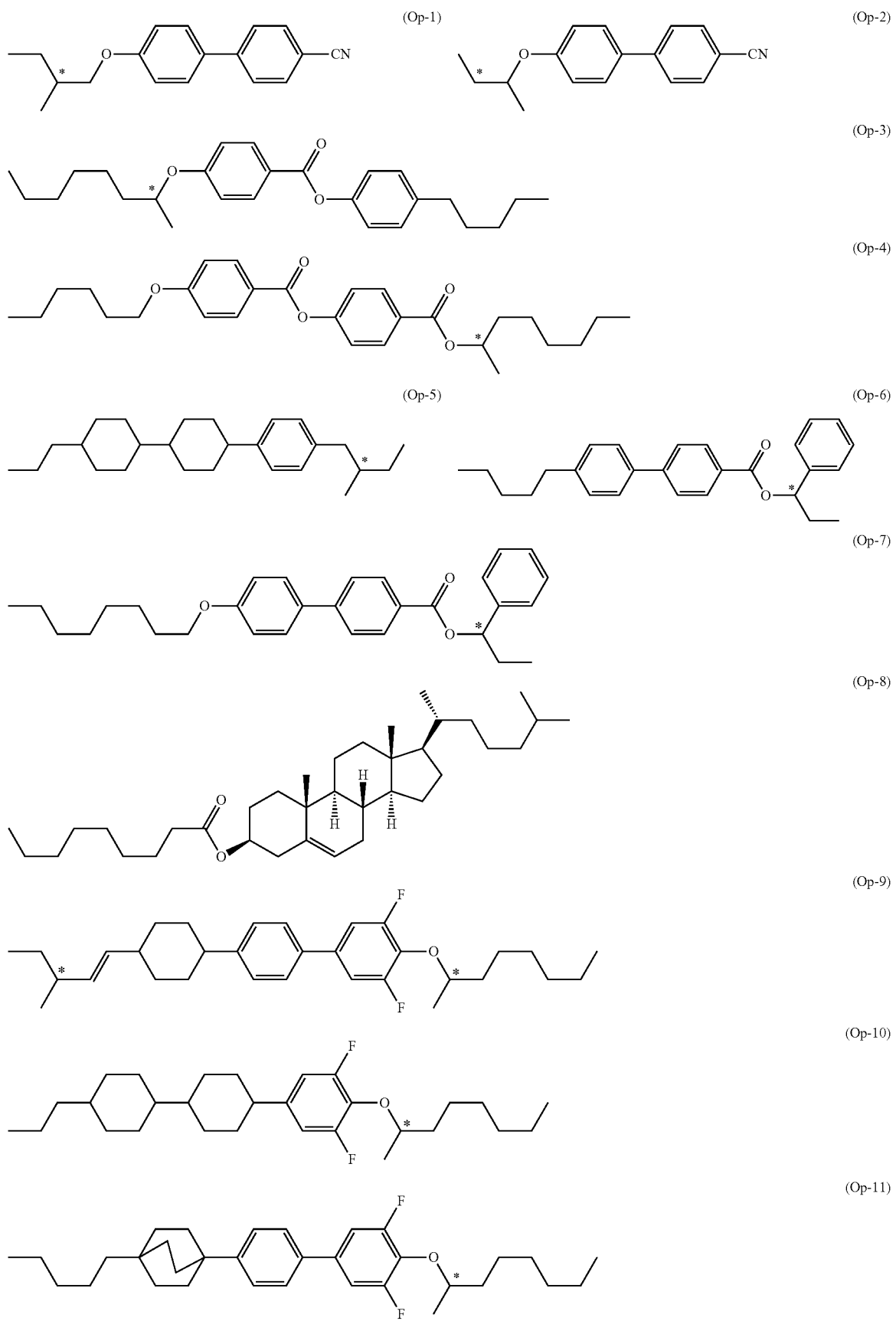

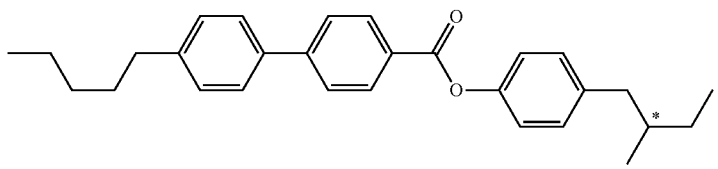 (Op-12)

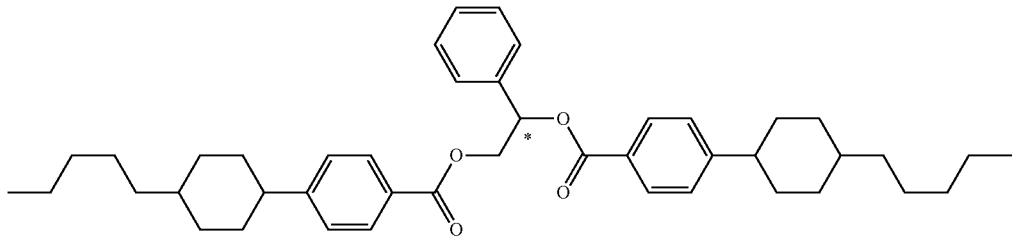 (Op-13)

Moreover, the temperature range of the optically isotropic liquid crystal composition of the present invention may be expanded by adding a chiral reagent into a liquid crystal composition having the co-existence of a nematic phase or a chiral nematic phase over a wide temperature range and an isotropic phase for exhibiting an optically isotropic liquid crystal phase. For example, a composition exhibiting an optically isotropic liquid crystal phase in a wide temperature range can be prepared as follows: a liquid crystal compound having a high clearing point is mixed with a liquid crystal compound having a low clearing point, and a liquid crystal composition with a wide coexisting temperature range of a nematic phase and an isotropic phase is prepared in a wide temperature range; and then, a chiral reagent is added to the liquid crystal composition.

For a liquid crystal composition with a wide coexisting temperature range of a nematic phase or chiral nematic phase and an isotropic phase, the difference between the upper-limit temperature and lower-limit temperature of the co-existence of a chiral nematic phase and a non-liquid crystal isotropic phase is preferably 3-150° C., and more preferably 5-150° C. Moreover, the liquid crystal composition preferably has a difference of 3-150° C. between the upper-limit temperature and lower-limit temperature of the coexistence of a nematic phase and a non-liquid crystal isotropic phase.

When an electric field is applied to the liquid crystal medium of the present invention in an optically isotropic liquid crystal phase, an electric birefringence occurs, but the Kerr effect does not necessarily occur.

Because the electric birefringence effect of an optically isotropic liquid crystal phase increases with the pitch, the electric birefringence effect may be improved by adjusting the type and content of the chiral reagent to increase the helical pitch, provided that other optical properties, such as, transmittance and diffraction wavelength, could be satisfied.

4.4 Other Components

Other compounds, such as polymer material, may be further added into the optically isotropic liquid crystal composition of the present invention, so long as they do not affect the properties of the composition. In addition to the polymer material, the liquid crystal composition of the present invention can also contain, for example, a dichroic dye or a photochromic compound. Examples of the dichroic dye include merocyanine-based dyes, styryl-based dyes, azo-based dyes, azomethine-based dyes, azoxy-based dyes, quinophthalone-based dyes, anthraquinone-based dyes, tetrazine-based dyes, and the like.

5. Optically Isotropic Polymer/Liquid Crystal Composite Material

A fifth aspect of the present invention is a composite material of a polymer compound and a liquid crystal composition containing the compound of Formula (1) and a chiral reagent, which exhibits an optical isotropy. The composite material is an optically isotropic polymer/liquid crystal composite material which can be used in an optical device driven in an optically isotropic liquid crystal phase. Such a polymer/liquid crystal composite material is composed of, for example, the liquid crystal composition according to Items [1]-[33] and a polymer.

The "polymer/liquid crystal composite material" of the present invention has no particular limitation, provided that it is a composite containing both a liquid crystal material and a polymer compound. It also includes a state where the polymer compound and the liquid crystal material are in phase separation because the polymer compound is partially or entirely not dissolved in the liquid crystal material. Furthermore, in the specification, a nematic phase refers to one, in a narrow sense, excluding a chiral nematic phase, unless specifically indicated.

The optically isotropic polymer/liquid crystal composite material according to a preferred aspect of the present invention can exhibit an optically isotropic liquid crystal phase in a wide temperature range. Moreover, the polymer/liquid crystal composite material according to a preferred aspect of the present invention has very high response speed. Furthermore, based on such effects, the polymer/liquid crystal composite material according to a preferred aspect of the present invention is useful in an optical device such as a display device.

5.2 Polymers

Although the composite material of the present invention can be produced by mixing an optically isotropic liquid crystal composition with a pre-polymerized polymer, it is preferably produced by mixing a low molecular weight monomer, macromonomer, or oligomer, etc (generally referred to as "monomers", hereafter) to be formed into a polymer material, with the liquid crystal composition (cholesteric liquid crystal composition), and then polymerizing the mixture. In the specification, the mixture containing the monomers and the liquid crystal composition is referred to as "polymerizable monomer/liquid crystal mixture". The "polymerizable monomer/liquid crystal mixture" may optionally contain a polymerization initiator, a curing agent, a catalyst, a stabilizer, a dichroic dye, or a photochromic compound, and the like, without compromising the effect of the present invention. For example, the polymerizable monomer/liquid crystal mixture of the present invention may also optionally contain 0.1-20 weight parts of a polymerization initiator, based on 100 weight parts of the polymerizable monomer.

The polymerization temperature is preferably such a temperature that the polymer/liquid crystal composite material exhibits high transparency and isotropy, and more preferably such a temperature that the mixture of the monomer and the liquid crystal material exhibits an isotropic phase or a blue phase, while the polymerization is carried out in the isotropic phase or optically isotropic liquid crystal phase. That is, the temperature is preferably set, such that after the polymerization, the polymer/liquid crystal composite material substantially does not scatter light of wavelength greater than that of visible light and exhibits an optical isotropy.

For example, a low molecular weight monomer, macromonomer, and oligomer may be used as a raw material of the polymer compound for forming the composite material of the present invention. In the specification, the raw material monomers of the polymer compound include low molecular weight monomers, macromonomers, oligomers, and the like. Furthermore, the obtained polymer compound preferably has a three-dimensional cross-linked structure, and thus the raw material monomer of the polymer compound is preferably a multi-functional monomer having two or more polymerizable functional groups. The polymerizable functional groups have no particular limitation, and include, for example, acryloyl, methacryloyl, glycidyl, epoxy, oxetanyl, vinyl, and the like. In view of the polymerization rate, acryloyl and methacryloyl are preferred. The raw material monomers of the polymer compound containing 10 wt % or more of the monomers having two or more polymerizable functional groups are preferred, since the obtained composite material of the present invention easily exhibits high transparency and isotropy.

Moreover, in order to obtain a better composite material, the polymer preferably has a mesogen moiety, and a part or all of the raw material monomers used have a mesogen moiety.

5.2.1 Mono-functional and Difunctional Monomer Having Mesogen Moiety

The mono-functional or difunctional monomer having a mesogen moiety has no particular limitation in structure, and may be, for example, the compounds of Formula (M1) or (M2) below.

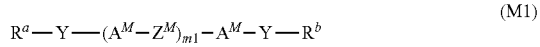

(M1)

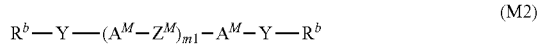

(M2)

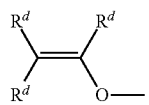

(M3-1)

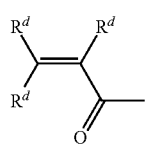

(M3-2)

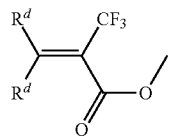

(M3-3)

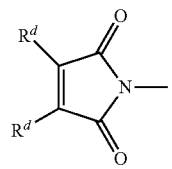

(M3-4)

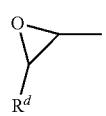

(M3-5)

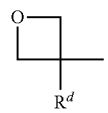

(M3-6)

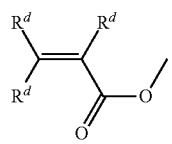

(M3-7)

In Formula (M1), $R^a$ is each independently hydrogen, halogen, —C≡N, —N═C═O, —N═C═S or a $C_{1-20}$ alkyl, in which arbitrary —$CH_2$— may be substituted with —O—, —S—, —CO—, —COO—, —OCO—, —CH═CH—, —CF═CF— or —C≡C—, and arbitrary hydrogen in the alkyl and the alkyl with arbitrary —$CH_2$— substituted with —O—, —S—, —COO—, —OCO—, —CH═CH—, —CF═CF— or —C≡C— may be substituted with halogen or —C≡N. $R^b$ is each independently a polymerable group of Formulas (M3-1)-(M3-7).

$R^a$ is preferably hydrogen, halogen, —C≡N, —$CF_3$, —$CF_2H$, —$CFH_2$, —$OCF_3$, —$OCF_2H$, a $C_{1-20}$ alkyl, a $C_{1-19}$ alkoxy, a $C_{2-21}$ alkenyl, and a $C_{2-21}$ alkynyl. Particularly preferably, $R^a$ is —C≡N, a $C_{1-20}$ alkyl, and a $C_{1-19}$ alkoxy.

In Formula (M2), $R^b$ is each independently a polymerable group of Formulas (M3-1)-(M3-7).

Herein, in Formulas (M3-1)-(M3-7), $R^d$ is each independently hydrogen, halogen, or a $C_{1-5}$ alkyl, in which arbitrary hydrogen may be substituted with halogen. $R^d$ is preferably hydrogen, halogen, and methyl. Particularly preferably, $R^d$ is hydrogen, fluorine, and methyl.

Furthermore, Formulas (M3-2), (M3-3), (M3-4), and (M3-7) are preferably polymerized through free radical polymerization. Formulas (M3-1), (M3-5), and (M3-6) are preferably polymerized through cationic polymerization. The polymerizations are both living polymerization, and thus can be initiated only when a small amount of free radical or cationic active species is generated in the reaction system. In order to accelerate the generation of the active species, a polymerization initiator may be used. Light or heat may be used to generate the active species.

In Formulas (M1) and (M2), $A^M$ is each independently an aromatic or non-aromatic 5- or 6-membered ring, or a fused ring having 9 or more carbon atoms, in which —$CH_2$— in the rings may be substituted with —O—, —S—, —NH—, or —$NCH_3$—, —CH═ in the rings may be substituted with —N═, and hydrogen atom in the rings may be substituted with halogen, and a $C_{1-5}$ alkyl or haloalkyl. Specific examples of preferred $A^M$ are 1,4-cyclohexylene, 1,4-cyclohexenylene, 1,4-phenylene, naphthalene-2,6-diyl, tetrahydronaphthalene-2,6-diyl, fluorene-2,7-diyl, or bicyclo[2.2.2]octane-1,4-diyl, in which arbitrary —CH$_2$— in the rings may be substituted with —O—, arbitrary —CH═ may be substituted with —N═, and arbitrary hydrogen in the rings and the rings with arbitrary —CH═ substituted with —CH═ may be substituted with halogen, a $C_{1-5}$ alkyl, or a $C_{1-5}$ haloalkyl.

In consideration of the stability of the compound, —CH$_2$—O—CH$_2$—O— with oxygen being not adjacent to one another is preferred to —CH$_2$—O—O—CH$_2$— with oxygen being adjacent to one another. This also applies to the case of sulphur.

Among the groups, especially preferred $A^M$ is 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl, and pyrimidine-2,5-diyl. Moreover, as for the stereo configuration of 1,4-cyclohexylene and 1,3-dioxane-2,5-diyl, trans-configuration is superior to cis-configuration.

Because 2-fluoro-1,4-phenylene and 3-fluoro-1,4-phenylene are identical in structure, the latter is not exemplified. This also applies to the case of the relationship between 2,5-difluoro-1,4-phenylene and 3,6-difluoro-1,4-phenylene.

In Formulas (M1) and (M2), Y is each independently a single bond, or a $C_{1-20}$ alkylene, in which arbitrary —CH$_2$— may be substituted with —O—, —S—, —CH═CH—, —C≡C—, —COO— or —OCO—. Y is preferably a single bond, —(CH$_2$)$_{m2}$—, —O(CH$_2$)$_{m2}$—, and —(CH$_2$)$_{m2}$O— (where m2 is an integer of 1-20). Particularly preferably, Y is a single bond, —(CH$_2$)$_{m2}$—, —O(CH$_2$)$_{m2}$—, and —(CH$_2$)$_{m2}$O— (where m2 is an integer of 1-10). In consideration of the stability of the compound, —Y—$R^a$ and —Y—$R^b$ preferably have no —O—O—, —O—S—, —S—O—, or —S—S—.

In Formulas (M1) and (M2), $Z^M$ is each independently a single bond, —(CH$_2$)$_{m3}$—, —O(CH$_2$)$_{m3}$—, —(CH$_2$)$_{m3}$O—, —O(CH$_2$)$_{m3}$O—, —CH═CH—, —C≡C—, —COO—, —OCO—, —(CF$_2$)$_2$—, —(CH$_2$)$_2$—COO—, —OCO—(CH$_2$)$_2$—, —CH═CH—COO—, —OCO—CH═CH—, —C≡C—COO—, —OCO—C≡C—, —CH═CH—(CH$_2$)$_2$—, —(CH$_2$)$_2$—CH═CH—, —CF═CF—, —C≡C—CH═CH—, —CH═CH—C≡C—, —OCF$_2$—(CH$_2$)$_2$—, —(CH$_2$)$_2$—CF$_2$O—, —OCF$_2$—, or —CF$_2$O— (where m3 is an integer of 1-20).

$Z^M$ is preferably a single bond, —(CH$_2$)$_{m3}$—, —O(CH$_2$)$_{m3}$—, —(CH$_2$)$_{m3}$O—, —CH═CH—, —C≡C—, —COO—, —OCO—, —(CH$_2$)$_2$—COO—, —OCO—(CH$_2$)$_2$—, —CH═CH—COO—, —OCO—CH═CH—, —OCF$_2$—, and —CF$_2$O—.

In Formulas (M1) and (M2), m1 is an integer of 1-6, and preferably an integer of 1-3. When m1 is 1, the compound is a bicyclic compound having two, for example, 6-membered rings. When m1 is 2 or 3, the compound is a tricyclic or tetracyclic compound, respectively. For example, when m1 is 1, two $A^M$ may be identical or different. Furthermore, for example when m1 is 2, three $A^M$ (or two $Z^M$) may be identical or different. When m1 is 3-6, it is also the same case. This also applies to the case of $R^a$, $R^b$, $R^d$, $Z^M$, $A^M$, and Y.

Even the Compound (M1) of Formula (M1) and the Compound (M2) of Formula (M2) contains an isotope in an amount higher than its natural abundance, such as $^2$H (deuterium) and $^{13}$C are useful, due to the identical properties.

More preferred examples of Compounds (M1) and (M2) are Compounds (M1-1)-(M1-41) and (M2-1)-(M2-27) of Formulas (M1-1)-(M1-41) and (M2-1)-(M2-27). Among the compounds, $R^a$, $R^b$, $R^d$, $Z^M$, $A^M$, Y, and p have the same meaning as those described for Formulas (M1) and (M2) in the previous aspects of the present invention.

Each partial structure of Compounds (M1-1)-(M1-41) and Compounds (M2-1)-(M2-27) is described as follows. Partial structure (a1) represents 1,4-phenylene with arbitrary hydrogen substituted with fluorine. Partial structure (a2) represents 1,4-phenylene in which arbitrary hydrogen may be substituted with fluorine. Partial structure (a3) represents 1,4-phenylene in which arbitrary hydrogen may be substituted with either fluorine or methyl. Partial structure (a4) represents fluorene in which hydrogen at position 9 may be substituted with methyl.

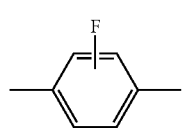

(a1)

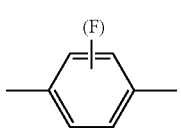

(a2)

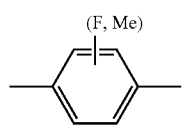

(a3)

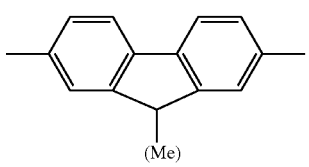

(a4)

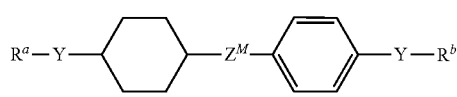

(M1-1)

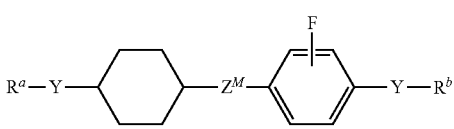

(M1-2)

(M1-3) 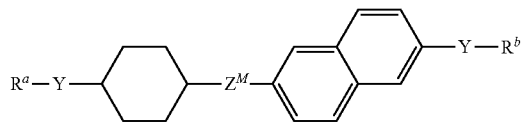
(M1-4) 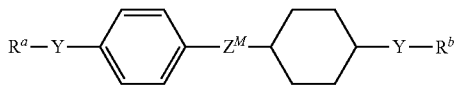
(M1-5) 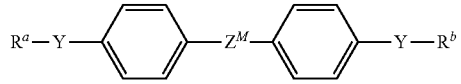
(M1-6) 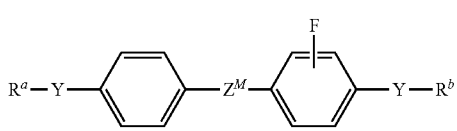
(M1-7) 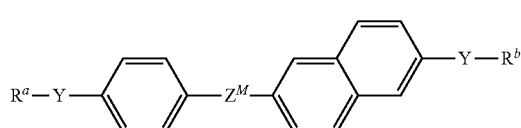
(M1-8) 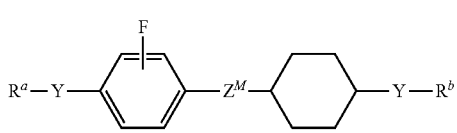
(M1-9) 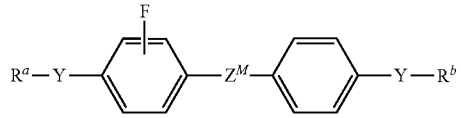
(M1-10) 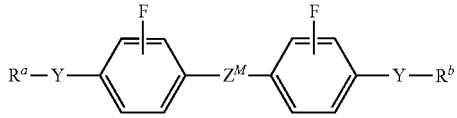
(M1-11) 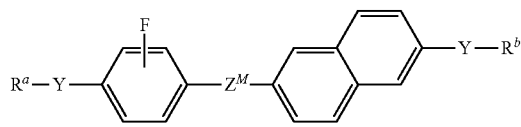
(M1-12) 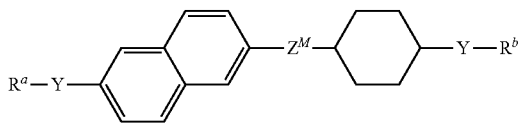
(M1-13) 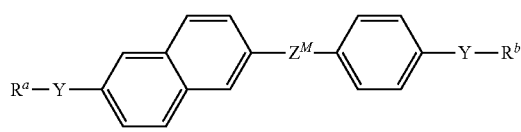
(M1-14) 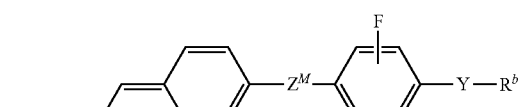
(M1-15) 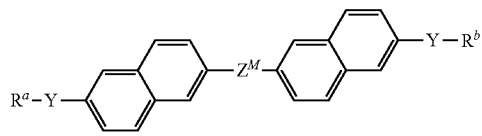
(M1-16) 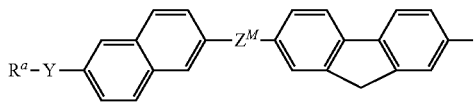
(M1-17) 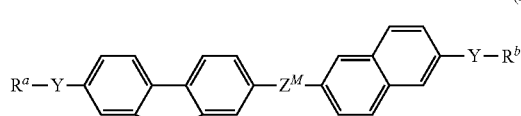
(M1-18) 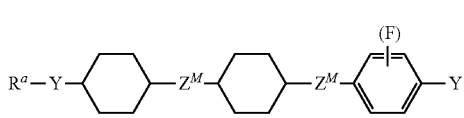
(M1-19) 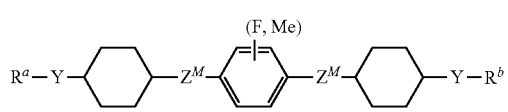
(M1-20) 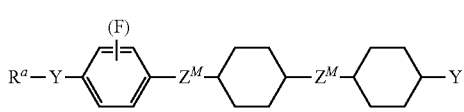
(M1-21) 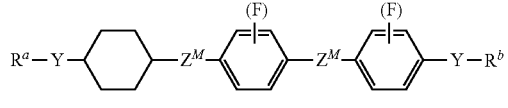
(M1-22) 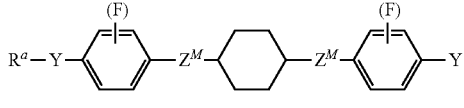
(M1-23) 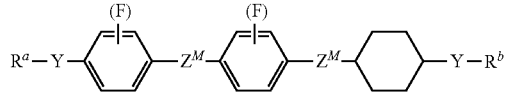
(M1-24) 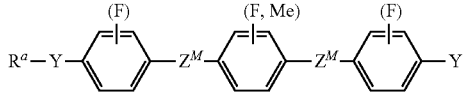

-continued
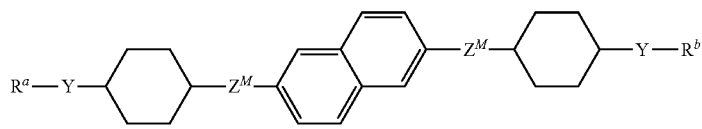
(M1-25)
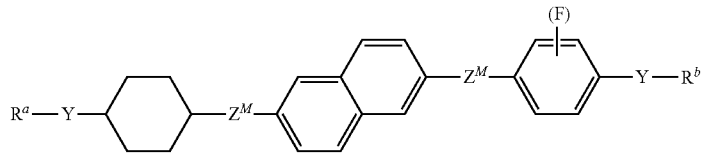
(M1-26)
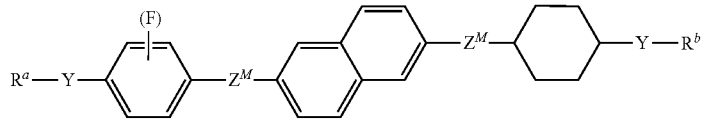
(M1-27)
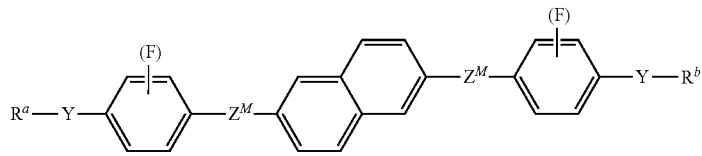
(M1-28)
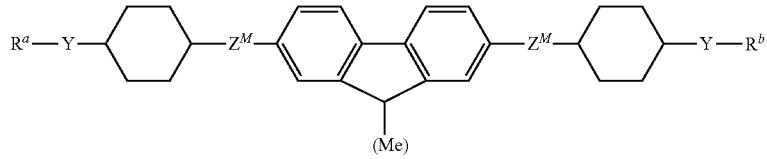
(M1-29)
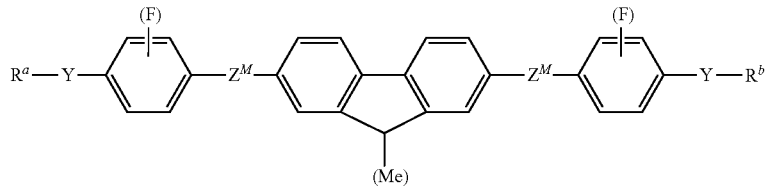
(M1-30)
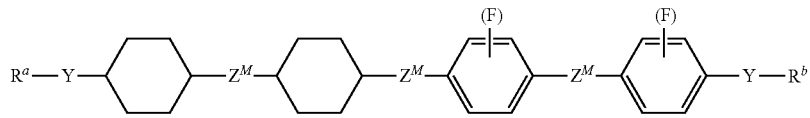
(M1-31)
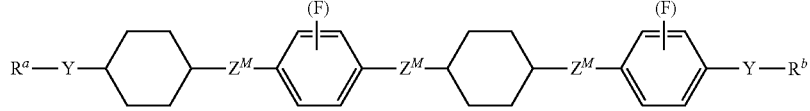
(M1-32)
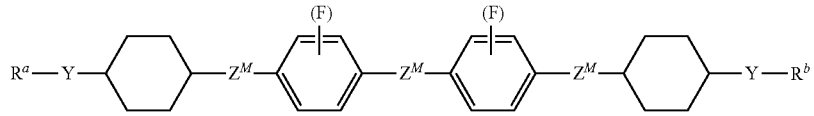
(M1-33)
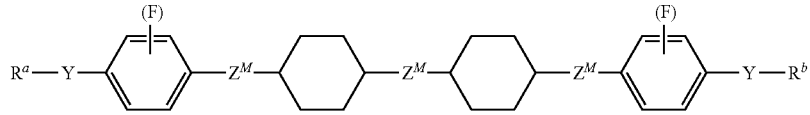
(M1-34)
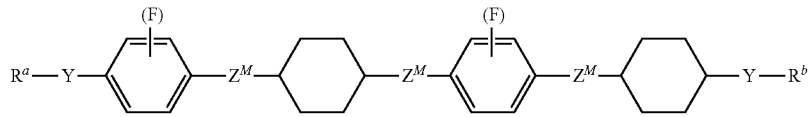
(M1-35)

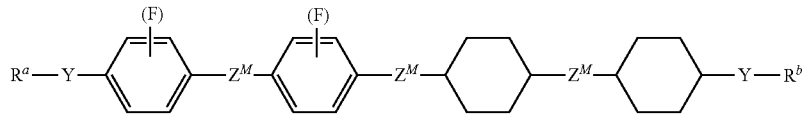
(M1-36)
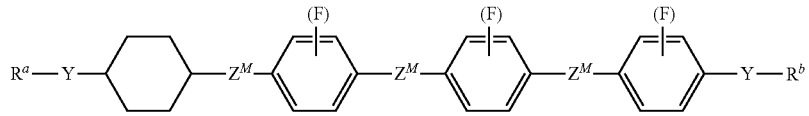
(M1-37)
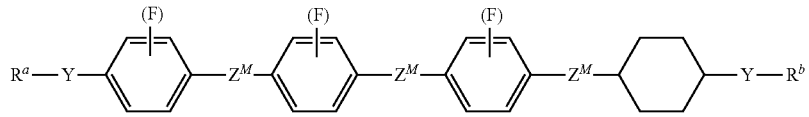
(M1-38)
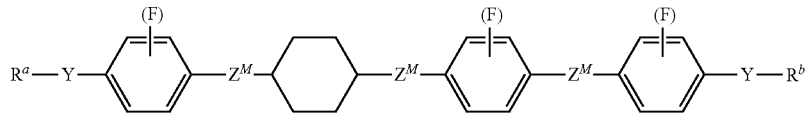
(M1-39)
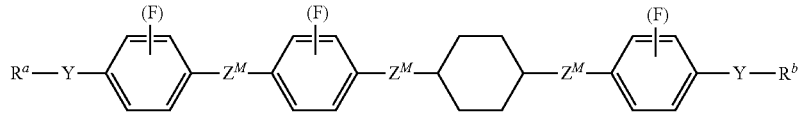
(M1-40)
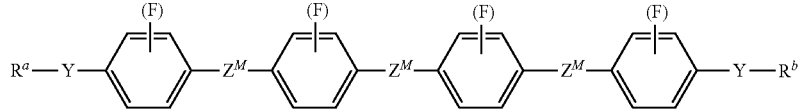
(M1-41)
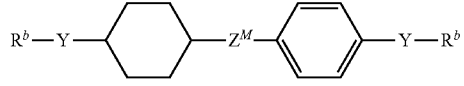
(M2-1)
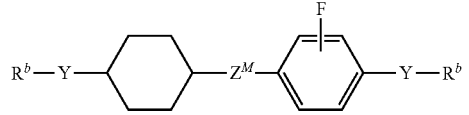
(M2-2)
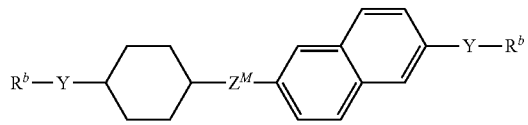
(M2-3)
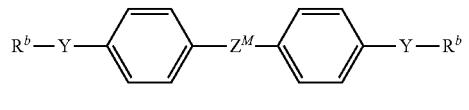
(M2-4)
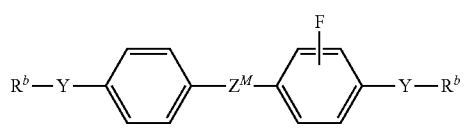
(M2-5)
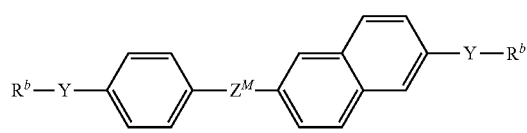
(M2-6)
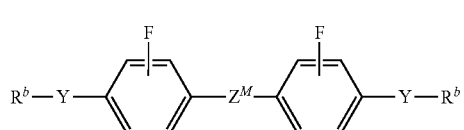
(M2-7)
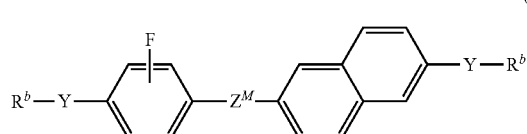
(M2-8)
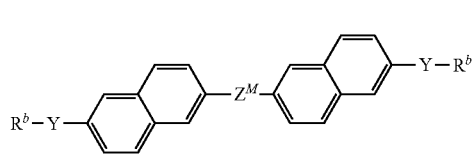
(M2-9)
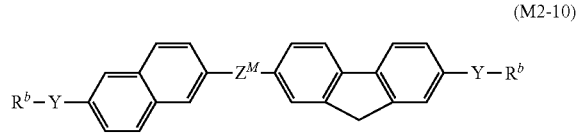
(M2-10)

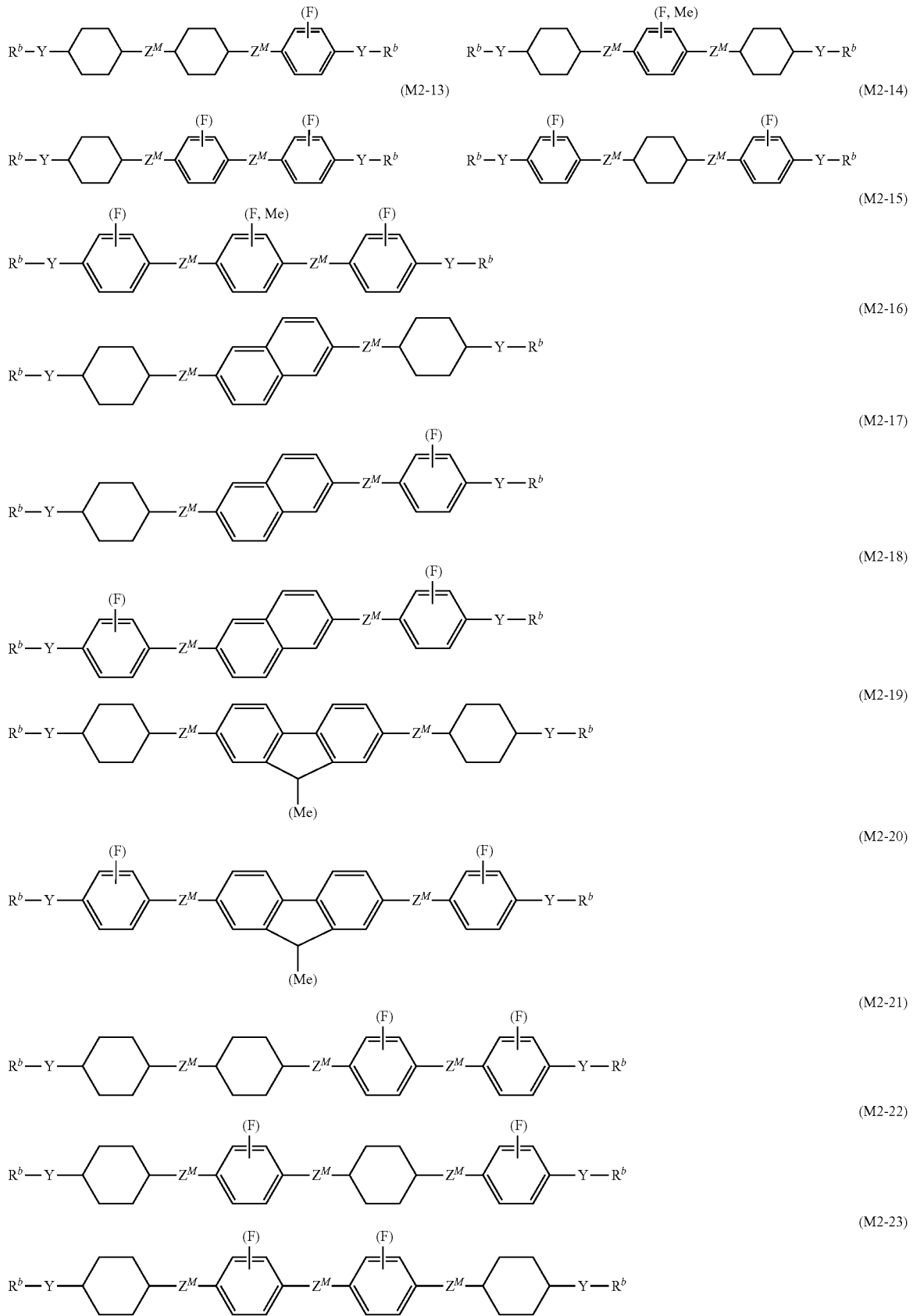

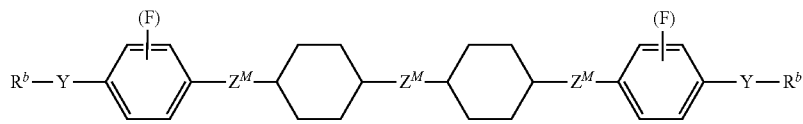

(M2-24)

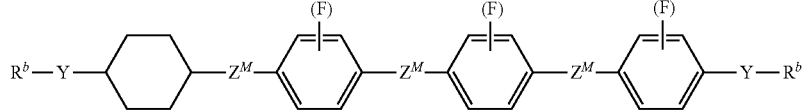

(M2-25)

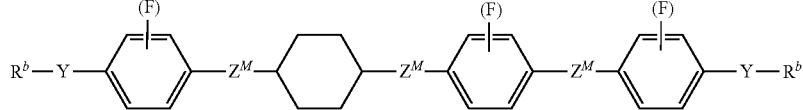

(M2-26)

(M2-27)

A polymerizable compound other than the monomer having no mesogen moiety and the monomers (M1) and (M2) having mesogen moiety may be used, if desired.

In order to optimize the optical isotropy of the polymer/liquid crystal composite material of the present invention, a monomer having a mesogen moiety and three or more polymerizable functional groups can also be used. The monomer having a mesogen moiety and three or more polymerizable functional groups is preferably a well-know compound, for example, (M4-1)-(M4-3), and more specifically, the compounds described in Japanese Patent Publication Nos. 2000-327632, 2004-182949, and 2004-59772. In (M4-1)-(M4-3), $R^b$, $Z^M$, Y, and (F) have the same meaning as described above.

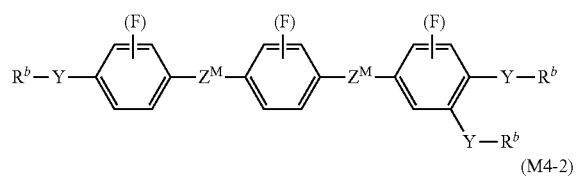

(M4-1)

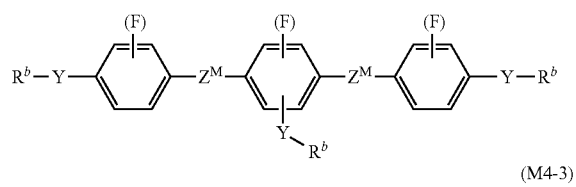

(M4-2)

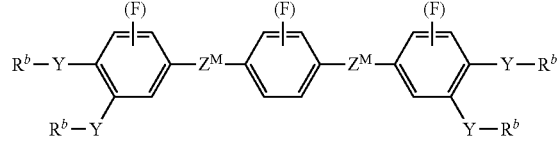

(M4-3)

5.2.2 Monomer Having No Mesogen Moiety and Having Polmerizable Functional Group Examples of the monomer having no mesogen moiety and having a polymerizable group are linear or branched acrylate of 1-30 carbons, linear or branched diacrylate of 1-30 carbons, and a monomer having three or more polymerizable groups, for example, but not limited to, glycerol-propoxide (1PO/OH) triacrylate, pentaerythritol-propoxide triacrylate, pentaerythritol triacrylate, trimethylolpropane-ethoxide triacrylate, trimethylolpropane-propoxide triacrylate, trimethylolpropane triacrylate, di(trimethylolpropane)tetraacrylate, pentaerythritol tetraacrylate, di(pentaerythritol)pentaacrylate, di(pentaerythritol)hexaacrylate, and trimethylolpropane triacrylate.

5.2.3 Polymerization Initiator

The polymerization pattern used to produce the polymer compound for forming the composite material of the present invention has no particular limitation, and may be, for example, photo-radical polymerization, thermo-radical polymerization, and photo-cationic polymerization.

The photo-radical polymerization initiator useful for photo-radical polymerization is, for example, DAROCUR™ 1173 and DAROCUR 4265 (both are trade names, from Ciba Specialty Chemicals), IRGACURE™ 184, IRGACURE 369, IRGACURE 500, IRGACURE 651, IRGACURE 784, IRGACURE 819, IRGACURE 907, IRGACURE 1300, IRGACURE 1700, IRGACURE 1800, IRGACURE 1850, and IRGACURE 2959 (all are trade names, from Ciba Specialty Chemicals).

Preferred examples of the thermo-radical polymerization initiators useful for thermo-radical polymerization are benzoyl peroxide, diisopropyl peroxydicarbonate, tert-butyl peroxy(2-ethylhexanoate), tert-butyl peroxypivalate, tert-butyl peroxydiisobutyrate, lauroyl peroxide, dimethyl 2,2'-azobisisobutyrate (MAIB), di-t-butyl peroxide (DTBPO), azobisisobutyronitrile (AIBN), and azobiscyclohexanecarbonitrile (ACN), and the like.

Examples of the photo-cationic polymerization initiator useful for photo-cationic polymerization are diaryliodonium salt (referred to as "DAS", hereafter), and triarylsulfonium salt (referred to as "TAS", hereafter), and the like.

Examples of DAS are diphenyliodonium tetrafluoroborate, diphenyliodonium hexafluorophosphate, diphenyliodonium hexafluoroarsenate, diphenyliodonium trifluoromesylate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenyliodonium hexafluorophosphate, 4-methoxyphenylphenyliodonium hexafluoroarsenate, 4-methoxyphenylphenyliodonium trifluoromesylate, 4-methoxyphenylphenyliodonium trifluoroacetate, and 4-methoxyphenylphenyliodonium p-toluenesulfonate.

DAS may be sensitized by adding a photosensitizer, such as thioxanthone, phenothiazine, chlorothioxanthone, xanthone, anthracene, diphenyl anthracene, and rubrene.

Examples of TAS are triphenylsulfonium tetrafluoroborate, triphenylsulfonium hexafluorophosphate, triphenylsulfonium hexafluoroarsenate, triphenylsulfonium trifluoromesylate, triphenylsulfonium trifluoroacetate, triphenylsulfonium p-toluenesulfonate, triphenylsulfonium tetrakis(pentafluorophenyl)borate, 4-methoxyphenyldiphenylsulfonium tetrafluoroborate, 4-methoxy phenyldiphenylsulfonium hexafluorophosphate, 4-methoxyphenyldiphenylsulfonium hexafluoroarsenate, 4-methoxyphenyldiphenylsulfonium trifluoromesylate, 4-methoxyphenyldiphenylsulfonium trifluoroacetate, and 4-methoxyphenyldiphenylsulfonium p-toluenesulfonate, and the like.

Specific examples of the photo-cationic polymerization initiator are Cyracure™ UVI-6990, Cyracure UVI-6974, and Cyracure UVI-6992 (all are trade names, from UCC Corporation); Adeka Optomer SP-150, Adeka Optomer SP-152, Adeka Optomer SP-170, Adeka Optomer SP-172 (all are trade names, from ADEKA Corporation), Rhodorsil Photoinitiator 2074 (trade name, from RHODIA JAPAN Corporation), IRGACURE™ 250 (trade name, from Ciba Specialty Chemicals), and UV-9380C (trade name, from GE TOSHIBA SILICONES Co. Ltd), and the like.

5.2.4 Curing Agents and Others

In preparing the polymer compound for forming the composite material of the present invention, in addition to the monomers and the polymerization initiator above, one or two or more other preferred components, such as, curing agent, catalyst, and stabilizer, may also be further added.

The latent curing agents well-known in the art which are commonly used as curing agent for epoxy resins may be used. Examples of the latent curing agent for epoxy resins are amine-based curing agents, novolac resin-based curing agents, imidazole-based curing agents, and anhydride-based curing agents, and the like. Examples of amine-based curing agents are aliphatic polyamines such as diethylenetriamine, triethylenetetraamine, tetraethylenepentaamine, m-xylenediamine, trimethyl hexamethylenediamine, 2-methyl pentamethylenediamine, and diethylaminopropylamine; alicyclic polyamines such as isophorone diamine, 1,3-diaminomethylcyclohexane, bis(4-aminocyclohexyl)methane, norbornanediamine, 1,2-diaminocyclohexane, and Laromin; and aromatic polyamines such as diaminodiphenylmethane, diaminodiphenylethane, and m-phenylenediamine.

Examples of novolac-based curing agents are phenolic novolac resin, and bisphenolic novolac resin, and the like. Examples of imidazole-based curing agents are 2-methylimidazole, 2-ethylhexylimidazole, 2-phenylimidazole, and 1-cyanoethyl-2-phenylimidazolium trimellitate, and the like.

Examples of anhydride-based curing agents are tetrahydrophthalic anhydride, hexahydrophthalic anhydride, methyltetrahydrophthalic anhydride, methylhexahydrophthalic anhydride, methylcyclohexene tetracarboxylic dianhydride, phthalic anhydride, trimellitic anhydride, pyromellitic dianhydride, and benzophenone tetracarboxylic dianhydride, and the like.

Furthermore, a curing accelerator may further be used to facilitate the curing reaction of a polymerizable compound with glycidyl, epoxy, or oxetanyl and the curing agent. Examples of the curing accelerator are tertiary amines such as benzyldimethylamine, tris(dimethylaminomethyl)phenol, and dimethylcyclohexylamine; imidazoles such as 1-cyanoethyl-2-ethyl-4-methylimidazole, and 2-ethyl-4-methylimidazole; organophosphorus compounds such as triphenylphosphine; quaternary phosphosium salts such as tetraphenylphosphosium bromide; diazobicyclo alkenes such as 1,8-diazobicyclo[5.4.0]undecene-7 or an organic acid salt thereof; quaternary ammonium salts such as tetraethylammonium bromide, and tetrabutylammonium bromide; boron compounds such as boron trifluoride, and triphenyl borate, and the like. These curing accelerators may be used alone, or in a combination of two or more.

Moreover, a stabilizer is preferably added, for example, to prevent unwanted polymerization during storage. The stabilizer may be any compound well known to those of ordinary skill in the art, representative examples of which are 4-ethoxyphenol, hydroquinone, and butylated hydroxytoluene (BHT), and the like.

5.3 Content of Liquid Crystal Composition

The content of the liquid crystal composition in the polymer/liquid crystal composite material of the present invention is preferably as high as possible, so long as it is within a range in which the composite material exhibits an optically isotropic liquid crystal phase. The reason lies in the fact that the higher the content of the liquid crystal composition is, the greater the electric birefringence value of the composite material of the present invention is.

In the polymer/liquid crystal composite material of the present invention, the content of the liquid crystal composition is preferably 60-99 wt %, more preferably 60-95 wt %, and particularly preferably 65-95 wt %, with respect to the composite material. The content of the polymer is preferably 1-40 wt %, more preferably 5-40 wt %, and particularly preferably 5-35 wt %, with respect to the composite material.

5.4 Other Components

The polymer/liquid crystal composite material of the present invention may also contain, for example, a dichroic dye and a photochromic compound, without prejudice to the effect of the present invention.

The present invention is further described in detail with reference to examples; however, the present invention is not limited to thereto. Furthermore, "%" denotes "wt %", unless specifically indicated.

6 Optical Device

A sixth aspect of the present invention is an optical device, which contains the liquid crystal composition or the polymer/liquid crystal composite material (hereafter, both are sometimes collectively referred to as liquid crystal medium) and is driven in an optically isotropic liquid crystal phase.

The liquid crystal medium is optically isotropic in the absence of an electric field and exhibits an optical anisotropy in the presence of an electric field, such that optical modulation may be achieved with an electric field.

As an example of the structure of the LCD device, as shown in FIG. 1, the electrodes on the comb-like electrode substrate have such a structure that Electrode 1 extending from the left side and Electrode 2 extending from the right side are alternatively arranged. When a potential difference exists between Electrode 1 and Electrode 2, the comb-like electrode substrate is provided with an electric field in two directions (upward and downward), as shown in FIG. 1.

EXAMPLES

The resulting compound is characterized by a nuclear magnetic resonance (NMR) spectrum obtained by $^1$H-NMR analysis and a gas chromatogram obtained by gas chromatography (GC) analysis. The analysis methods are firstly illustrated below.

$^1$H-NMR analysis: $^1$H-NMR analysis was carried out by using DRX-500 (manufactured by Bruker BioSpin Co., Ltd). In the measurement, a sample prepared in an embodiment was dissolved in a deuterated solvent, such as CDCl$_3$, which is capable of dissolving the sample, and then was measured with a NMR apparatus at 500 MHz at room temperature in 24 times of accumulation. In the resulting NMR spectrum, s denotes singlet, d denotes doublet, t denotes triplet, q denotes quartet, and m denotes multiplet. Furthermore, tetramethylsilane (TMS) was used as the standard of chemical shift δ of zero.

GC analysis: GC analysis was carried out by using a GC apparatus Model GC-14B (manufactured by Shimazu). The column was the capillary column CBP1-M25-025 (length 25=m, inner diameter=0.22 mm, film thickness=0.25 μm, manufactured by Shimazu); and the stationary liquid phase was polydimethylsiloxane (non-polarity). The carrier gas was helium, and the flow rate was adjusted to 1 ml/min. The sample evaporation chamber was set at 300° C., and the detector (flame ionization detector, FID) was set at 300° C.

A sample was dissolved in toluene to give a solution of 1 wt %, and then 1 μl of the solution was injected into the sample evaporation chamber.

The recorder used was Chromatopac Model C-R6A (manufactured by Shimazu) or an equivalent thereof. The obtained gas chromatogram exhibited peak retention times and peak areas corresponding to the component compounds.

In addition, the solvent for diluting the sample was, for example, chloroform or hexane. The column used was, for example, capillary column DB-1 (length=30 m, inner diameter=0.32 mm, film thickness=0.25 m, manufactured by Agilent Technologies Inc.), HP-1 (length=30 m, inner diameter=0.32 mm, film thickness=0.25 μm., manufactured by Agilent Technologies Inc.), Rtx-1 (length=30 m, inner diameter=0.32 mm, film thickness=0.25 μm, manufactured by Restek Corporation), or BP-1 (length=30 m, inner diameter=0.32 mm, film thickness=0.25 μm, manufactured by SGE International Pty. Ltd.).

The area ratios of the peaks in the gas chromatogram correspond to the ratios of the component compounds. Generally, the weight percentages of the component compounds in the analyzed sample are not completely identical to the area percentages of the peaks. However, in the present invention, when the columns described above are used, the correction coefficient is substantially 1. Therefore, the weight percentages of the component compounds in the analyzed sample are substantially corresponding to the area percentages of the peaks. The reason lies in that there is no significant difference among the correction coefficients of the component compounds. In order to more accurately calculate the ratios of the liquid crystal compounds in the liquid crystal composition with GC, the internal standard method for GC may be used. GC measurements were simultaneously performed on an accurately weighed specified amount of a liquid crystal compound component (detected component) and a liquid crystal compound as standard (standard), and the relative intensity was previously calculated as peak area ratio of the detected component to the standard. If a correction was performed by using the relative intensity expressed as peak area ratio of each component to the standard, the ratios of the liquid crystal compounds in the liquid crystal composition can be more accurately calculated with GC analysis.

Samples for Determining Characteristic Values of Liquid Crystal Compounds

Two methods may be used to measure the characteristic values of a liquid crystal compound, i.e., taking a pure compound as a sample, and mixing a compound in a mother liquid crystal to form a sample.

When a sample prepared by mixing a compound with a mother liquid crystal is used, the following method is used for the measurement. Firstly, 15 wt % of the resulting liquid crystal compound was mixed with 85 wt % of the mother liquid crystal to prepare a sample, and then an extrapolated value is calculated from the measured value of the sample according to the extrapolation method based on the equation below, as the characteristic value of the compound.

[Extrapolated Value]=(100×[measured value of the sample]−[wt % of the mother liquid crystal]× [measured value of the mother liquid crystal])/ [wt % of the liquid crystal compound]

While a smectic phase or crystal may be precipitated at the above ratio of the liquid crystal compound and the mother liquid crystal at 25° C., the ratio of the liquid crystal compound and the mother liquid crystal is changed to be 10 wt %:90 wt %, 5 wt %:95 wt %, 1 wt %:99 wt % in order. The composition without separation of a smectic phase or crystal at 25° C. was measured for the characteristic value of the samples, and the characteristic values of the liquid crystal compound is calculated through extrapolation based on above equation.

There are numerous mother liquid crystals that may be used for the measurement. For example, the composition of the mother liquid crystal A is as follows (wt %).

Mother Liquid Crystal A:

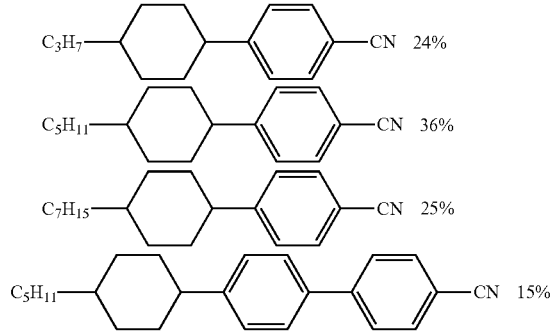

Method for Measuring Characteristic Values of Liquid Crystal Compounds

The measurement of the characteristic values was carried out with the methods below. These methods are mainly those described in EIAJ•ED-12521A of the Standard of Electric Industries Association of Japan, or modifications of the same. Moreover, the TN device used in the measurement was not equipped with TFT.

With respect to the determined values, in case that the liquid crystal compound itself is used as a sample, the obtained values are recorded as experimental data; and in case that a mixture of the liquid crystal compound and a mother liquid crystal is used as a sample, the extrapolated values obtained with the extrapolation method are recorded as experimental data.

The phase structure and the phase transition temperature (° C.) were measured by using the methods (1) and (2) below.

(1) A compound was placed on a hot plate (Hot Stage, Model FP-52, manufactured by Mettler, Corp.) in a melting point measuring apparatus equipped with a polarizing microscope, and the phase behaviour and its change were observed by the polarizing microscope while the sample was heated at a rate of 3° C./min, to determine the type of the liquid crystal phase.

(2) A scanning calorimetry DSC-7 system or Diamond DSC system (manufactured by PerkinElmer Corp.) was used, at a heating or cooling rate of 3° C./min, and the on set of the endothermic peak or the exothermic peak along with the phase change of the sample was calculated with the extrapolation method, to determine the phase transition temperature.

Hereafter, a crystal is represented by K, and for differentiation, two crystals are represented by $K_1$ or $K_2$, respectively. A smectic phase is represented by Sm, a nematic phase is represented by N, and a liquid (isotropic phase) is represented by I. For differentiation, a smectic B phase and a smectic A phase in the smectic phase are represented by SmB and SmA, respectively. BP represents a blue phase or an optically isotropic liquid crystal phase. A biphase coexistence is sometimes represented by (N*+I) or (N*+BP). Specifically, (N*+I) represents a phase in which a non-liquid crystal isotropic phase and a chiral nematic phase coexist, and (N*+BP) represents a phase in which a BP phase or an optically isotropic liquid crystal phase and a chiral nematic phase coexist. Un represents a non-optically isotropic unidentified phase. For the expression of the phase transition temperature, for example, "K 50.0 N 100.0 I" means that the phase transition temperature (KN) from the crystal to the nematic phase is 50.0° C., and the phase transition temperature (NI) from the nematic phase to the liquid is 100.0° C. This also applies to the case of other expressions.

Upper-limit temperature of a nematic phase ($T_{NI}$, ° C.): a sample (a mixture of a liquid crystal compound and a mother liquid crystal) was placed on a hot plate (Hot Stage, Model FP-52, manufactured by Mettler Corp.) in a melting point measuring apparatus equipped with a polarizing microscope, and was observed with the polarizing microscope while the sample was heated at a rate of 1° C./min. The temperature at which a part of the sample began to change from a nematic phase into an isotropic liquid was recorded as the upper-limit temperature of the nematic phase, sometimes abbreviated as "upper-limit temperature" hereafter.

Low-temperature compatibility: samples were prepared by mixing a mother liquid crystal with a liquid crystal compound in such a manner that the content of the latter was 20 wt %, 15 wt %, 10 wt %, 5 wt %, 3 wt %, and 1 wt %, respectively, and then placed into glass bottles. The glass bottles were kept in a freezer at −10° C. or −20° C. for a specified period of time, and the presence or absence of a crystal or a smectic phase was observed.

Viscosity (η, determined at 20° C., mPa·s): the viscosity of a mixture of a liquid crystal compound and a mother liquid crystal is measured with an E-type rotational viscometer.

Refractive index anisotropy (Δn): the measurement was carried out at 25° C. by using light having a wavelength of 589 nm, with an Abbe refractometer having a polarizing plate mounted on an ocular lens. After the surface of the main prism is rubbed in a direction, a sample (a mixture of a liquid crystal compound and a mother liquid crystal) was dripped onto the main prism. The refractive index ($n_{//}$) was determined when the polarizing direction was paralleled to the rubbing direction, and the refractive index ($n_\perp$) was determined when the polarizing direction was perpendicular to the rubbing direction. The value of refractive index anisotropy (Δn) was calculated according to the equation $\Delta n = n_{//} - n_\perp$.

Dielectric anisotropy (Δ∈: determined at 25° C.): a sample (a mixture of a liquid crystal compound and a mother liquid crystal) was fed into a liquid crystal cell with a distance (cell gap) of about 9 μm between two glass substrates and a twist angle of 80 degrees. The liquid crystal cell was applied with a voltage of 20 V and the dielectric constant ($\in_{//}$) in the major-axis direction of the liquid crystal molecule was determined. Then, a voltage of 0.5 V was applied and the dielectric constant ($\in_\perp$) in the minor axis direction of the liquid crystal molecule was determined. The value of dielectric anisotropy was calculated according to the equation $\Delta\in = \in_{//} - \in_\perp$.

Pitch (P; Determined at 25° C., m)

A pitch length was measured through selective reflection (Handbook of Liquid Crystal, p 196, 2000, Maruzen). For the selective reflection wavelength λ, the relationship $<n>p/\lambda=1$ exists. Here, $<n>$ denotes the average refractive index, and is calculated according to the equation $<n> = \{(n_{//}^2 + n_\perp^2)/2\}^{1/2}$. The selective reflection wavelength was determined by a microspectrophotometer (Trade name MSV-350, manufactured by Japan Electronics Co., Ltd.). The pitch was calculated by dividing the resulting reflection wavelength by the average refractive index. When the concentration of the optically active compound is low, the pitch of a cholesteric liquid crystal having a reflection wavelength in a region of wavelength longer than that of visible light is proportional to the reciprocal of the concentration. Therefore, multiple points were measured for the pitch length of the liquid crystal having a selective reflection wavelength in the visible light region, and then the pitch was calculated by using a linear extrapolation method. The "optically active compound" is equivalent to the chiral reagent in the present invention.

Synthesis Example 1

Synthesis of Formula (S1-8)

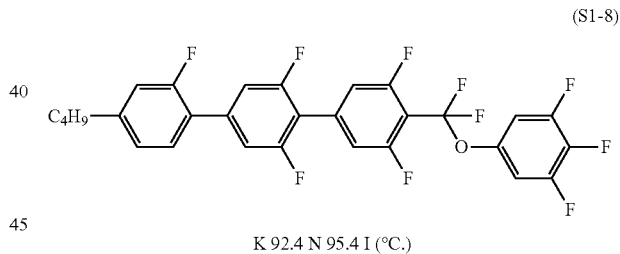

(S1-8)

K 92.4 N 95.4 I (°C.)

The synthesis scheme is as shown below.

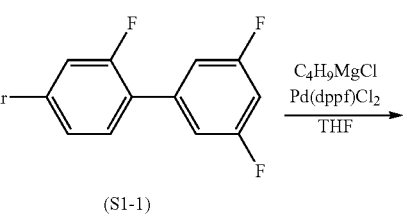

(S1-1)

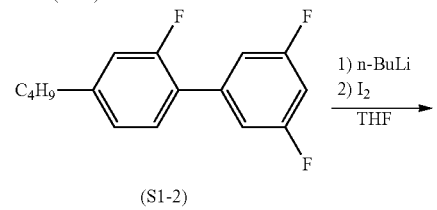

(S1-2)

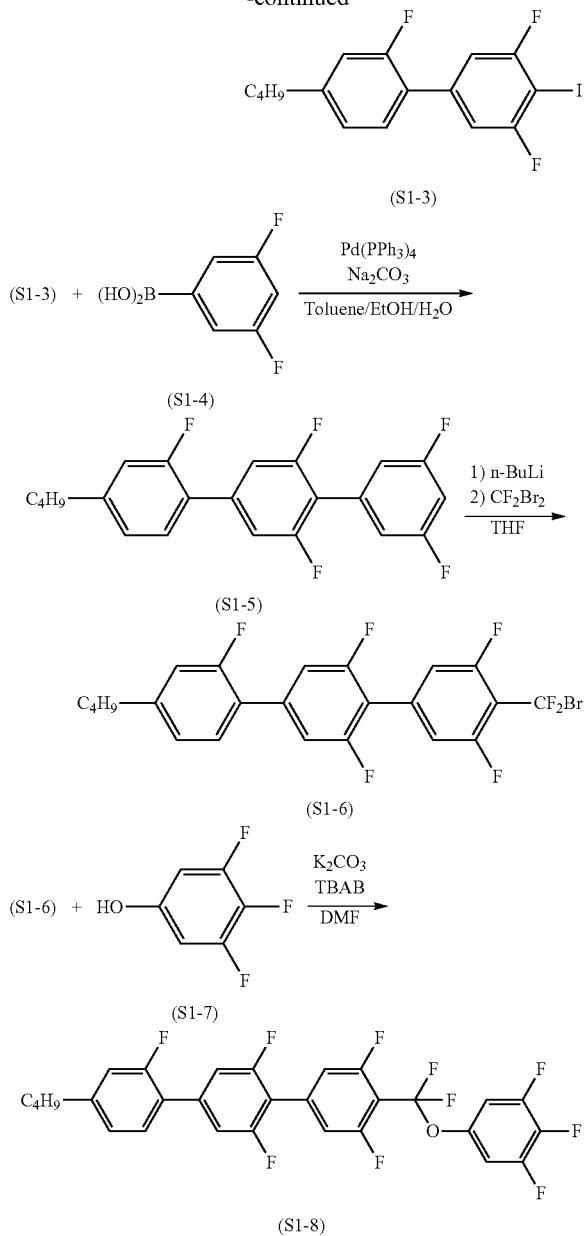

Synthesis of Compound (S1-2)

88.3 g (S1-1), 7.54 g catalyst, and 900 ml tetrahydrofuran (THF) were charged into a reactor under a nitrogen atmosphere, and 2 mol/L solution of butylmagnesium chloride in THF was added dropwise at room temperature, and refluxed for 4 h. The reaction solution was cooled to room temperature, which was added with toluene, and then washed with 1 N hydrochloric acid and water. After drying over magnesium sulfate, the solvent was removed under vacuum. After chromatography on silica gel column with heptane as a developing solvent, and drying under vacuum, 75.7 g (S1-2) was obtained. The yield of (S1-2) obtained from (S1-1) is 93.1%.

Synthesis of Compound (S1-3)

55.5 g (S1-2) and 550 ml THF were charged into a reactor under a nitrogen atmosphere, and cooled to −70° C., and then 161 ml n-BuLi (1.55 M; solution in n-hexane) was added dropwise and stirred for 1 hr at −70° C. 450 ml solution of 63.4 g iodine in THF was added dropwise to the reaction solution at −70° C., and stirred for 5 h. The reaction solution was warmed to room temperature, and then poured into a solution of sodium thiosulfate in water. The product was extracted with ethyl acetate, and then the organic layer was washed with an aqueous sodium thiosulfate solution and water. After drying over magnesium sulfate, the solvent was removed through distillation under vacuum. After chromatography on silica gel column with heptane/toluene=3/1 as a developing solvent, and drying under vacuum, 79.1 g (S1-3) was obtained. The yield of (S1-3) obtained from (S1-2) is 97.5%.

Synthesis of Compound (S1-5)

79.1 g (S1-3), 38.4 g 3,5-difluorophenylboronic acid (S1-4), 3.5 g tetrakis(triphenylphosphine)palladium, 70.9 g sodium carbonate, and 560 ml mixed solvent of toluene/ethanol/water=3/3/1 (volume ratio) were charged into a reactor under a nitrogen atmosphere, and refluxed for 7 h. The reaction solution was cooled to room temperature, which was added with toluene, and then washed with 1 N hydrochloric acid and water. After drying over magnesium sulfate, the solvent was removed through distillation under vacuum. After chromatography on silica gel column with heptane as a developing solvent, drying under vacuum, and recrystallization of the remaining component in a mixed solvent of ethanol/ethyl acetate=4/1, 50.6 g (S1-5) was obtained. The yield of (S1-5) obtained from (S1-3) is 66.2%.

Synthesis of Compound (S1-6)

15.0 g Compound (S1-5) and 150 ml THF were charged into a reactor under a nitrogen atmosphere, and then cooled to −74° C. 27.4 ml 1.60 M n-butyl lithium solution in n-hexane was added dropwise at a temperature in a range of −74° C. to −60° C., and then further stirred for 60 min. Then, 20.0 ml solution of 12.6 g dibromodifluoromethane in THF was added dropwise at a temperature in a range of −75° C. to −70°, warmed back to 25° C., and stirred for 60 min. The resulting reaction mixture was poured into 150 ml ice water, and mixed. 100 ml toluene was added, to form an organic layer and an aqueous layer separated from each other, and the resulting organic layer was obtained through extraction, which was washed with brine, and dried over anhydrous magnesium sulfate. The resulting solution was concentrated under vacuum, and the residue was purified by chromatography on silica gel column with heptane as a developing solvent. After removal of the solvent through distillation, and drying, 16.5 g (S1-6) was obtained.

Synthesis of Compound (S1-8)

6.0 g Compound (S1-6), 1.4 g 3,4,5-trifluorophenol (S1-7), 2.8 g potassium carbonate, 100 ml N,N-dimethylformamide (DMF) were charged into a reactor under a nitrogen atmosphere, and stirred for 120 min at 90° C. After the temperature of the reaction mixture was returned back to 25° C., the reaction mixture was then poured into 50 ml ice water and mixed. 100 ml toluene was added, to form an organic layer and an aqueous layer separated from each other, and the resulting organic layer was obtained through extraction, which was then washed with a saturated aqueous sodium bicarbonate solution, 0.5 N aqueous sodium hydroxide solution, and saline in sequence, and dried over anhydrous magnesium sulfate. The resulting solution was concentrated under vacuum, and the residue was purified by chromatography on silica gel column with heptane as a developing solvent. Then, after purification through recrystallization in a mixed solvent of heptane/Solmix A-11 and drying, 1.7 g (S1-8) was obtained. The yield of (S1-8) obtained from (S1-5) is 20.4%.

The phase transition temperature of the resulting Compound (S1-8) is as follows.

Phase transition temperature (° C.): K 92.4 N 95.4 I.

The resulting compound was identified to be (S1-9) through the following chemical shift δ (ppm) obtained with $^1$H-NMR analysis using $CDCL_3$ as solvent. Chemical shift δ (ppm): 7.36 (t, 1H), 7.26-7.20 (m, 4H), 7.08 (d, 1H), 7.04-6.99 (m, 3H), 2.67 (t, 2H), 1.67-1.64 (m, 2H), 1.41-1.37 (m, 2H), 0.96 (t, 3H).

Physical Properties of Liquid Crystal Compound (S1-8)

The four compounds designated as mother liquid crystal A above were mixed, to prepare a mother liquid crystal A having a nematic phase. The physical properties of the mother liquid crystal A are as follows.

Upper-limit temperature $(T_{NI})$=71.7° C.; dielectric anisotropy (Δ∈)=11.0; and refractive index anisotropy (Δn)=0.137.

Liquid Crystal Composition B containing 90 wt % of the mother liquid crystal A and 10 wt % of (S1-8) obtained in Synthesis Example 1 was prepared. The characteristic values of the resultant Liquid Crystal Composition B were determined. The extrapolated characteristic values of Liquid Crystal Compound (S1-8) calculated based on the measurements through extrapolation are as follows.

Upper-limit temperature $(T_{NI})$=54.7° C.; dielectric anisotropy (Δ∈)=54.2; and refractive index anisotropy (Δn)=0.167. It can be known from the results that, Liquid Crystal Compound (S1-8) has a large dielectric anisotropy (Δ∈), and refractive index anisotropy (Δn).

Synthesis Examples 2-4

Synthesis of (S2-1), (S3-1), and (S4-1)

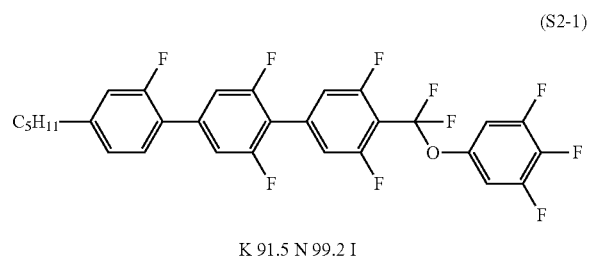

K 91.5 N 99.2 I

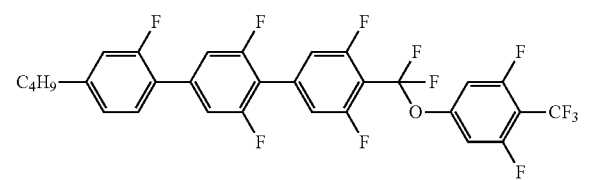

K 95.7(SmA 85.9) N 96.8 I

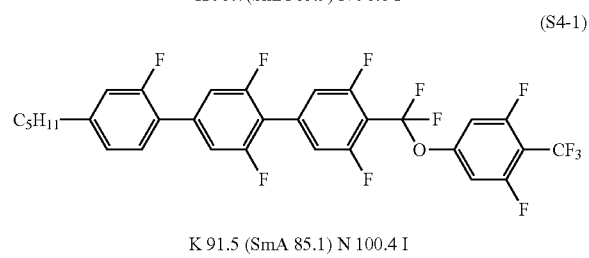

K 91.5 (SmA 85.1) N 100.4 I

The unit of the phase transition temperature is ° C.

Synthesis of Compounds (S2-1), (S3-1), and (S4-1)

The compounds are synthesized with suitable reagents following the method of Synthesis Example 1.

Physical Properties of Liquid Crystal Compound (S2-1)

The four compounds designated as mother liquid crystal A above were mixed, to prepare a mother liquid crystal A having a nematic phase. The physical properties of the mother liquid crystal A are as follows.

Upper-limit temperature $(T_{NI})$=71.7° C.; dielectric anisotropy (Δ∈)=11.0; and refractive index anisotropy (Δn)=0.137.

Liquid Crystal Composition C containing 90 wt % of the mother liquid crystal A and 10 wt % of (S2-1) obtained in Synthesis Example 2 was prepared. The characteristic values of the resultant Liquid Crystal Composition C were determined. The extrapolated characteristic values of the Liquid Crystal Compound (S2-1) calculated based on the measurements through extrapolation are as follows.

Upper-limit temperature $(T_{NI})$=61.7° C.; dielectric anisotropy (Δ∈)=51.1; and refractive index anisotropy (Δn)=0.177.

It can be known from the results that Liquid Crystal Compound (S2-1) has a large dielectric anisotropy (Δ∈) and refractive index anisotropy (Δn).

Physical Properties of Liquid Crystal Compound (S3-1)

Liquid Crystal Composition D containing 95 wt % of the mother liquid crystal A and 5 wt % of (S3-1) obtained in Synthesis Example 2 was prepared. The characteristic values of the resultant Liquid Crystal Composition C were determined. The extrapolated characteristic values of Liquid Crystal Compound (S3-1) calculated based on the measurements through extrapolation are as follows.

Upper-limit temperature $(T_{NI})$=55.7° C.; dielectric anisotropy (Δ∈)=68.1; and refractive index anisotropy (Δn)=0.177.

It can be known from the results that Liquid Crystal Compound (S3-1) has a very large dielectric anisotropy (Δ∈).

Physical Properties of Liquid Crystal Compound (S4-1)

Liquid Crystal Composition E containing 90 wt % of the mother liquid crystal A and 10 wt % of (S4-1) obtained in Synthesis Example 2 was prepared. The characteristic values of the resultant Liquid Crystal Composition E were determined. The extrapolated characteristic values of the Liquid Crystal Compound (S4-1) calculated based on the measurements through extrapolation are as follows.

Upper-limit temperature $(T_{NI})$=59.7° C.; dielectric anisotropy (Δ∈)=65.9; and refractive index anisotropy (Δn)=0.167.

It can be known from the results that Liquid Crystal Compound (S4-1) has a very large dielectric anisotropy (Δ∈).

Synthesis Example 5

Synthesis of (S5-3)

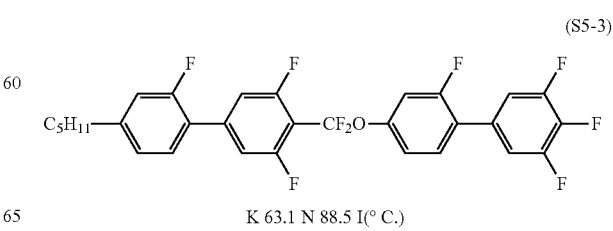

K 63.1 N 88.5 I(° C.)

The synthesis scheme is as shown below.

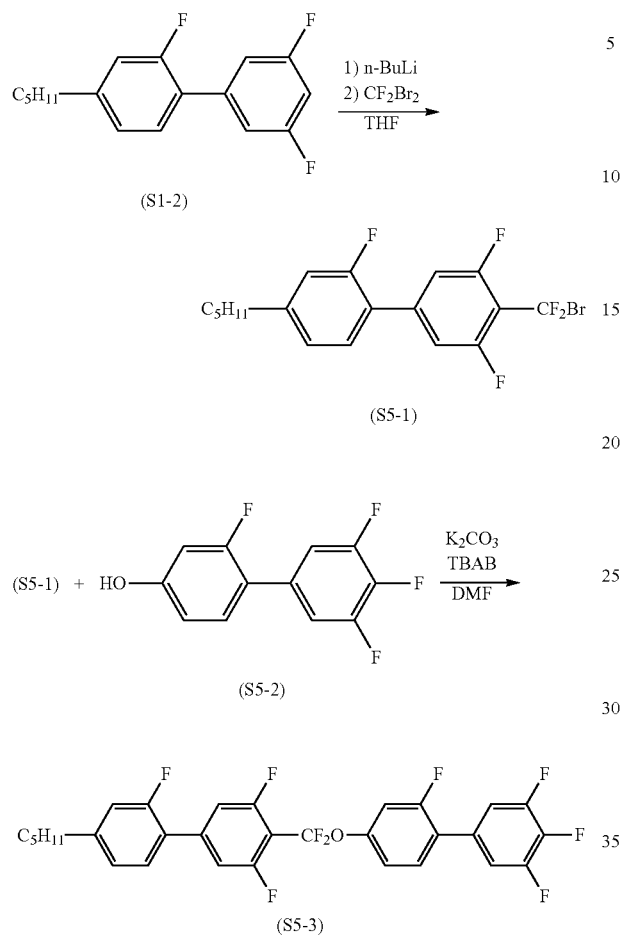

Synthesis of Compound (S5-3)

Synthesis of (S5-1) from (S1-2) is achieved following the method for synthesizing (S1-6) from (S1-5) in Synthesis Example 1, in which (S1-2) is used in place of (S1-5). Synthesis of (S5-3) from (S5-1) is achieved following the method for synthesizing (S1-8) from (S1-6) in Synthesis Example 1, in which (S5-1) is used in place of (S1-6), and (S5-2) is used in place of (S1-7). The phase transition temperature of the resultant compound (S5-3) is as follows.

Phase transition temperature (° C.): K 63.1N 88.5 I.

Physical Properties of Liquid Crystal Compound (S5-3)

Liquid Crystal Composition F containing 85 wt % of the mother liquid crystal A and 15 wt % of (S5-3) obtained in Synthesis Example 5 was prepared. The characteristic values of the resultant Liquid Crystal Composition F were determined. The extrapolated characteristic values of the Liquid Crystal Compound (S5-3) calculated based on the measurements through extrapolation are as follows.

Upper-limit temperature ($T_{NI}$)=55.7° C.; dielectric anisotropy ($\Delta\in$)=42.1; and refractive index anisotropy ($\Delta n$)=0.164.

It can be known from the results that Liquid Crystal Compound (S5-3) has good compatibility with other liquid crystal compounds, and has a large dielectric anisotropy ($\Delta\in$), and refractive index anisotropy ($\Delta n$).

Synthesis Example 6

Synthesis of (S6-1)

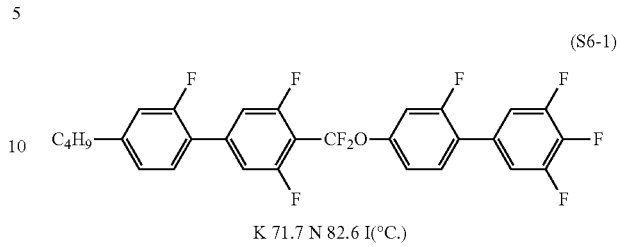

K 71.7 N 82.6 I(°C.)

Synthesis of Compound (S6-1)

(S6-1) is synthesized following the method for synthesizing (S5-3) in Synthesis Example 5.

Physical Properties of Liquid Crystal Compound (S6-1)

Liquid Crystal Composition G containing 85 wt % of the mother liquid crystal A and 15 wt % of (S6-1) obtained in Synthesis Example 6 was prepared. The characteristic values of the resultant Liquid Crystal Composition G were determined. The extrapolated characteristic values of the Liquid Crystal Compound (S6-2) calculated based on the measurements through extrapolation are as follows.

Upper-limit temperature ($T_{NI}$)=51.0° C.; dielectric anisotropy ($\Delta\in$)=43.4; and refractive index anisotropy ($\Delta n$)=0.164.

It can be known from the results that Liquid Crystal Compound (S6-1) has good compatibility with other liquid crystal compounds, and has a large dielectric anisotropy ($\Delta\in$) and refractive index anisotropy ($\Delta n$).

(Composition of the Present Invention)

In the present invention, the characteristic values of the liquid crystal compositions were measured following the methods below. The methods are mainly those described in EIAJ•ED-2521A of the Standard of Electric Industries Association of Japan or modifications of the same. The TN device used in the measurement was not equipped with TFT.

Upper-limit temperature of a nematic phase (NI, ° C.): a sample was placed on a hot plate in a melting point measuring apparatus equipped with a polarizing microscope, and heated at a rate of 1° C./min. The temperature at which a part of the sample began to change from a nematic phase into an isotropic liquid was recorded as the upper-limit temperature of the nematic phase, which is sometimes abbreviated as "upper-limit temperature".

Lower-limit temperature of a nematic phase ($T_C$, ° C.): a sample having a nematic phase was kept in a freezer at 0° C., −10° C., −20° C., −30° C., and −40° C. for 10 days, and observed for the liquid crystal phase. For example, in a case where the sample exhibits a nematic phase at −20° C., and is changed to a crystal or a smectic phase at −30° C., the $T_C$ is recorded as ≦−20° C. The lower-limit temperature of a nematic phase is sometimes abbreviated as "lower-limit temperature".

Transition temperature of an optically isotropic liquid crystal phase: a sample was placed on a hot plate in a melting point measuring apparatus equipped with a polarizing microscope, and in a crossed nicols state, initially heated to a temperature allowing the sample to change into a non-liquid crystal isotropic phase, and then cooled at a rate of 1° C./min until a chiral nematic phase or an optically isotropic liquid crystal phase was completely formed. The phase transition temperature during this cooling process was measured. Then, the temperature was raised at a rate of 1° C./min, and the phase transition temperature during this heating process was measured. In the present invention, unless specifically indicated, the phase transition temperature in the heating process was recorded as the phase transition temperature. Where it was difficult to determine the phase transition temperature of the optically isotropic liquid crystal phase in a dark field under crossed nicols, the phase transition temperature could be determined after the polarizing plate is deviated from the crossed polarization state by 1-10 degrees.

Viscosity (η, determined at 20° C., mPa·s): the viscosity was measured with an E-type rotational viscometer.

Rotational viscosity (γ1, determined at 25° C., mPa·s):

1) For a sample with a positive dielectric anisotropy: the measurement was carried out following the method described in M. Imai et al., *Molecular Crystals and Liquid Crystals*, Vol. 259, 37 (1995). The sample was placed into a TN device with a twist angle of 0 degree and a distance (cell gap) of 5 μm between two glass substrates. The TN device was applied with a voltage in a range of 16 to 19.5 V stepwise by 0.5 V. After a period of 0.2 s without voltage application a voltage application was repeated with a rectangular wave (rectangular pulse of 0.2 s), followed by a period of 2 s without voltage application. The peak current and the peak time of the transient current resulted from the application of the voltage were measured. Then, the value of rotational viscosity was calculated according to the measurements and the Equation (8) described on page 40 of the paper of M. Imai et al. The dielectric anisotropy value required for this calculation was obtained by using the device used in the measurement of the rotational viscosity, following the method for determining dielectric anisotropy below.

2) For a sample with a negative dielectric anisotropy: the measurement was carried out following the method described in M. Imai et al., *Molecular Crystals and Liquid Crystals*, Vol. 259, 37 (1995). The sample was placed into a vertical alignment (VA) device with a distance (cell gap) of 20 μm between two glass substrates. The device was applied with a voltage in a range of 30 to 50 V stepwise by 1 V. After a period of 0.2 s without voltage application, a voltage application was repeated with a rectangular wave (rectangular pulse of 0.2 s) followed by a period of 2 s without voltage application. The peak current and the peak time of the transient current resulted from the application of the voltage were measured. Then, the value of rotational viscosity was calculated according to the measurements and the Equation (8) described on page 40 of the paper of M. Imai et al. The dielectric anisotropy value required for this calculation was obtained by using the method for determining dielectric anisotropy below.

Refractive index anisotropy (Δn, determined at 25° C.): the measurement was carried out by using light having a wavelength of 589 nm, with an Abbe refractometer having a polarizing plate mounted on the ocular lens. After the surface of the main prism was rubbed in a direction, the sample was dropped onto the main prism. The refractive index ($n_{//}$) was determined when the polarizing direction was paralleled to the rubbing direction, and the refractive index ($n_\perp$) was determined when the polarizing direction was perpendicular to the rubbing direction. The value of refractive index anisotropy was calculated according the equation $\Delta n = n_{//} - n_\perp$. When the sample was a composition, the process could be used to determine the refractive index anisotropy. When the sample was a compound, the compound was mixed with a suitable composition for determining the refractive index anisotropy. In this case, the refractive index anisotropy value of the compound was an extrapolated value.

Dielectric anisotropy (Δ∈, determined at 25° C.): when the sample was a compound, the compound was mixed with a suitable composition for determining the dielectric anisotropy. In this case, the dielectric anisotropy value of the compound was an extrapolated value.

1) For a composition with a positive dielectric anisotropy: a sample was placed into a liquid crystal cell with a distance (gap) of about 9 μm between two glass substrates and a twist angle of 80 degrees. The liquid crystal cell was applied with a voltage of 20 V to determine the dielectric constant ($\in_{//}$) in the major axis direction of the liquid crystal molecule. Then, a voltage of 0.5 V was applied to determine the dielectric constant ($\in_\perp$) in the minor axis direction of the liquid crystal molecule. The value of dielectric anisotropy was calculated according to the equation $\Delta\in = \in_{//} - \in_\perp$.

2) For a composition with a negative dielectric anisotropy: a sample was placed into a liquid crystal cell which was processed into a homeotropic alignment, and a voltage of 0.5 v was applied to determine the dielectric constant ($\in_{//}$). Then, the sample was placed into a liquid crystal cell which was processed into a homogeneous alignment, and a voltage of 0.5 v was applied to determine the dielectric constant ($\in_\perp$). The value of dielectric anisotropy was calculated according to the equation $\Delta\in = \in_{//} - \in_\perp$.

Threshold voltage (Vth, determined at 25° C., V): when the sample was a compound, the compound was mixed with a suitable composition for determining the threshold voltage. In this case, the threshold voltage value of the compound was an extrapolated value. 1) For a composition with a positive dielectric anisotropy: a sample was placed into an LCD device of a normally white mode with a distance (gap) of (0.5/Δn) μm between two glass substrates and a twist angle of 80 degrees, in which Δn was the value of refractive index anisotropy determined by using the method above. A rectangular wave with a frequency of 32 Hz was applied to the device. Then, the voltage of the rectangular wave was increased, and the voltage value at which the transmittance of light through the device reached 90% was determined.

2) For a composition with a negative dielectric anisotropy: a sample was placed into an LCD device of a normally black mode with a distance (gap) of about 9 μm between two glass substrates, which was processed into a homeotropic alignment. A rectangular wave with a frequency of 32 Hz was applied to the device. Then, the voltage of the rectangular wave was increased, and the voltage value at which the transmittance of light through the device reached 10% was determined.

Voltage holding ratio (VHR, determined at 25° C., %): the TN device used for the determination had a polyimide alignment film and a distance (cell gap) of 6 μm between two glass substrates. A sample was placed into the device, which was then sealed with a UV-polymerizable adhesive. Then, the TN device was charged by applying a pulse voltage (5V, 60 ms). The voltage decay was determined by using a high-speed voltmeter at an interval of 16.7 ms, and the area A between the voltage curve and the horizontal axis per unit cycle was calculated. The area B was an area where no decay occurs. The voltage holding ratio was the percentage of the area A relative to the area B.

Helical pitch (determined at 20° C., μm): The helical pitch was measured according to the wedge cell method of Grandjean-Cano. A sample was injected into a wedge cell of Grandjean-Cano, and then the distance (a, in μm) between the disclination lines observed from the wedge cell was measured. The helical pitch (p) could be calculated according to the equation $p = 2 \cdot a \cdot \tan\theta$, in which θ is the angle between the two glass plates in the wedge cell.

Alternatively, the pitch length can be determined with selective reflection (Handbook of Liquid Crystal, p 196, issued in 2000, by Maruzen). For the selective reflection wavelength λ, the relationship <n>p/λ=1 exists, where <n> denotes the average refractive index, and can be calculated with the equation $<n>=\{(n_{//}^2+n_\perp^2)/2\}^{1/2}$. The selective reflection wavelength was determined with a microspectrophotometer (trade name MSV-350, manufactured by Japan Electronics Co., Ltd). The pitch was obtained by dividing the resulting reflection wavelength by the average refractive index.

When the concentration of the chiral reagent is low, the pitch of the cholesteric liquid crystal having a reflection wavelength in a region of wavelength longer than that of visible light is proportional to the reciprocal of the concentration. Therefore, multiple points were measured for the helical pitch length of the liquid crystal having a selective reflection wavelength in the visible light region, and the helical pitch was calculated by using a linear extrapolation method.

The proportion (percentage) of a component or a liquid crystal compound is weight percentage (wt %) based on the total weight of the liquid crystal compounds. The composition can be prepared by mixing the components including liquid crystal compounds after being weighed. Thus, the wt % of each component can be easily calculated.

Example 1

Liquid Crystal Composition A was prepared by mixing the liquid crystal compounds shown below at the following ratios.

Corresponding general formulas are shown at the right sides of the structural formulas.

Liquid Crystal Composition A

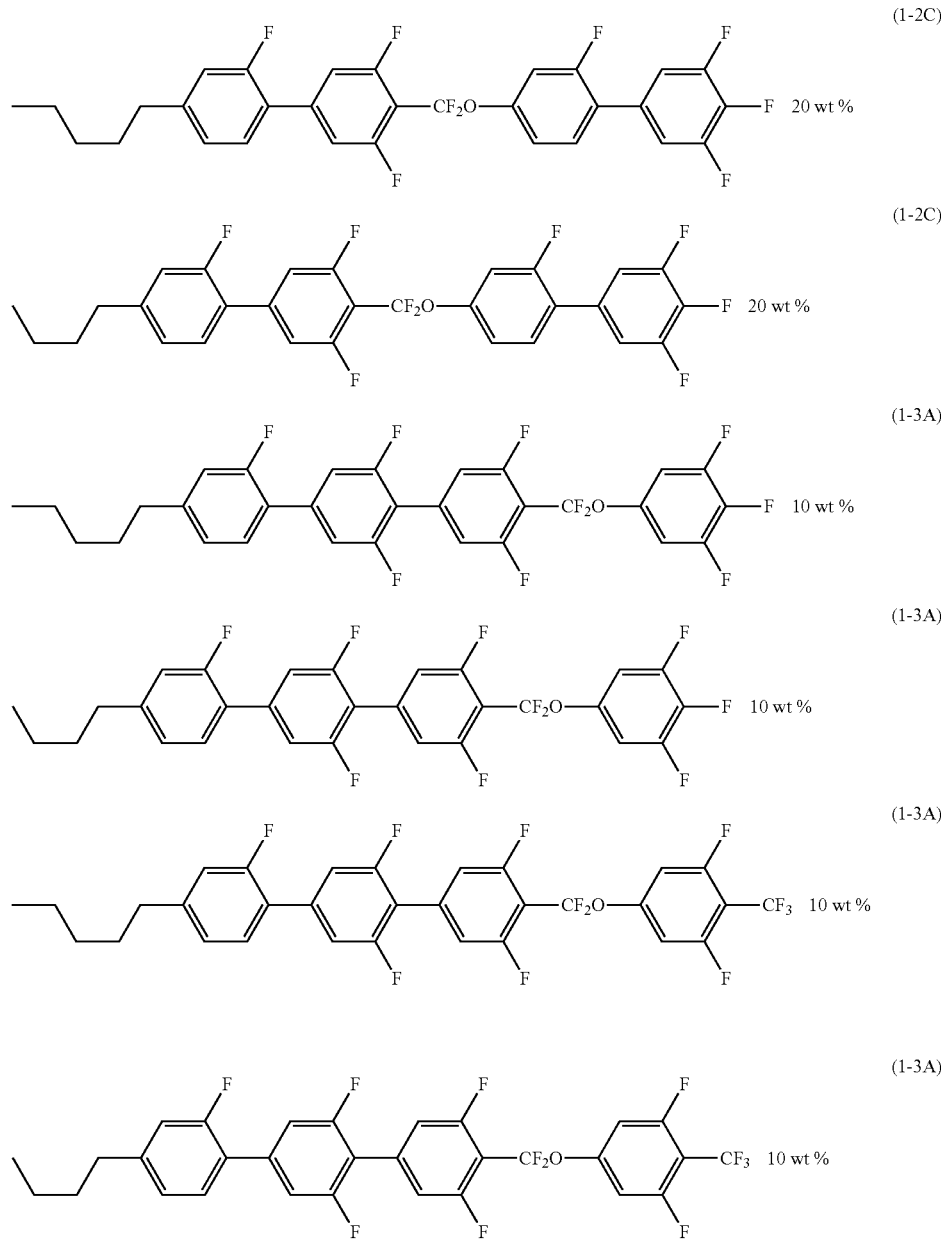

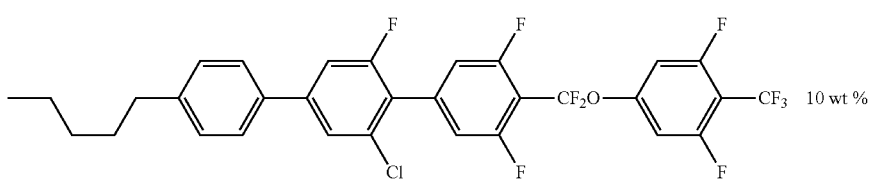

(2-1)

10 wt %

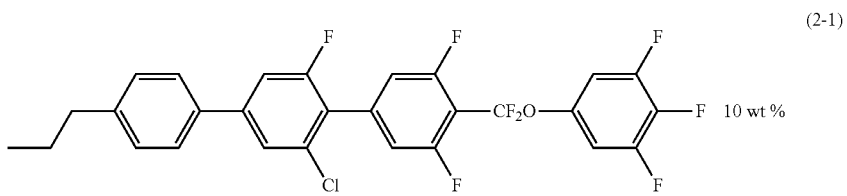

(2-1)

10 wt %

Then, Liquid Crystal Composition B containing Liquid Crystal Composition A (94 wt %) and a chiral reagent ISO-6OBA2 (6 wt %) of the formula below was obtained.

In addition, ISO-6OBA2 was obtained by esterifying isosorbide and 4-hexyloxybenzoic acid in the presence of dicyclohexyl Carbodiimide (DCC), and 4-dimethylpyridine.

ISO-6OBA2

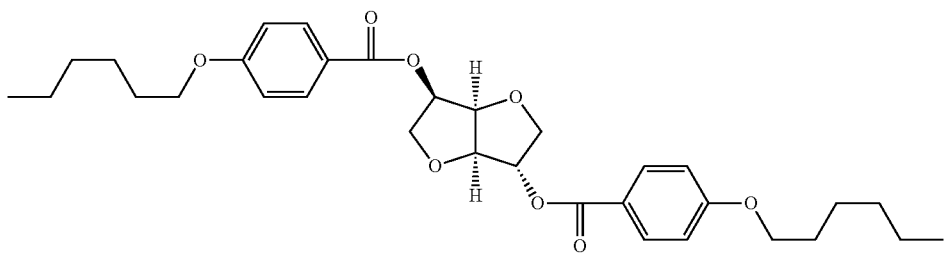

Example 2

Preparation of Mixture of Monomer and Liquid Crystal Composition

As a mixture of a monomer and a liquid crystal composition, Liquid Crystal Composition C-M was prepared by mixing 79.4 wt % liquid crystal composition B, 10.0 wt % n-dodecyl acrylate, 10.0 wt % 1,4-di(4-(6-(acryloxy)hexyloxy)benzoyloxy)-2-toluene, and 0.6 wt % 2,2'-dimethoxybenzylacetophenone as a photo polymerization initiator.

Preparation of Polymer/Liquid Crystal Composite Material

Liquid Crystal Composition C-M was held between a non-aligned comb-like electrode substrate and a glass substrate (without electrode) opposite to the comb-like electrode substrate with a cell thickness of 10 µm, and then the resulting liquid crystal cell was heated to 63.0° C. In this state, the cell was irradiated with UV light of 365 nm at an intensity of 23 mWcm$^{-2}$ for 1 min for polymerization.

The polymer/liquid crystal composite material C-P thus prepared could maintain an optically isotropic liquid crystal phase even being cooled to room temperature.

Furthermore, as shown in FIG. 1, the electrodes on the comb-like electrode substrate have such a structure that Electrode 1 extending from the left side and Electrode 2 extending from the right side are alternatively arranged. Thus, when a potential difference exists between Electrode 1 and Electrode 2, the comb-like electrode substrate can be provided with an electric field in two directions (upward and downward), as shown in FIG. 1.

Example 3

Figure 2:
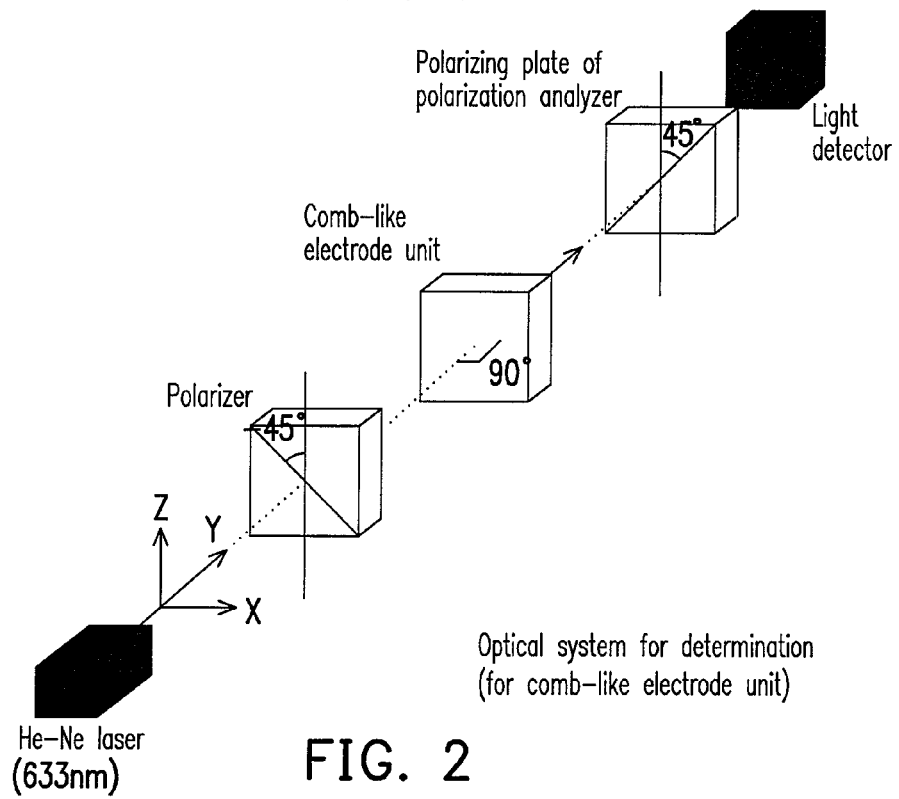
FIG. 2 shows an optical system used in an embodiment.

A liquid crystal cell holding the polymer/liquid crystal composite material C-1P obtained in Example 2 was disposed in the optical system of FIG. 2 to measure the electro-optic properties, as follows. Using the white light source of a polarizing microscope (ECLIPSE LV100POL, manufactured by Nikon) as a light source, the incident light from the white light source irradiated on the liquid crystal cell was perpendicular to the liquid crystal cell plane, and the line direction of the comb-like electrode was at 45 degrees with respect to the polarizer and the analyzer respectively. The relationship between the applied voltage and the transmittance was investigated by setting the measuring temperature at the clearing point (59.1° C.)–40° C. =19.1° C. If a rectangular wave of 47.6 V was applied, then the transmittance was up to 80%, and the transmitted light intensity was saturated.

Example 4

Liquid Crystal Composition D was prepared by mixing the liquid crystal compounds shown below at the following ratios.

Corresponding general formulas are shown at the right sides of the structural formulas.

Liquid Crystal Composition D
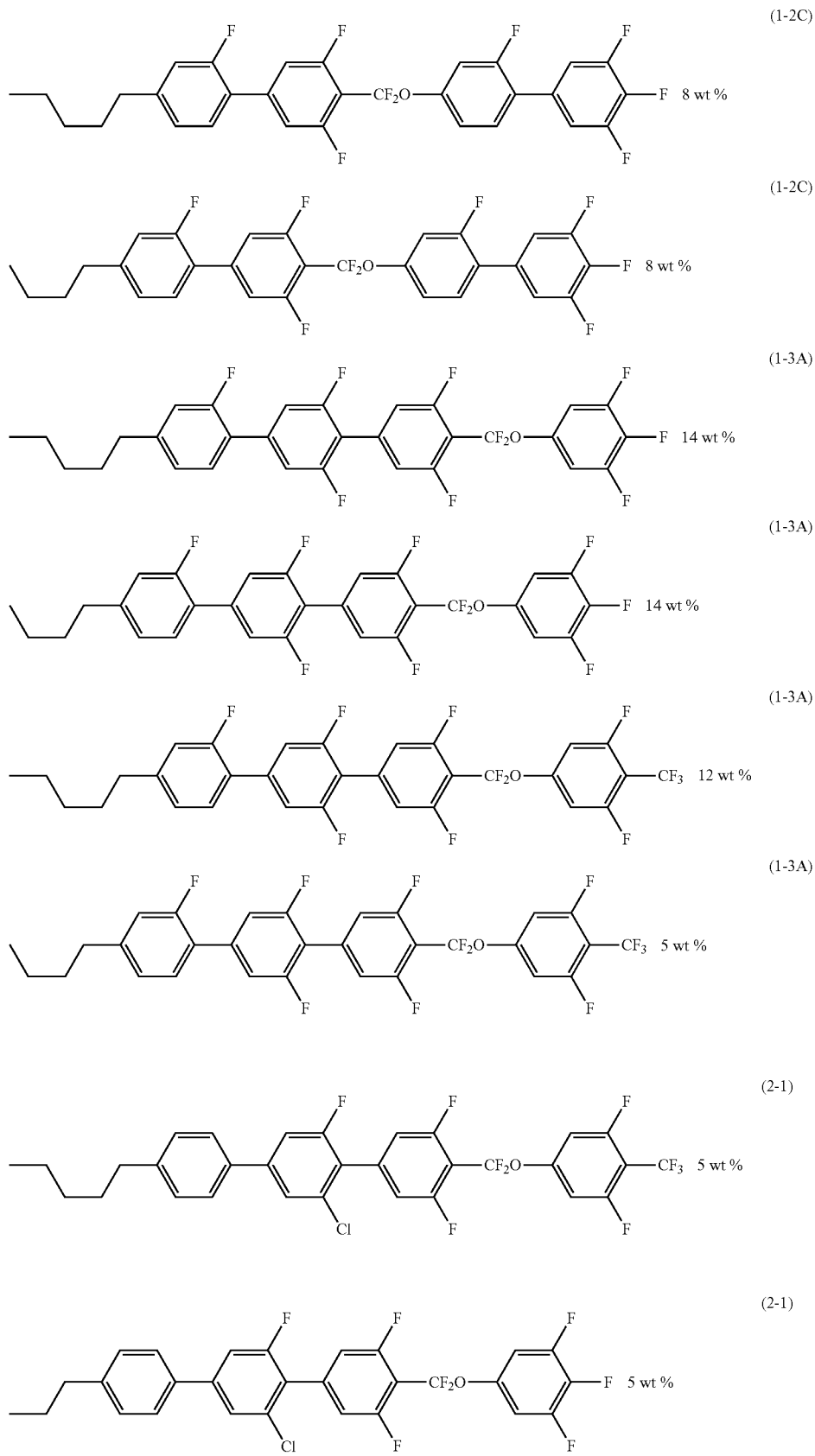

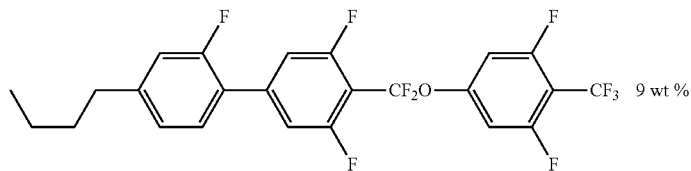

(16-24) 9 wt %

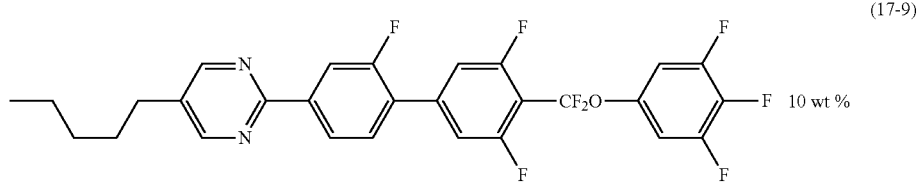

(17-9) 10 wt %

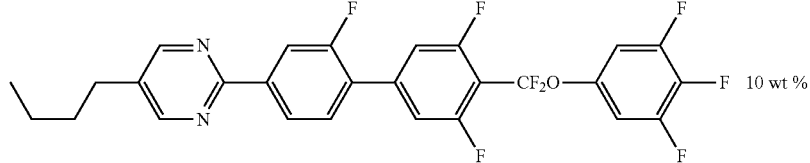

(17-9) 10 wt %

Then, Liquid Crystal Composition E containing Liquid Crystal Composition D (94 wt %) and a chiral reagent 2 (6.1 wt %) of the formula below was obtained.

Structural Formula of Chiral Reagent 2

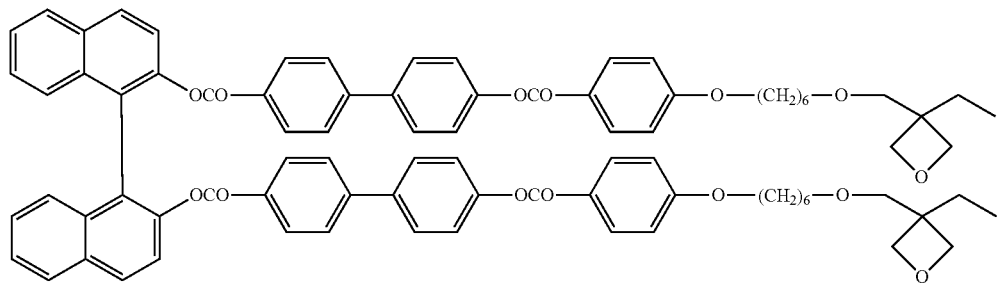

Example 5

Preparation of Mixture of Monomer and Liquid Crystal Composition

As a mixture of a monomer and a liquid crystal composition, Liquid Crystal Compositions F-M were prepared by mixing 87.4 wt % Liquid Crystal Composition E, 6.0 wt % n-dodecyl acrylate, 6.0 wt % 1,4-di(4-(6-(acryloxy)propoxy)benzoyloxy)-2-toluene, and 0.6 wt % 2,2'-dimethoxybenzylacetophenone as a photo polymerization initiator.

Preparation of Polymer/Liquid Crystal Composite Material

Liquid Crystal Compositions F-M were held between a non-aligned comb-like electrode substrate and an glass substrate (without electrode) opposite to the comb-like electrode substrate with a cell thickness of 10 μm, and then the resulting liquid crystal cell was heated to 77.0° C. In this state, the cell was irradiated with UV light of 365 nm at an intensity of 23 mWcm$^{-2}$ for 1 min for polymerization.

The polymer/liquid crystal composite material F-P thus prepared could maintain an optically isotropic liquid crystal phase even being cooled to room temperature.

Furthermore, as shown in FIG. 1, the electrodes on the comb-like electrode substrate have such a structure that Electrode 1 extending from the left side and Electrode 2 extending from the right side are alternatively arranged. Thus, when a potential difference exists between Electrode 1 and Electrode 2, the comb-like electrode substrate can be provided with an electric field in two directions (upward and downward), as shown in FIG. 1.

Example 6

A liquid crystal cell holding the polymer/liquid crystal composite material F-P obtained in Example 5 was disposed in the optical system of FIG. 2 to measure the electro-optic properties, as follows. Using the white light source of a polarizing microscope (ECLIPSE LV100POL, manufactured by Nikon) as a light source, the incident light from the white light source irradiated on the liquid crystal cell was perpendicular to the liquid crystal cell plane, and the line direction of the comb-like electrode was at 45 degrees with respect to the polarizer and the analyzer respectively. The relationship between the applied voltage and the transmittance was investigated by setting the measuring temperature at the clearing point of Liquid Crystal Composition E (64.9° C.)−25° C.=39.9° C. If a rectangular wave of 58 V was applied, then the transmittance was up to 80%, and the transmitted light intensity was saturated.

Example 7

Liquid Crystal Composition G was prepared by mixing Liquid Crystal Composition D and Liquid Crystal Compound (16-16a) below at a weight ratio of 85/15.

Compound (16-16a)

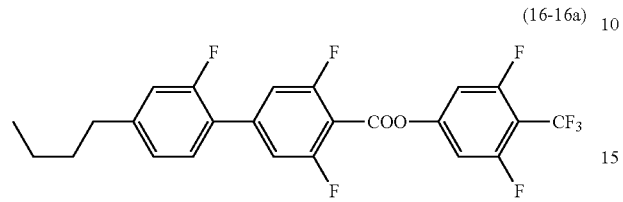

(16-16a)

Then, Liquid Crystal Composition H containing Liquid Crystal Composition G (94 wt %) and the chiral reagent 2 (7.0 wt %) was obtained.

Example 8

Preparation of Mixture of Monomer and Liquid Crystal Composition

As a mixture of a monomer and a liquid crystal composition, Liquid Crystal Composition I-M was prepared by mixing 87.4 wt % Liquid Crystal Composition H, 6.0 wt % n-dodecyl acrylate, 6.0 wt % 1,4-di(4-(6-(acryloxy)propoxy)benzoyloxy)-2-toluene, and 0.6 wt % 2,2'-dimethoxybenzylacetophenone as a photo polymerization initiator.

Preparation of Polymer/Liquid Crystal Composite Material

Liquid Crystal Composition I-M was held between a non-aligned comb-like electrode substrate and an opposite glass substrate (without electrode) opposite to the comb-like electrode substrate with a cell thickness of 10 μm, and then the resulting liquid crystal cell was heated to 60.0° C. In this state, the cell was irradiated with UV light of 365 nm at an intensity of 23 mWcm$^{-2}$ for 1 min for polymerization.

The polymer/liquid crystal composite material I-P thus prepared could maintain an optically isotropic liquid crystal phase even being cooled to room temperature.

Furthermore, as shown in FIG. 1, the electrodes on the comb-like electrode substrate have such a structure that Electrode 1 extending from the left side and Electrode 2 extending from the right side are alternatively arranged. Thus, when a potential difference exists between Electrode 1 and Electrode 2, the comb-like electrode substrate can be provided with an electric field in two directions (upward and downward), as shown in FIG. 1.

Example 9

A liquid crystal cell holding the polymer/liquid crystal composite material I-P obtained in Example 8 was disposed in the optical system of FIG. 2 to measure the electro-optic properties, as follows. Using the white light source of a polarizing microscope (ECLIPSE LV100POL, manufactured by Nikon) as a light source, the incident light from the white light source irradiated on the liquid crystal cell was perpendicular to the liquid crystal cell plane, and the line direction of the comb-like electrode was at 45 degrees with respect to the polarizer and the analyzer respectively. The relationship between the applied voltage and the transmittance was investigated by setting the measuring temperature at the clearing point of Liquid Crystal Composition H (57.1° C.)–25° C.=32.1° C. If a rectangular wave of 58 V was applied, then the transmittance was up to 80%, and the transmitted light intensity was saturated.

[Applicability in Industry]

The present invention is applicable, for example, in the field of optical devices, such as display devices using a liquid crystal medium.

What is claimed is:

1. A liquid crystal composition, comprising an achiral component T comprising a compound of Formula (1) and a chiral reagent, and exhibiting an optically isotropic liquid crystal phase,

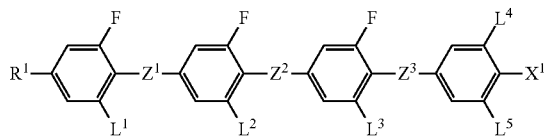

(1)

wherein in Formula (1), $R^1$ is hydrogen or a $C_{1-20}$ alkyl in which arbitrary —$CH_2$— may be substituted with —O—, —S—, —COO—, —OCO—, —CH=CH—, —CF=CF— or —C≡C—, and arbitrary hydrogen in the alkyl and the alkyl with arbitrary —$CH_2$— substituted with —O—, —S—, —COO—, —OCO—, —CH=CH—, —CF=CF—, or —C≡C— may be substituted with halogen or a $C_{1-3}$ alkyl; $Z^1$, $Z^2$, and $Z^3$ are each independently a single bond, —COO—, or —$CF_2$O—, provided that at least one of $Z^1$, $Z^2$, and $Z^3$ is —$CF_2$O—; and $L^1$, $L^2$, $L^3$, $L^4$, and $L^5$ are each independently hydrogen or fluorine; $X^1$ is hydrogen, halogen, —$SF_5$, or a $C_{1-10}$ alkyl in which arbitrary —$CH_2$— may be substituted with —O—, —S—, —CH=CH—, or —C≡C—, and arbitrary hydrogen in the alkyl and the alkyl with arbitrary —$CH_2$— substituted with —O—, —S—, —CH=CH—, or —C≡C— may be substituted with fluorine.

2. The liquid crystal composition according to claim 1, wherein in Formula (1), $R^1$ is a $C_{1-20}$ alkyl, a $C_{2-21}$ alkenyl, a $C_{2-21}$ alkynyl, a $C_{1-19}$ alkoxy, a $C_{2-20}$ alkenyloxy, a $C_{1-19}$ alkylthio, a $C_{1-19}$ alkenylthio, or —($CH_2$)v-CH=$CF_2$, in which v is an integer of 0 or 1-19; and $X^1$ is hydrogen, halogen, —$SF_5$, —$CH_2F$, —$CHF_2$, —$CF_3$, —($CH_2$)$_2$—F, —$CF_2CH_2F$, —$CF_2CHF_2$, —$CH_2CF_3$, —$CF_2CF_3$, —($CH_2$)$_3$—F, —($CF_2$)$_3$—F, —$CF_2CHFCF_3$, —$CHFCF_2CF_3$, —($CH_2$)$_4$—F, —($CF_2$)$_4$—F, —($CH_2$)$_5$—F, —($CF_2$)$_5$—F, —$OCH_2F$, —$OCHF_2$, —$OCF_3$, —O—($CH_2$)$_2$—, —$OCF_2CH_2F$, —$OCF_2CHF_2$, —$OCH_2CF_3$, —O—($CH_2$)$_3$—F, —O—($CF_2$)$_3$—F, —$OCF_2CHFCF_3$, —$OCHFCF_2CF_3$, —O—($CH_2$)$_4$—F, —O—($CF_2$)$_4$—F, —O—($CH_2$)$_5$—F, —O—($CF_2$)$_5$—F, —CH=CHF, —CH=$CF_2$, —CF=CHF, —CH=$CHCH_2F$, —CH=$CHCF_3$, —($CH_2$)$_2$—CH=$CF_2$, —$CH_2$CH=$CHCF_3$, or —CH=$CHCF_2CF_3$.

3. The liquid crystal composition according to claim 1, wherein in Formula (1), $Z^1$, $Z^2$, and $Z^3$ are each independently a single bond or —$CF_2$O—.

4. The liquid crystal composition according to claim 1, wherein $R^1$ is a group of any one of Formulas (CHN-1)—(CHN-19), and $R^{1a}$ is hydrogen or a $C_{1-20}$ alkyl,

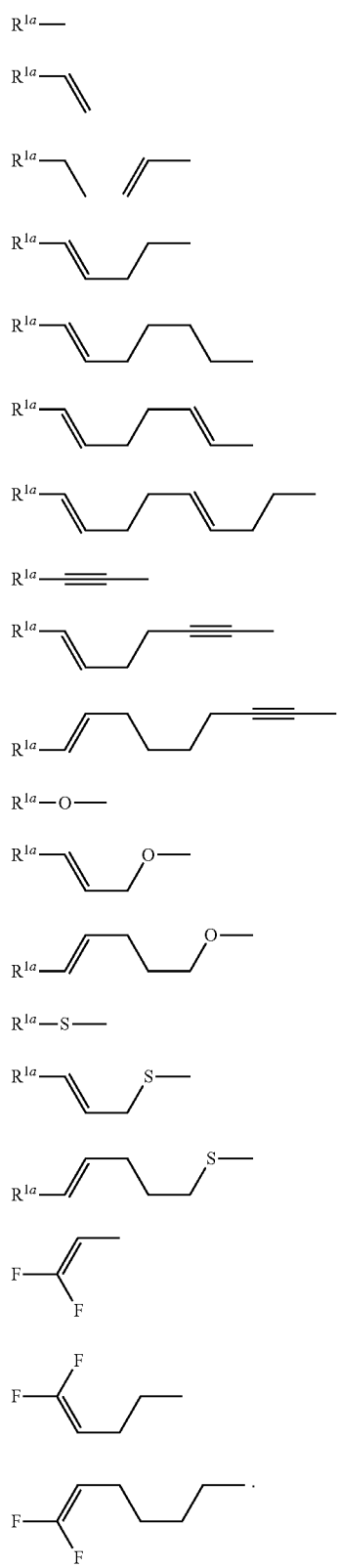
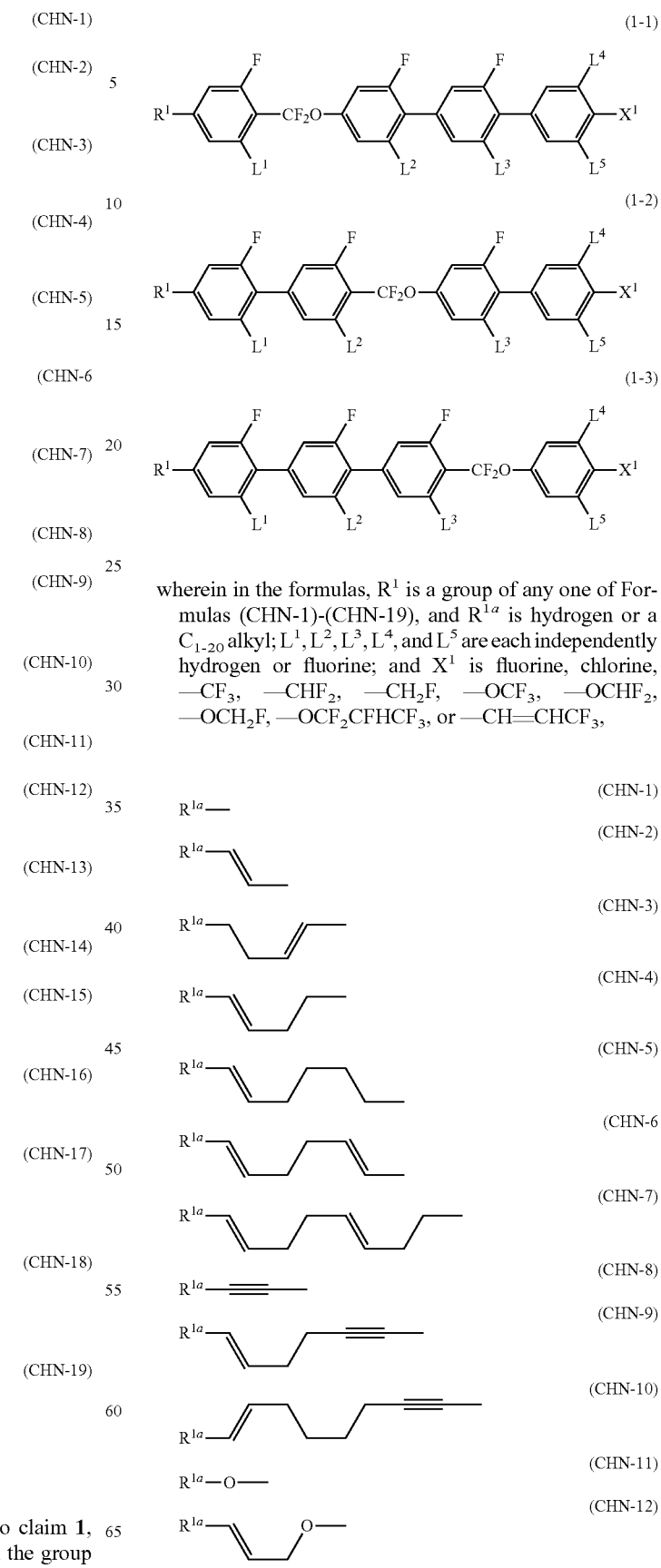

wherein in the formulas, $R^1$ is a group of any one of Formulas (CHN-1)-(CHN-19), and $R^{1a}$ is hydrogen or a $C_{1-20}$ alkyl; $L^1$, $L^2$, $L^3$, $L^4$, and $L^5$ are each independently hydrogen or fluorine; and $X^1$ is fluorine, chlorine, —$CF_3$, —$CHF_2$, —$CH_2F$, —$OCF_3$, —$OCHF_2$, —$OCH_2F$, —$OCF_2CFHCF_3$, or —CH=$CHCF_3$,

5. The liquid crystal composition according to claim 1, comprising at least one compound selected from the group consisting of the compounds of Formulas (1-1)-(1-3):

-continued

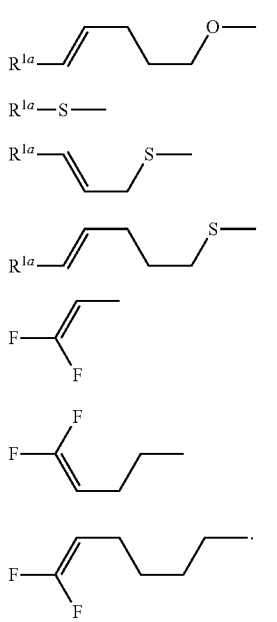

(CHN-13)
(CHN-14)
(CHN-15)
(CHN-16)
(CHN-17)
(CHN-18)
(CHN-19)

6. The liquid crystal composition according to claim 5, wherein in Formulas (1-1)-(1-3), $R^1$ is a group of any one of Formulas (CHN-1)-(CHN-4) and Formulas (CHN-6)-(CHN-8), and $R^{1a}$ is hydrogen or a $C_{1-20}$ alkyl,

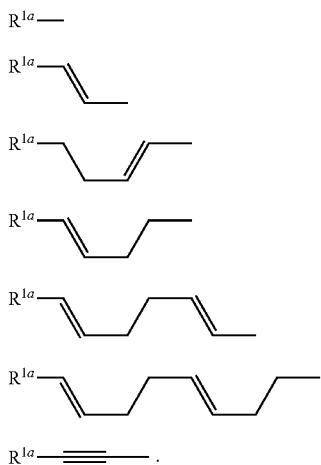

(CHN-1)
(CHN-2)
(CHN-3)
(CHN-4)
(CHN-6)
(CHN-7)
(CHN-8)

7. The liquid crystal composition according to claim 1, wherein the achiral component T further comprises a compound of Formula (2):

wherein in Formula (2), $R^2$ is hydrogen or a $C_{1-20}$ alkyl in which arbitrary —$CH_2$— may be substituted with —O—, —S—, —COO—, —OCO—, —CH=CH—, —CF=CF— or —C≡C—, and arbitrary hydrogen in the alkyl and the alkyl with arbitrary —$CH_2$— substituted with —O—, —S—, —COO—, —OCO—, —CH=CH—, —CF=CF— or —C≡C— may be substituted with halogen or a $C_{1-3}$ alkyl; Rings $A^1$, $A^2$, $A^3$, $A^4$, and $A^5$ are each independently a benzene ring, a naphthalene ring, a thiophene ring, a piperidine ring, a cyclohexene ring, a bicyclooctane ring, a tetrahydronaphthalene ring or a cyclohexane ring, wherein arbitrary hydrogen in the rings may be substituted with halogen, a $C_{1-3}$ alkyl, a $C_{1-3}$ alkoxy, or a $C_{1-3}$ haloalkyl, —$CH_2$— in the rings may be substituted with —O— or —S—, and —CH= in the rings may be substituted with —N=; $Z^4$, $Z^5$, $Z^6$, $Z^7$, $Z^8$, and $Z^9$ are each independently a single bond or a $C_{1-4}$ alkylene in which arbitrary —$CH_2$— may be substituted with —O—, —S—, —COO—, —OCO—, —CSO—, —OCS—, —CH=CH—, —CF=CF— C≡C—, and arbitrary hydrogen in the alkylene or the alkylene with arbitrary —$CH_2$— substituted with —O—, —S—, —COO—, —OCO—, —CSO—, —OCS—, —CH=CH—, —CF=CF— or —C≡C— may be substituted with halogen; $L^6$, $L^7$, and $L^8$ are each independently hydrogen or halogen; $X^2$ is hydrogen, halogen, —C≡N, —N=C=S, —C≡C—C≡N, —$SF_5$, or a $C_{1-10}$ alkyl in which arbitrary —$CH_2$— may be substituted with —O—, —S—, —CH=CH— or —C≡C—, and arbitrary hydrogen in the alkyl and the alkyl with arbitrary —$CH_2$— substituted with —O—, —S—, —CH=CH— or —C≡C— may be substituted with halogen; and l, m, n, o and p are each independently 0 or 1, provided that $l+m+n+o+p \leq 4$.

8. The liquid crystal composition according to claim 7, wherein in Formula (2), $R^2$ is a group of any one of Formulas (CHN-1)-(CHN-4) and Formulas (CHN-6)-(CHN-7), $R^{1a}$ is hydrogen or a $C_{1-20}$ alkyl; Rings $A^1$, $A^2$, $A^3$, $A^4$, and $A^5$ are (RG-1)-(RG-13); $Z^4$, $Z^5$, $Z^6$, $Z^7$, $Z^8$, and $Z^9$ are each independently a single bond or a $C_{1-4}$ alkylene in which arbitrary —$CH_2$— may be substituted with —O—, —COO— or —$CF_2$O—; $L^6$, $L^7$ and $L^8$ are each independently hydrogen or fluorine; $X^2$ is fluorine, chlorine, —$CF_3$, —$CHF_2$, —$CH_2F$, —$OCF_3$, —$OCHF_2$, —$OCH_2F$, —$OCF_2CFHCF_3$, or —CH=$CHCF_3$; and l, m, n, o, and p are each independently 0 or 1, provided that $l+m+n+o+p \leq 4$,

(CHN-1)
(CHN-2)

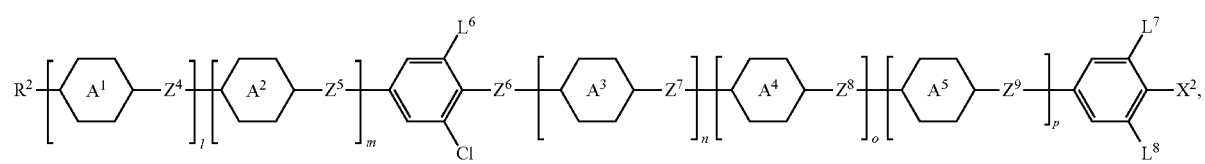

(2)

-continued

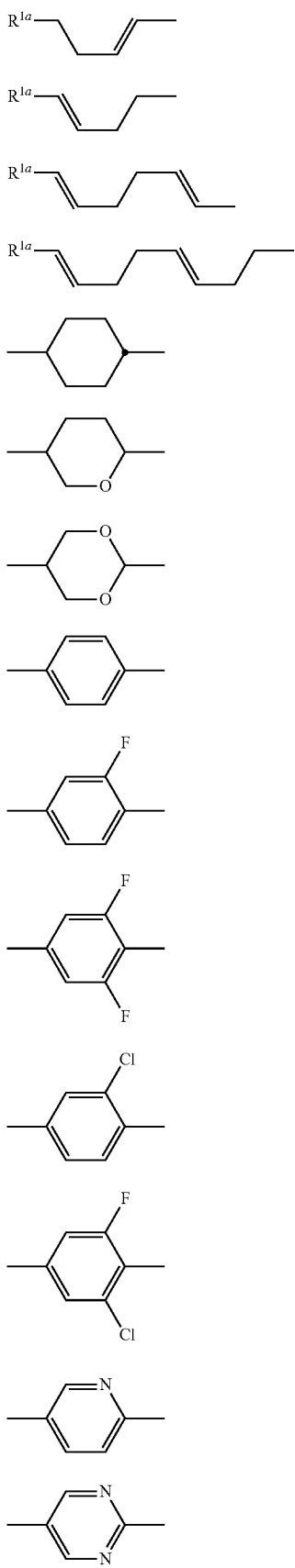

(CHN-3)
(CHN-4)
(CHN-6)
(CHN-7)
(RG-1)
(RG-2)
(RG-3)
(RG-4)
(RG-5)
(RG-6)
(RG-7)
(RG-8)
(RG-9)
(RG-10)

-continued

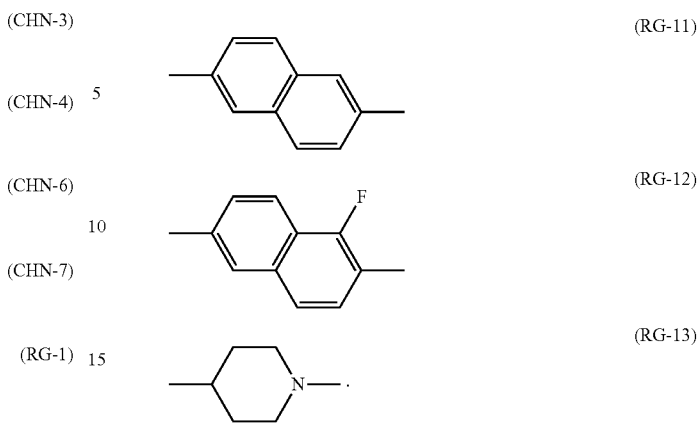

(RG-11)
(RG-12)
(RG-13)

9. The liquid crystal composition according to claim 8, wherein in the compound of Formula (2), $2 \leq l+m+n+o+p \leq 3$.

10. The liquid crystal composition according to claim 1, wherein the achiral component T comprises only the compound of Formula (1).

11. The liquid crystal composition according to claim 7, wherein the achiral component T comprises only 5-95 weight percent (wt %) of the compound of Formula (1) and 5-50 wt % of the compound of Formula (2).

12. The liquid crystal composition according to claim 7, wherein the achiral component T comprises 5-95 wt % of the compound of Formula (1), 5-80 wt % of the compound of Formula (2), and 0-50 wt % of other compounds.

13. The liquid crystal composition according to claim 7, wherein the achiral component T comprises 5-94 wt % of the compound of Formula (1), 5-80 wt % of the compound of Formula (2), and 1-50 wt % of other compounds.

14. The liquid crystal composition according to claim 1, wherein the achiral component T comprises 10-100 wt % of a compound selected from the group consisting of Formulas (1-2A)-(1-2H) and Formulas (1-3A)-(1-3D):

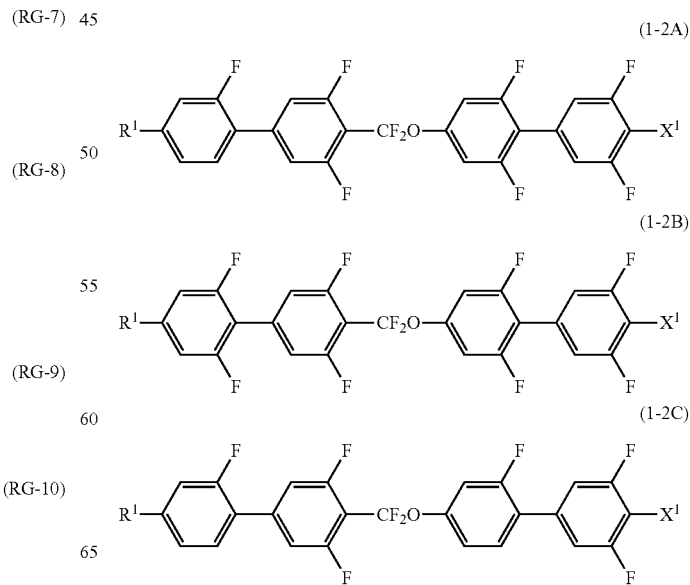

(1-2A)
(1-2B)
(1-2C)

-continued

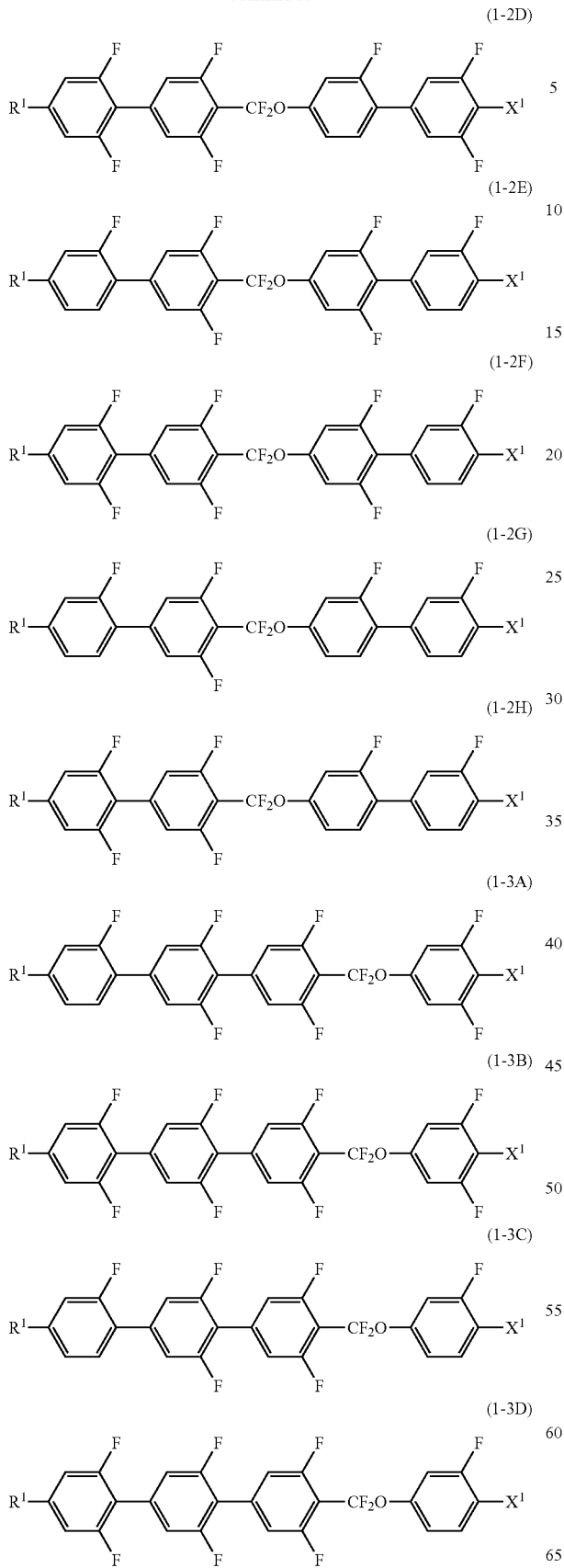

(1-2D)
(1-2E)
(1-2F)
(1-2G)
(1-2H)
(1-3A)
(1-3B)
(1-3C)
(1-3D)

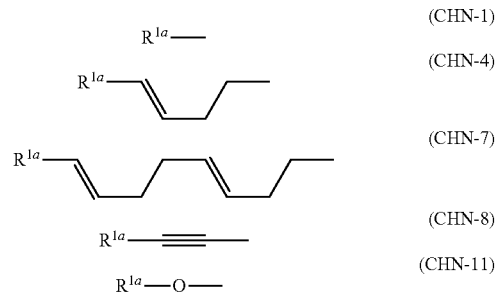

(CHN-1)
(CHN-4)
(CHN-7)
(CHN-8)
(CHN-11)

wherein in the formulas, $R^1$ is a chain selected from Formulas (CHN-1), (CHN-4), (CHN-7), (CHN-8) and (CHN-11); and $X^1$ is fluorine, chlorine, —$CF_3$, —$CHF_2$, —$CH_2F$, —$OCF_3$, —$OCHF_2$, —$OCF_2CFHCF_3$, or —CH=$CHCF_3$.

15. The liquid crystal composition according to claim 1, wherein the achiral component T further comprises at least one compound selected from the group consisting of the compounds of Formulas (3), (4), and (5):

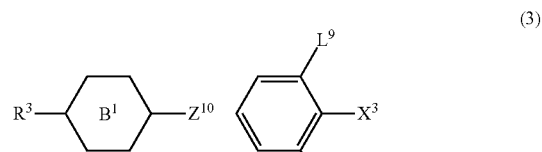
(3)

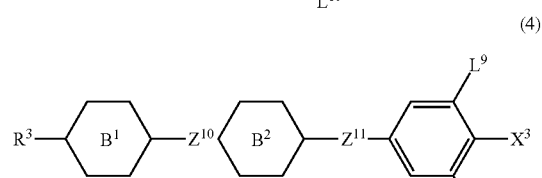
(4)

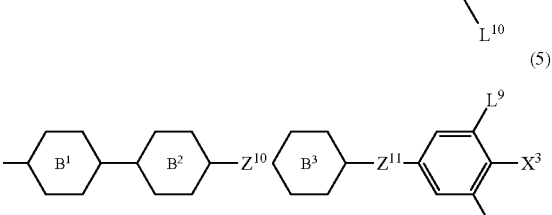
(5)

wherein in the formulas, $R^3$ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; $X^3$ is fluorine, chlorine, —$OCF_3$, —$OCHF_2$, —$CF_3$, —$CHF_2$, —$CH_2F$, —$OCF_2CHF_2$, or —$OCF_2CHFCF_3$; Rings $B^1$, $B^2$, and $B^3$ are each independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene with arbitrary hydrogen substituted with fluorine, or naphthalene-2,6-diyl with arbitrary hydrogen substituted with fluorine or chlorine; in Formula (5), Ring B1 is 1,4-cyclohexylene, 1,3-dioxane-2,5-diyl, pyrimidine-2,5-diyl, tetrahydropyran-2,5-diyl, 1,4-phenylene, naphthalene-2,6-diyl, or naphthalene-2,6-diyl with arbitrary hydrogen substituted with fluorine or chlorine; $Z^{10}$ and $Z^{11}$ are each independently —$(CH_2)_2$—, —$(CH_2)_4$—, —COO—, —$CF_2O$—, —$OCF_2$—, —CH=CH—, —C≡C—, —$CH_2O$—, or a single bond; and $L^9$ and $L^{10}$ are each independently hydrogen or fluorine.

16. The liquid crystal composition according to claim 1, wherein the achiral component T further comprises at least one compound selected from the group consisting of the compound of Formula (6):

(6)

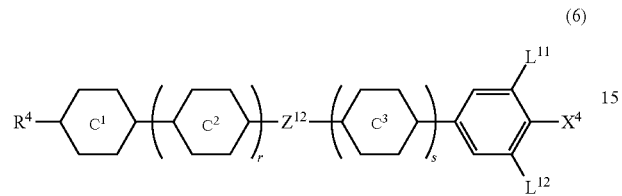

wherein in the formula, $R^4$ is a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; $X^4$ is —C≡N or —C≡C—C≡N; Rings $C^1$, $C^2$, and $C^3$ are each independently 1,4-cyclohexylene, 1,4-phenylene, 1,4-phenylene with arbitrary hydrogen substituted with fluorine, naphthalene-2,6-diyl, naphthalene-2,6-diyl with arbitrary hydrogen substituted with fluorine or chlorine, 1,3-dioxane-2,5-diyl, tetrahydropyran-2,5-diyl, or pyrimidine-2,5-diyl; $Z^{12}$ is —$(CH_2)_2$—, —COO—, —$CF_2O$—, —$OCF_2$—, —C≡C—, —$CH_2O$—, or a single bond; $L^{11}$ and $L^{12}$ are each independently hydrogen or fluorine; and r is 0, 1, or 2, s is 0 or 1, and r+s=0, 1 or 2.

17. The liquid crystal composition according to claim 1, wherein the achiral component T further comprises at least one compound selected from the group consisting of Formulas (7), (8), (9), (10), and (11):

wherein in the formulas, $R^5$ and $R^6$ are each independently a $C_{1-10}$ alkyl or a $C_{2-10}$ alkenyl, wherein arbitrary hydrogen in the alkyl and the alkenyl may be substituted with fluorine, and arbitrary —$CH_2$— in the alkyl, the alkenyl, or the alkyl and the alkenyl with arbitrary hydrogen substituted with fluorine may be substituted with —O—; Rings $D^1$, $D^2$, $D^3$, and $D^4$ are each independently 1,4-cyclohexylene, 1,4-cyclohexenylene, 1,4-phenylene, 1,4-phenylene with arbitrary hydrogen substituted with fluorine, tetrahydropyran-2,5-diyl, or decahydronaphthalene-2,6-diyl; $Z^{13}$, $Z^{14}$, $Z^{15}$, and $Z^{16}$ are each independently —$(CH_2)_2$—, —COO—, —$CH_2O$—, —$OCF_2$—, —$OCF_2(CH_2)_2$—, or a single bond; $L^{13}$ and $L^{14}$ are each independently fluorine or chlorine; and t, u, x, y, and z are each independently 0 or 1, and u+x+y+z is 1 or 2.

18. The liquid crystal composition according to claim 1, wherein the achiral component T further comprises at least one compound selected from the group consisting of the compounds of Formulas (12), (13), and (14):

(12)

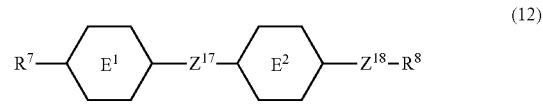

(13)

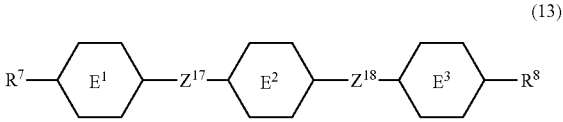

(14)

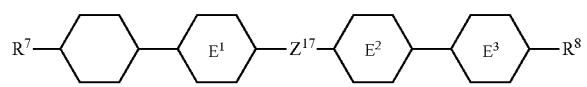

wherein in the formulas, $R^7$ and $R^8$ are each independently a $C_{1-10}$ alkyl or a $C_{2-10}$ alkenyl, in which arbitrary hydrogen in the alkyl and the alkenyl may be substituted with fluorine, and arbitrary —$CH_2$— in the alkyl, the alkenyl, (7)

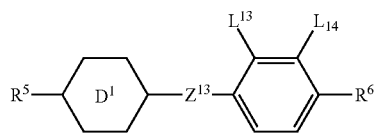

(8)

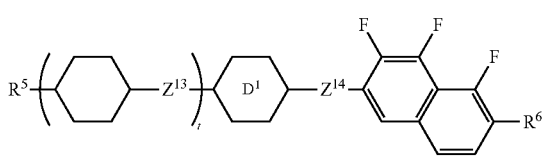

(9)

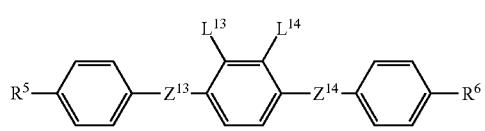

(10)

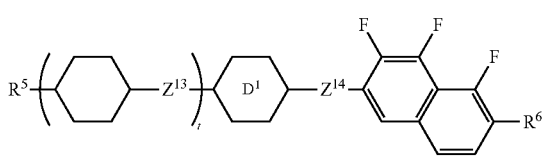

(11)

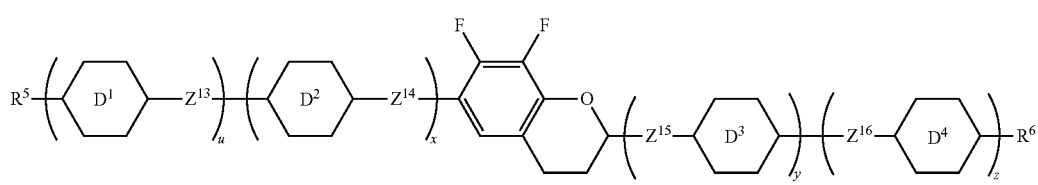

or the alkyl and the alkenyl with arbitrary hydrogen substituted with fluorine may be substituted with —O—; Rings E¹, E², and E³ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; Z¹⁷ and Z¹⁸ are each independently —C≡C—, —COO—, —(CH₂)₂—, —CH=CH—, or a single bond.

19. The liquid crystal composition according to claim 15, further comprising at least one compound selected from the group consisting of the compound of Formula (6):

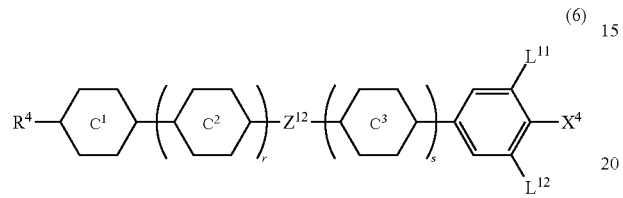

(6)

wherein in the formula, R⁴ is a C₁₋₁₀ alkyl or a C₂₋₁₀ alkenyl, wherein arbitrary hydrogen in the alkyl and the alkenyl may be substituted with fluorine, and arbitrary —CH₂— in the alkyl, the alkenyl, or the alkyl and the alkenyl with arbitrary hydrogen substituted with fluorine may be substituted with —O—; X⁴ is —C≡N or —C≡C—C≡N; Rings C¹, C², and C³ are each independently 1,4-cyclohexylene, 1,4-phenylene, 1,4-phenylene with arbitrary hydrogen substituted with fluorine, naphthalene-2,6-diyl, naphthalene-2,6-diyl with arbitrary hydrogen substituted with fluorine or chlorine, 1,3-dioxane-2,5-diyl, tetrahydropyran-2,5-diyl, or pyrimidine-2,5-diyl; Z¹² is —(CH₂)₂—, —COO—, —CF₂O—, —OCF₂—, —CH=C—, —CH₂O—, or a single bond; L¹¹ and L¹² are each independently hydrogen or fluorine; and r is 0, 1, or 2, s is 0 or 1, and r+s=0, 1 or 2.

20. The liquid crystal composition according to claim 15, further comprising at least one compound selected from the group consisting of the compounds of Formula (12), (13), and (14):

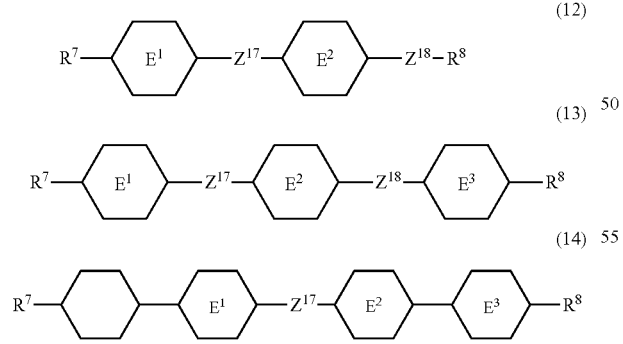

(12)

(13)

(14)

wherein in the formulas, R⁷ and R⁸ are each independently a C₁₋₁₀ alkyl or a C₂₋₁₀ alkenyl, in which arbitrary hydrogen in the alkyl and the alkenyl may be substituted with fluorine, and arbitrary —CH₂— in the alkyl, the alkenyl, or the alkyl and the alkenyl with arbitrary hydrogen substituted with fluorine may be substituted with —O—; Rings E¹, E², and E³ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; Z¹⁷ and Z¹⁸ are each independently —C≡C—, —COO—, —(CH₂)₂—, —CH=CH—, or a single bond.

21. The liquid crystal composition according to claim 16, further comprising at least one compound selected from the group consisting of the compounds of Formulas (12), (13), and (14):

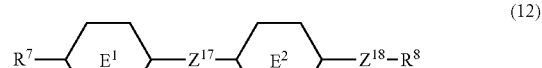

(12)

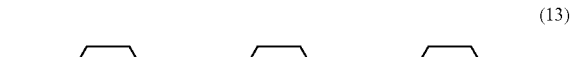

(13)

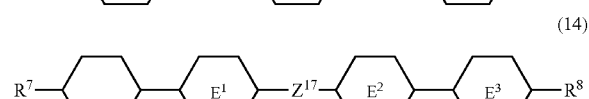

(14)

wherein in the formulas, R⁷ and R⁸ are each independently a C₁₋₁₀ alkyl or a C₂₋₁₀ alkenyl, in which arbitrary hydrogen in the alkyl and the alkenyl may be substituted with fluorine, and arbitrary —CH₂— in the alkyl, the alkenyl, or the alkyl and the alkenyl with arbitrary hydrogen substituted with fluorine may be substituted with —O—; Rings E¹, E², and E³ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; Z¹⁷ and Z¹⁸ are each independently —C≡C—, —COO—, —(CH₂)₂—, —CH=CH—, or a single bond.

22. The liquid crystal composition according to claim 17, further comprising at least one compound selected from the group consisting of the compounds of Formulas (1), (13), and (14):

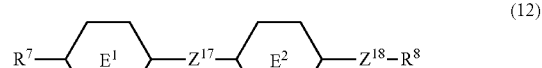

(12)

(13)

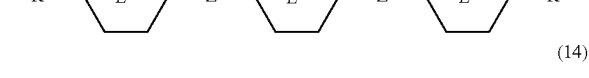

(14)

wherein in the formulas, R⁷ and R⁸ are each independently a C₁₋₁₀ alkyl or a C₂₋₁₀ alkenyl, in which arbitrary hydrogen in the alkyl and the alkenyl may be substituted with fluorine, and arbitrary —CH₂— in the alkyl, the alkenyl, or the alkyl and the alkenyl with arbitrary hydrogen substituted with fluorine may be substituted with —O—; Rings E¹, E², and E³ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; Z¹⁷ and Z¹⁸ are each independently —C≡C—, —COO—, —(CH₂)₂—, —CH=CH—, or a single bond.

23. The liquid crystal composition according to claim 1, wherein the achiral component T further comprises at least one compound selected from the group consisting of the compound of Formulas (15), (16), (17), and (18):

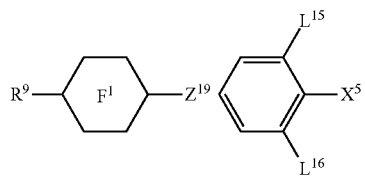 (15)

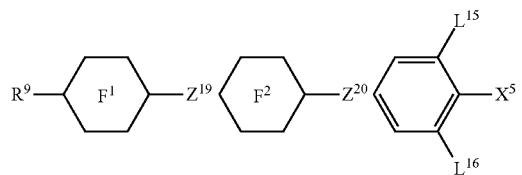 (16)

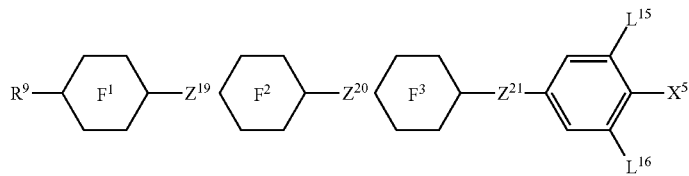 (17)

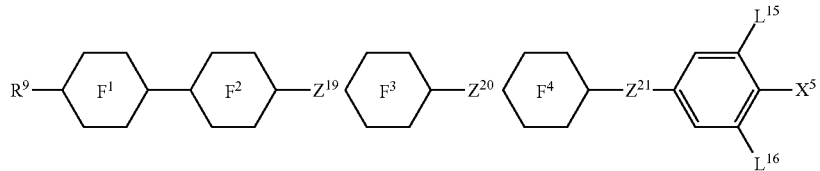 (18)

wherein in the formulas, $R^9$ is a $C_{1-10}$ alkyl, a $C_{2-10}$ alkenyl, or a $C_{2-10}$ alkynyl, wherein arbitrary hydrogen in the alkyl, the alkenyl and the alkynyl may be substituted with fluorine, and arbitrary —CH$_2$— in the alkyl, the alkenyl, the alkynyl, or the alkyl, the alkenyl and the alkynyl with arbitrary hydrogen substituted with fluorine may be substituted with —O—; $X^5$ is fluorine, chlorine, —SF$_5$, —OCF$_3$, —OCHF$_2$, —CF$_3$, —CHF$_2$, —CH$_2$F, —OCF$_2$CHF$_2$, or —OCF$_2$CHFCF$_3$; Rings $F^1$, $F^2$, $F^3$, and $F^4$ are each independently 1,4-cyclohexylene, 1,3-dioxane-2,5-diyl, pyrimidine-2,5-diyl, tetrahydropyran-2,5-diyl, 1,4-phenylene, naphthalene-2,6-diyl, 1,4-phenylene with arbitrary hydrogen substituted with fluorine or chlorine, or naphthalene-2,6-diyl with arbitrary hydrogen substituted with fluorine or chlorine; in Formulas (17), Ring $F^1$ is 1,4-cyclohexylene, 1,3-dioxane-2,5-diyl, pyrimidine-2,5-diyl, tetrahydropyran-2,5-diyl, 1,4-phenylene, naphthalene-2,6-diyl, or naphthalene-2,6-diyl with arbitrary hydrogen substituted with fluorine or chlorine; $Z^{19}$, $Z^{20}$, and $Z^{21}$ are each independently —(CH$_2$)$_2$—, —(CH$_2$)$_4$—, —COO—, —CF$_2$O—, —OCF$_2$—, —CH═CH—, —CH═C—, —CH$_2$O—, or a single bond; and $L^{15}$ and $L^{16}$ are each independently hydrogen or fluorine.

24. The liquid crystal composition according to claim 1, wherein the achiral component T further comprises at least one compound selected from the group consisting of the compound of Formula (19):

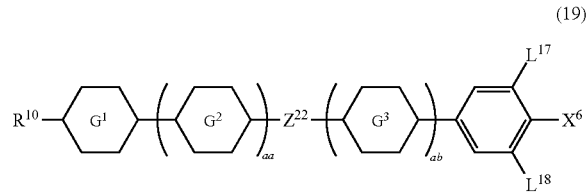 (19)

wherein in the formulas, $R^{10}$ is a $C_{1-10}$ alkyl, a $C_{2-10}$ alkenyl, or a $C_{2-10}$ alkynyl, wherein arbitrary hydrogen in the alkyl, the alkenyl and the alkynyl may be substituted with fluorine, and arbitrary —CH$_2$— in the alkyl, the alkenyl, the alkynyl, or the alkyl, the alkenyl and the alkynyl with arbitrary hydrogen substituted with fluorine may be substituted with —O—; $X^6$ is —C≡N, —N═C═S, or —C≡C—C≡N; Rings $G^1$, $G^2$, and $G^3$ are each independently 1,4-cyclohexylene, 1,4-phenylene, 1,4-phenylene with arbitrary hydrogen substituted with fluorine or chlorine, naphthalene-2,6-diyl, naphthalene-2,6-diyl with arbitrary hydrogen substituted with fluorine or chlorine, 1,3-dioxane-2,5-diyl, tetrahydropyran-2,5-diyl, or pyrimidine-2,5-diyl; $Z^{22}$ is —(CH$_2$)$_2$—, —COO—, —CF$_2$O—, —OCF$_2$—, —CH$_2$O—, or a single bond; $L^{17}$ and $L^{18}$ are each independently hydrogen or fluorine; and aa is 0, 1 or 2, ab is 0 or 1, and aa+ab is 0, 1 or 2.

25. The liquid crystal composition according to claim 1, comprising at least one antioxidant and/or UV absorbent.

26. The liquid crystal composition according to claim 1, wherein the optically isotropic liquid crystal phase does not exhibit two or more colors of diffracted light.

27. The liquid crystal composition according to claim 1, wherein the optically isotropic liquid crystal phase exhibits two or more colors of diffracted light.

28. The liquid crystal composition according to claim 26, obtained by adding the chiral reagent into a composition having a temperature difference of 3° C.-150° C. between an upper-limit temperature and a lower-limit temperature of coexistence of a chiral nematic phase and a non-liquid crystal isotropic phase.

29. The liquid crystal composition according to claim 26, obtained by adding the chiral reagent into a composition having a temperature difference of 5° C.-150° C. between an upper-limit temperature and a lower-limit temperature of coexistence of a chiral nematic phase and a non-liquid crystal isotropic phase.

30. The liquid crystal composition according to claim 26, obtained by adding the chiral reagent into a composition having a temperature difference of 3° C.-150° C. between an upper-limit temperature and a lower-limit temperature of co-existence of a nematic phase and a non-liquid crystal isotropic phase.

31. The liquid crystal composition according to claim 1, wherein a content of the chiral reagent is 1-40 wt % based on the total weight of the liquid crystal composition.

32. The liquid crystal composition according to claim 1, wherein a content of the chiral reagent is 5-15 wt % based on the total weight of the liquid crystal composition.

33. The liquid crystal composition according to claim 31, exhibiting a chiral nematic phase at any temperature in the range of 70° C. to −20° C., and having a helical pitch of 700 nm or less within at least a part of the temperature range.

34. The liquid crystal composition according to claim 31, wherein the chiral reagent comprises at least one compound selected from the group consisting of the compounds of Formulas (K1)-(K5):

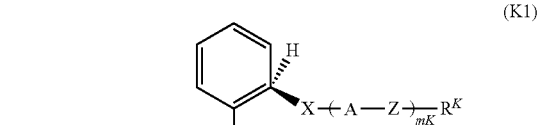
(K1)

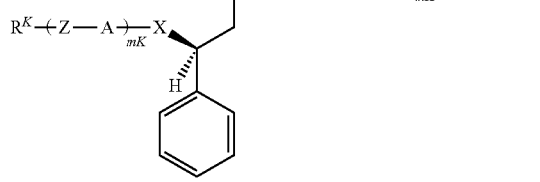
(K2)

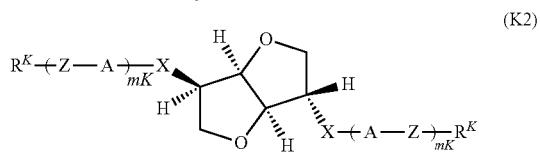
(K3)

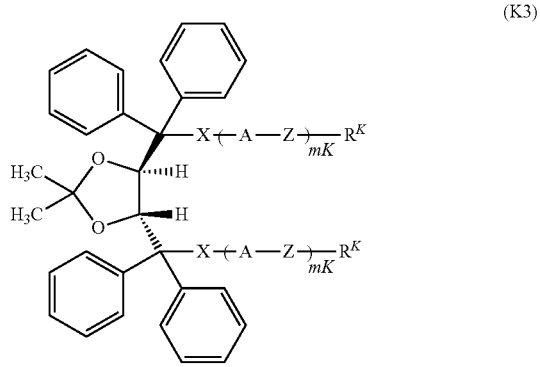
(K4)

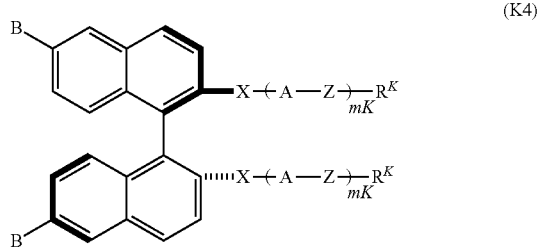
(K5)

wherein in Formulas (K1)-(K5), $R^K$ is each independently hydrogen, halogen, —C≡N, —N=C=O, —N=C=S, or a $C_{1-20}$ alkyl in which arbitrary —CH$_2$— may be substituted substituted with —O—, —S—, —COO—, —OCO—, —CH=CH—, —CF=CF— or —C≡C—, arbitrary hydrogen in the alkyl may be substituted with halogen, and additionally, a terminal —CH$_3$ may be substituted with:

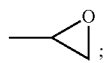
;

A is each independently an aromatic or non-aromatic 3- to 8-membered ring, or a fused ring having 9 or more carbon atoms, wherein arbitrary hydrogen in the rings may be substituted with halogen, a $C_{1-3}$ alkyl or haloalkyl, —CH$_2$— in the rings may be substituted with —O—, —S—, or —NH—, and —CH= in the rings may be substituted with —N=; B is each independently hydrogen, halogen, a $C_{1-3}$ alkyl, a $C_{1-3}$ haloalkyl, an aromatic or non-aromatic 3- to 8-membered ring, or a fused ring having 9 or more carbon atoms, wherein arbitrary hydrogen in the rings may be substituted with halogen, a $C_{1-3}$ alkyl or haloalkyl, —CH$_2$— in the rings may be substituted with —O—, —S— or —NH—, and —CH= in the rings may be substituted with —N=; Z is each independently a single bond, or a $C_{1-8}$ alkylene in which arbitrary —CH$_2$— may be substituted with —O—, —S—, —COO—, —OCO—, —CSO—, —OCS—, —N=N—, —CH=N—, —N=CH—, —CH=CH—, —CF=CF—, or —C≡C—, and arbitrary hydrogen in the alkylene may be substituted with halogen;

X is a single bond, —COO—, —OCO—, —CH$_2$O—, —OCH$_2$—, —CF$_2$O—, —OCF$_2$—, or —CH$_2$CH$_2$—; and mK is an integer of 1-4.

35. The liquid crystal composition according to claim 31, wherein the chiral reagent comprises at least one compound selected from the group consisting of the compounds of Formulas (K2-1)-(K2-8), Formulas (K4-1)-(K4-6), and Formulas (K5-1)-(K5-3):

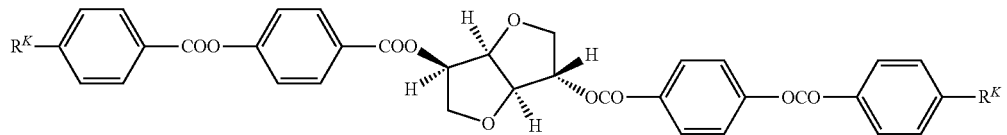 (K2-1)
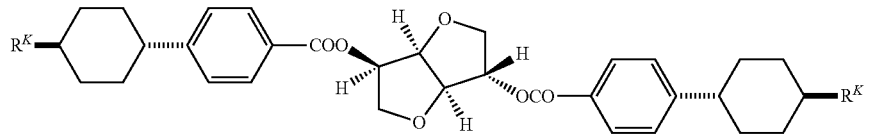 (K2-2)
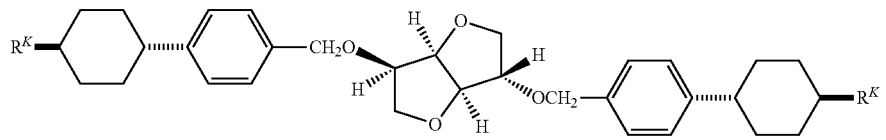 (K2-3)
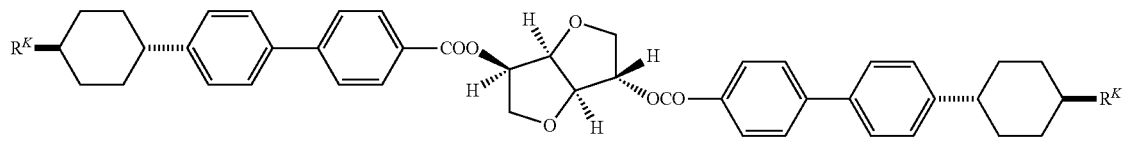 (K2-4)
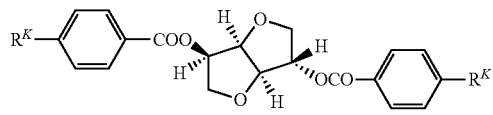 (K2-5)
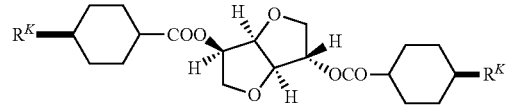 (K2-6)
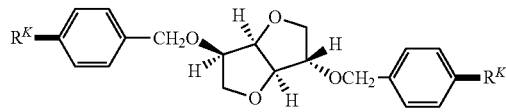 (K2-7)
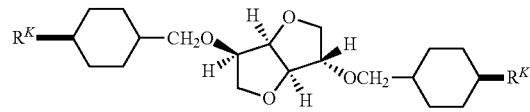 (K2-8)
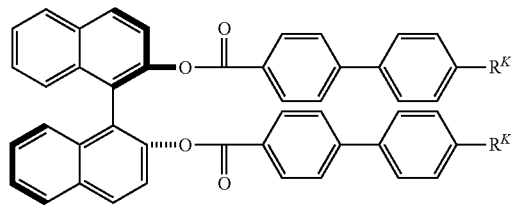 (K4-1)
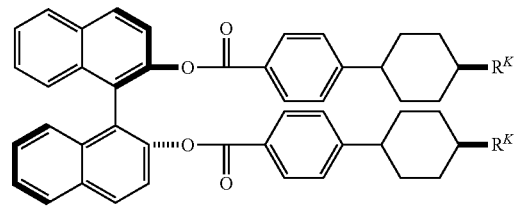 (K4-2)
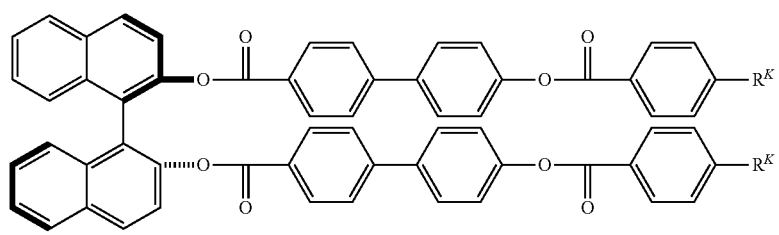 (K4-3)
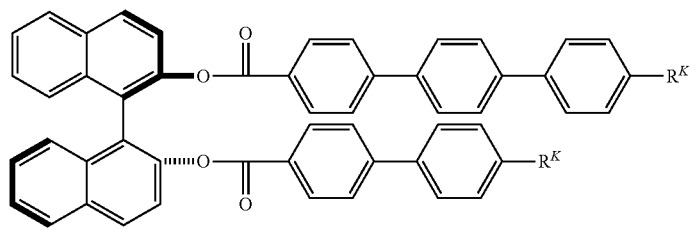 (K4-4)

-continued

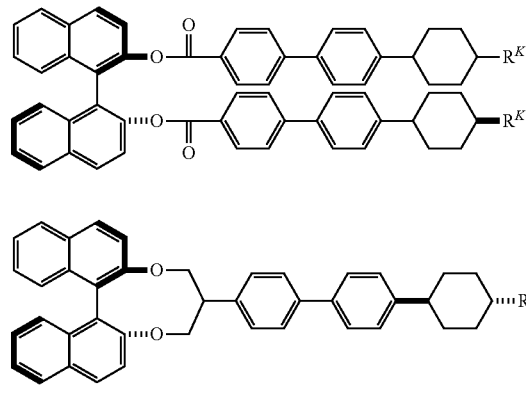

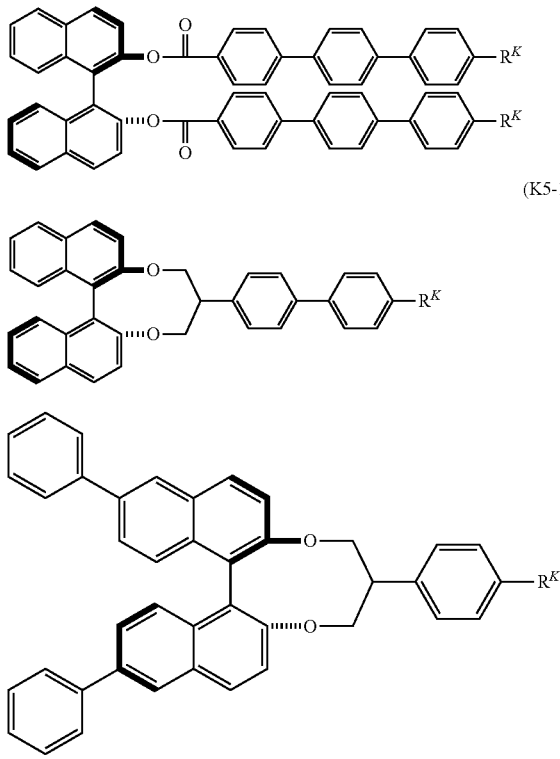

wherein in the formulas, $R^K$ is each independently a $C_{3-10}$ alkyl, wherein —$CH_2$— adjacent to a ring in the alkyl may be substituted with —O—, and arbitrary —$CH_2$— in the alkyl may be substituted with —CH=CH—.

36. A mixture, comprising the liquid crystal composition according to claim 1 and a polymerizable monomer.

37. The mixture according to claim 36, wherein the polymerizable monomer is a photopolymerizable monomer or a thermal-polymerizable monomer.

38. A polymer/liquid crystal composite material, obtained by polymerizing the mixture comprising the liquid crystal composition according to claim 1 and a polymerizable monomer, for use in a device driven in an optically isotropic liquid crystal phase.

39. A polymer/liquid crystal composite material, obtained by polymerizing the mixture comprising the liquid crystal composition according to claim 1 and a polymerizable monomer in a non-liquid crystal isotropic phase or an optically isotropic liquid crystal phase.

40. The polymer/liquid crystal composite material according to claim 38, wherein the polymer in the polymer/liquid crystal composite material has a mesogen moiety.

41. The polymer/liquid crystal composite material according to claim 38, wherein the polymer in the polymer/liquid crystal composite material has a cross-linked structure.

42. The polymer/liquid crystal composite material according to claim 38, wherein a content of the liquid crystal composition is 60-99 wt %, and a content of the polymer is 1-40 wt %.

43. An optical device, comprising a liquid crystal medium disposed between substrates having electrodes disposed on either or both surfaces thereof and an electric field-applying means for applying an electric field to the liquid crystal medium via the electrodes, wherein the liquid crystal medium is the liquid crystal composition according to claim 1, wherein a content of the chiral reagent is 1-40 wt % based on the total weight of the liquid crystal composition or a polymer/liquid crystal composite material obtained by polymerizing the mixture comprising the liquid crystal composition according to claim 1 and a polymerizable monomer, for use in a device driven in an optically isotropic liquid crystal phase.

44. An optical device, comprising a set of substrates having electrodes disposed on either or both surfaces thereof, at least one of which being transparent, a liquid crystal medium disposed between the substrates, a polarizer disposed outside of the substrates, and an electric field-applying means for applying an electric field to the liquid crystal medium via the electrodes, wherein the liquid crystal medium is the liquid crystal composition according to claim 1, wherein a content of the chiral reagent is 1-40 wt % based on the total weight of the liquid crystal composition or a polymer/liquid crystal composite material obtained by polymerizing the mixture comprising the liquid crystal composition according to claim 1 and a polymerizable monomer, for use in a device driven in an optically isotropic liquid crystal phase.

45. The optical device according to claim 43, wherein on at least one of the set of substrates, the electrodes are configured in a manner such that an electric field is applied in at least two directions.

46. The optical device according to claim 43, wherein on one or two of the set of substrates disposed in parallel with each other, the electrodes are configured in a manner such that an electric field is applied in at least two directions.

47. The optical device according to claim 43, wherein the electrodes are disposed in a matrix form to form pixel electrodes, and each pixel is provided with an active element being a thin film transistor (TFT).

* * * * *